United States Patent
Endo et al.

(10) Patent No.: US 10,682,904 B2
(45) Date of Patent: Jun. 16, 2020

(54) DRIVE UNIT FOR HYBRID VEHICLE

(71) Applicant: TOYOTA JIDOSHA KABUSHIKI KAISHA, Toyota-shi, Aichi-ken (JP)

(72) Inventors: Takahito Endo, Shizuoka-ken (JP); Hideaki Komada, Gotemba (JP); Tatsuya Imamura, Okazaki (JP); Kensei Hata, Shizuoka-ken (JP); Akiko Nishimine, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 117 days.

(21) Appl. No.: 15/964,949

(22) Filed: Apr. 27, 2018

(65) Prior Publication Data
US 2018/0312050 A1   Nov. 1, 2018

(30) Foreign Application Priority Data
Apr. 28, 2017   (JP) .................................. 2017-089914

(51) Int. Cl.
*B60K 6/44* (2007.10)
*B60K 6/445* (2007.10)
(Continued)

(52) U.S. Cl.
CPC .............. *B60K 6/445* (2013.01); *B60K 6/365* (2013.01); *B60K 6/387* (2013.01); *B60W 10/06* (2013.01);
(Continued)

(58) Field of Classification Search
None
See application file for complete search history.

(56) References Cited

U.S. PATENT DOCUMENTS

| 7,300,374 B2 | 11/2007 | Bucknor et al. |
| 7,481,733 B2 * | 1/2009 | Cho ..................... B60W 20/40 475/5 |

(Continued)

FOREIGN PATENT DOCUMENTS

| CN | 106256583 A | 12/2016 |
| EP | 3106338 A1 | 12/2016 |

(Continued)

*Primary Examiner* — Dirk Wright
(74) *Attorney, Agent, or Firm* — Hunton Andrews Kurth LLP

(57) ABSTRACT

A drive unit for a hybrid vehicle capable of improvement of fuel efficiency during HV running is provided. The drive unit includes an engine, a first motor, a second motor, a first planetary gear unit, a second planetary gear unit, a first engagement unit, and a second engagement unit. In a case where an operation state of the vehicle is high vehicle speed and a low driving force in which a requested driving force is small, by bringing the first engagement unit to an engaged state and the second engagement unit to the disengaged state, a first state where a gear ratio which is a rotation number ratio between an input element and an output element of a complex planetary gear unit becomes a first gear ratio γ2 smaller than "1" is set. In the case of a low vehicle speed and a high driving force in which the requested driving force is large, by bringing the second engagement unit to the engaged state and the first engagement unit to the disengaged state, a second state where the gear ratio becomes a second gear ratio γ1 larger than "1" is set.

21 Claims, 25 Drawing Sheets

(51) Int. Cl.

| | | |
|---|---|---|
| *F16H 3/72* | (2006.01) | |
| *B60W 10/06* | (2006.01) | |
| *B60W 10/08* | (2006.01) | |
| *B60W 10/115* | (2012.01) | |
| *B60W 20/10* | (2016.01) | |
| *B60W 30/18* | (2012.01) | |
| *B60W 20/30* | (2016.01) | |
| *B60K 6/365* | (2007.10) | |
| *B60K 6/387* | (2007.10) | |
| *B60K 6/38* | (2007.10) | |

(52) U.S. Cl.
CPC .......... *B60W 10/08* (2013.01); *B60W 10/115* (2013.01); *B60W 20/10* (2013.01); *B60W 20/30* (2013.01); *B60W 30/18* (2013.01); *F16H 3/725* (2013.01); *F16H 3/728* (2013.01); *B60K 2006/381* (2013.01); *B60W 2510/081* (2013.01); *B60W 2510/104* (2013.01); *B60W 2510/1005* (2013.01); *B60W 2510/244* (2013.01); *B60W 2520/10* (2013.01); *B60W 2540/10* (2013.01); *B60W 2710/081* (2013.01); *B60W 2710/1005* (2013.01); *F16H 2200/0039* (2013.01); *F16H 2200/2007* (2013.01); *F16H 2200/2035* (2013.01); *F16H 2200/2038* (2013.01); *F16H 2200/2064* (2013.01); *F16H 2200/2094* (2013.01); *Y02T 10/6239* (2013.01)

(56) References Cited

U.S. PATENT DOCUMENTS

| | | | |
|---|---|---|---|
| 8,313,401 B2 * | 11/2012 | Kim | B60K 6/365 |
| | | | 475/5 |
| 9,221,327 B2 * | 12/2015 | Ono | B60K 6/365 |
| 9,421,858 B2 * | 8/2016 | Hayashi | B60K 6/365 |
| 9,452,751 B2 * | 9/2016 | Matsubara | B60W 10/02 |
| 9,551,400 B2 * | 1/2017 | Hiasa | B60K 6/365 |
| 9,604,530 B2 * | 3/2017 | Omuro | B60K 6/365 |
| 9,701,189 B2 * | 7/2017 | Lee | B60K 6/547 |
| 10,011,271 B2 * | 7/2018 | Takagi | B60W 10/06 |
| 10,065,633 B2 * | 9/2018 | Banshoya | B60W 10/06 |
| 10,195,930 B2 * | 2/2019 | Endo | B60K 6/442 |
| 10,214,093 B2 * | 2/2019 | Banshoya | B60K 6/365 |
| 2010/0081533 A1 | 4/2010 | Lee et al. | |
| 2015/0072819 A1 * | 3/2015 | Ono | B60K 6/365 |
| | | | 475/5 |
| 2016/0368361 A1 | 12/2016 | Endo et al. | |
| 2018/0264924 A1 * | 9/2018 | Imamura | B60K 6/365 |
| 2018/0264927 A1 * | 9/2018 | Komada | B60K 6/387 |
| 2019/0047398 A1 * | 2/2019 | Endo | F16H 3/663 |
| 2019/0126736 A1 * | 5/2019 | Aoki | B60K 6/365 |
| 2019/0143962 A1 * | 5/2019 | Imamura | B60W 20/50 |
| | | | 701/22 |
| 2019/0184806 A1 * | 6/2019 | Aoki | B60K 6/365 |
| 2019/0184807 A1 * | 6/2019 | Okamura | B60K 6/365 |
| 2019/0234471 A1 * | 8/2019 | Yoshino | F16H 3/006 |

FOREIGN PATENT DOCUMENTS

| | | |
|---|---|---|
| JP | 2005-067319 A | 3/2005 |
| JP | 2006282069 A | 10/2006 |
| JP | 2006283856 A | 10/2006 |
| JP | 2008-030708 A | 2/2008 |
| JP | 2017-007437 A | 1/2017 |

* cited by examiner

| | | | CL2 | CL1 | BK | No. |
|---|---|---|---|---|---|---|
| HV | Lo | INPUT SPLIT UD | ○ | × | × | 1 |
| | FIXED STAGE | DIRECT CONNECTION | ○ | ○ | × | 2 |
| | Hi | INPUT SPLIT OD | × | ○ | × | 3 |
| EV | Lo | DUAL-MOTOR | ○ | × | ○ | 4 |
| | Hi | | × | ○ | ○ | 5 |

○ : ENGAGEMENT  × : DISENGAGEMENT

FIG.25
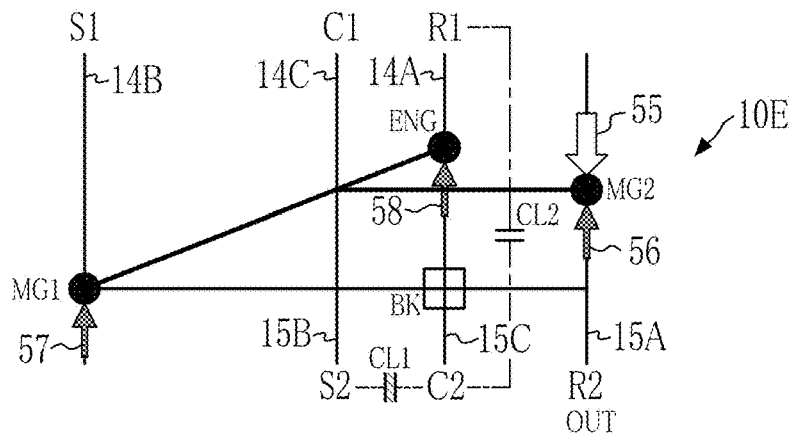
FIG.26
|  |  |  | CL1 | CL2 | BK | No. |
|---|---|---|---|---|---|---|
| HV | Lo | INPUT SPLIT UD | ○ | × | × | 1 |
|  | FIXED STAGE | DIRECT CONNECTION | ○ | ○ | × | 2 |
|  | Hi | INPUT SPLIT OD | × | ○ | × | 3 |
| EV | Lo | DUAL-MOTOR | ○ | × | ○ | 4 |
|  | Hi |  | × | ○ | ○ | 5 |
○ : ENGAGEMENT   × : DISENGAGEMENT
FIG.27
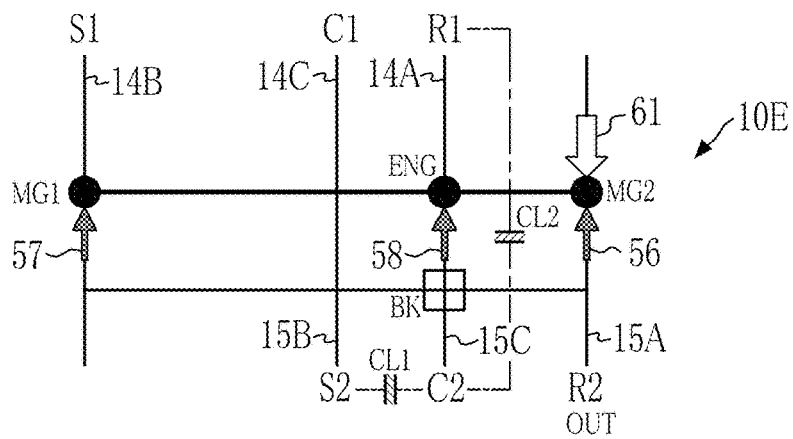

DRIVE UNIT FOR HYBRID VEHICLE

CROSS REFERENCE TO RELATED APPLICATIONS

The present application claims the benefit of priority to Japanese Patent Application No. 2017-089914 filed on Apr. 28, 2017 with the Japanese Patent Office, the entire contents of which are incorporated herein by reference in its entirety.

BACKGROUND

Field of the Disclosure

Embodiments of the present disclosure relate to the art of a drive unit for a hybrid vehicle including an internal combustion engine, a first motor, and a second motor as a prime mover and transmitting a driving force output from the prime mover to an output member connected to a driving wheel.

Discussion of the Related Art

Conventionally, a drive unit for a hybrid vehicle in which a power generated by an engine is divided into a first motor side having a power generation function and an output member side, and a driving force generated by a second motor driven by electricity generated by the first motor is added to the driving force output from the output member has been known (see Patent Document 1, for example). This type of drive unit for a hybrid vehicle includes a first planetary gear unit, a second planetary gear unit, a first clutch device, and a second clutch device. The first planetary gear unit performs a differential action by a first input element to which the power generated by the engine is input, a first reaction element connected to the first motor, and a first output element. The second planetary gear unit performs a differential action by a second input element connected to the first output element, a second output element connected to the output member for transmitting the driving force to a driving wheel, and a second reaction element. The first clutch device selectively connects either one of the first input element and the first reaction element and the second reaction element. The second clutch device selectively connects at least any two of rotating elements in the second planetary gear unit and integrally rotates the three rotating elements.

The drive unit can set a hybrid running mode for running by power generated by the engine by including the first clutch device and the second clutch device. In the hybrid running mode, a high mode in which a speed of the output member based on an engine speed is relatively high and a low mode in which the speed of the output member is relatively low can be set. The high mode is set by engaging the first clutch device and by disengaging the second clutch device. The low mode is set by disengaging the first clutch device and by engaging the second clutch device. By engaging the first clutch device and the second clutch device together, a direct connection mode in which the engine speed becomes equal to the speed of the output member (synchronous speed) is set. That is, in the direct connection mode, a gear ratio becomes "1".

FIG. 45 shows an example of theoretical transmission efficiency when the drive unit is set to the high mode and the low mode. In FIG. 45, the lateral axis indicates a gear ratio, while the vertical axis indicates the theoretical transmission efficiency (stoichiometric power transmission efficiency). The gear ratio is a ratio of the speed of the first input element with respect to the speed of the second output element of the planetary gear unit. On the lateral axis, the left side indicates a high gear side with a smaller gear ratio, while the right side indicates the low gear side with a larger gear ratio. The theoretical transmission efficiency is a ratio between the power input into the planetary gear unit and the output power and is obtained by theoretical calculation, assuming that a mechanical loss such as friction is zero and conversion between the electricity and the power is a loss. Regarding the theoretical transmission efficiency, maximum efficiency is 1.0 when the rotation of the first motor is zero and all the power of the engine is transmitted to the output member.

A curve indicated by a solid line in FIG. 45 is a theoretical transmission efficiency line 90 when the high mode is set. A curve indicated by a dotted line is a theoretical transmission efficiency line 91 when the low mode is set. The theoretical transmission efficiency line 90 in the high mode has a maximum efficiency point (mechanical point) 90c at a gear ratio $\gamma 3$. The mechanical point is efficiency when the power is transmitted to the output member from the engine when the speed of the first motor (first reaction element) is zero. The theoretical transmission efficiency line 91 in the low mode has a mechanical point 91c at a gear ratio $\gamma 4$.

Patent document 1 describes an embodiment in which when the high mode and the low mode are set, an overdrive (with a gear ratio of "1" or less) in which the speed of the output member becomes higher than the speed of the engine occurs. As an example, the gear ratio $\gamma 3$ at the mechanical point in the high mode becomes "$1/(1+\rho 1+\rho 1 \times \rho 2)$". Here, "$\rho 1$" is a gear ratio in the first planetary gear unit (a ratio between a teeth number of a ring gear which is the first output element and a teeth number of a sun gear which is the first reaction element), and "$\rho 2$" is a gear ratio in the second planetary gear unit (a ratio between a teeth number of a ring gear which is the second output element and a teeth number of a sun gear which is the second reaction element). That is, the gear ratio $\gamma 3$ is a gear ratio smaller than the gear ratio "1". In the case of this example, the gear ratio $\gamma 4$ at the mechanical point in the low mode becomes "$1/(1+\gamma 1)$". That is, the gear ratio $\gamma 4$ is a gear ratio smaller than the gear ratio "1" and larger than the gear ratio $\gamma 3$. The theoretical transmission efficiency when the direct connection mode is set becomes a mechanical point 92 when the gear ratio is "1".

The drive unit controls the engine speed by an output torque of the first motor so that driving with favorable fuel efficiency can be realized. The gear ratio continuously changes on the basis of the engine speed similarly to a vehicle on which a continuously variable transmission is mounted. That is, by controlling the output torque of the first motor on the basis of a stepped-on amount on an accelerator pedal, the engine speed is increased/decreased. The gear ratio is continuously changed from the low gear side to the high gear side shown in FIG. 45 in order to lower the engine speed on the basis of the decrease of the stepped-on amount (decrease in a driving force request) of the accelerator pedal by a driver. At this time, the operating modes in the low mode, the direct connection mode, and the high mode are switched to the mode with the higher theoretical transmission efficiency.

Specifically, in the case of the low gear side with the gear ratio larger than "1", the theoretical transmission efficiency line 91 in the low mode has higher efficiency than the theoretical transmission efficiency line 90 in the high mode and thus, the drive unit set to the low mode. As the engine speed increases in the state where the low mode is set, the gear ratio changes toward the high gear side. Thus, the theoretical transmission efficiency changes along a theoretical transmission efficiency line 91a in the low mode. After that, as the gear ratio gets closer to "1", in order to switch to the direct connection mode, control of switching engagement operations of the clutch devices by synchronizing the speed of the first input element and the speed of the second output element is executed. As a result, at a point of time when the theoretical transmission efficiency changes along a theoretical transmission efficiency line 92a in the direct connection mode and is switched to the direct connection mode, the theoretical transmission efficiency changes to the mechanical point 92 where the theoretical transmission efficiency becomes the maximum efficiency. After that, as the engine speed increases, by controlling the speed of the first motor, the gear ratio changes to the high gear side. When the gear ratio is changed from the gear ratio "1" at the mechanical point 92 to the high gear side, the theoretical transmission efficiency line 91 in the low mode comes to have higher efficiency than the theoretical transmission efficiency line 90 in the high mode. Thus, the drive unit is switched from the direct connection mode to the low mode again.

When the drive unit is set to the low mode, the theoretical transmission efficiency changes along a theoretical transmission efficiency line 91b in the low mode, and the theoretical transmission efficiency becomes the mechanical point 91c in the low mode when the gear ratio becomes "γ4". After that, as the engine speed rises, the gear ratio changes to the high gear side. When the gear ratio exceeds a gear ratio γ5 (γ3<γ5<γ4) on the high gear side, the theoretical transmission efficiency line 90 in the high mode becomes higher than the theoretical transmission efficiency line 91 in the low mode. Thus, when the gear ratio becomes the gear ratio γ5 or exceeds the gear ratio γ5, the drive unit is switched from the low mode to the high mode. At this time, synchronous rotation control is executed, and the engagement operation of the clutch device is switched. Thus, the theoretical transmission efficiency is temporarily returned to the efficiency on the theoretical transmission efficiency line 92a in the direct connection mode through transmission efficiency lines 91c and 91b in the low mode. After that, after the engagement operation of the clutch device is completed, the theoretical transmission efficiency changes to the efficiency on the theoretical transmission efficiency line 90b in the high mode through the theoretical transmission efficiency line 90a in the high mode. After that, as the engine speed decreases, the theoretical transmission efficiency changes along the mechanical point 90c in the high mode and the theoretical transmission efficiency line 90d in the high mode.

Regarding the theoretical transmission efficiency in a hybrid mode to which the drive unit described above is set, the mechanical point 92 in the direct connection mode is present at a position on the low gear side away from the mechanical point 91c in the low mode and the mechanical point 90c in the high mode. Thus, an operation state of the drive unit needs to go through the direct connection mode once at switching between the low mode and the high mode and thus, it goes through a region 94 (a hatched region) where the theoretical transmission efficiency lowers. That is, the operation state of the drive unit does not change so as to go through an operation point with good theoretical transmission efficiency. Thus, there is a concern that fuel efficiency lowers. Thus, there has been a room for improvement in improvement of the fuel efficiency in hybrid running in the conventional drive unit for a hybrid vehicle.

In the operation state of the drive unit described above, at switching between the low mode and the high mode, synchronous rotation control is executed so that the first clutch device and the second clutch device are brought into an engaged state and the mode is switched to the direct connection mode and then, either one of the clutch devices is disengaged and the mode is switched to either one of the low mode and the high mode in some cases. In this case, at the switching between the low mode and the high mode, since the direct connection mode with the gear ratio "1" is gone through, the gear ratio temporarily changes to the low gear side. That is, the gear ratio is temporarily changed to a direction opposite to a change direction of the upshift gear ratio and thus, a phenomenon that the engine speed blows up or drops down occurs, for example, which badly affects drivability in some cases. Thus, in the conventional drive unit for a hybrid vehicle, there has been a room for improvement in improvement of drivability in the hybrid running.

In order to avoid deterioration of drivability during hybrid running, by using a multi-plate wet clutch device, execution of clutch-to-clutch control in which, in a state where synchronous rotation control is not executed, that is, in a state where a speed difference between the speed of the input-side member and the speed of the output-side member of the clutch device is large, the clutch device on the disengaged side is engaged, and the clutch device on the engaged side is disengaged can be considered. However, in this case, the friction loss of the clutch device increases, and the transmission efficiency deteriorates. Moreover, the rotation change of the first motor increases and a delivery amount of electricity between the first motor and the battery increases and thus, an electric loss becomes larger.

SUMMARY

Aspects of the present disclosure have been conceived noting the foregoing technical problems, and it is therefore an object of the present application is to provide a drive unit for a hybrid vehicle for improving fuel efficiency during propulsion in a hybrid mode while improving drivability.

The drive unit according to the embodiment of the present disclosure is applied to a hybrid vehicle, in which a prime mover includes an engine, a first motor, and a second motor, and in which a driving force generated by the prime mover is transmitted to an output member connected to a driving wheel. In order to achieve the object, the drive unit is provided with: a first differential unit including a first rotary element to which the engine is connected, a second rotary element to which the first motor is connected, and a third rotary element; a second differential unit including a fourth rotary element to which the output member is connected, a fifth rotary element connected to the third rotary element, and a sixth rotary element; a first engagement device that is engaged to selectively connect any two of the fourth rotary element, the fifth rotary element, and the sixth rotary element; and a second engagement device is engaged to selectively connect the first rotary element or the second rotary element to the sixth rotary element. In the drive unit a first mode in which a speed ratio between the engine and the output member becomes a first ratio smaller than "1" is established by engaging any one of the first engagement device and the second engagement device while disengaging the other engagement device, and a second mode in which the speed ratio becomes a second ratio larger than "1" is established by engaging said other engagement device while disengaging said one of engagement devices.

In a non-limiting embodiment, drive unit may further comprise: a detector that detects at least one of a vehicle speed and a requested driving force; and a controller that controls the engine, the first motor, the second motor, the first engagement device, and the second engagement device. Specifically, the controller may be configured to: establish the first mode in at least one of the cases in which the vehicle speed is higher than a predetermined speed, and in which the requested driving force is not higher than a predetermined force, and establish the second mode in at least one of the cases in which the vehicle speed is lower than the predetermined speed, and in which the requested driving force is greater than the predetermined force.

In a non-limiting embodiment, the first mode may include a state in which power of the engine is transmitted to the output member by reducing a speed of the first motor to zero when the speed ratio is the first ratio smaller than "1", and the second mode may include a state in which the power of the engine is transmitted to the output member reducing a speed of the first motor to zero when the speed ratio is the second gear ratio larger than "1". In addition, a third state in which the speed ratio is "1" may be set when the first engagement device and the second engagement device are both in the engaged state. The drive unit may further comprises a controller that controls the engine, the first motor, the second motor, the first engagement device, and the second engagement device. In addition, the controller may be configured to select the first mode when the speed ratio is smaller than "1", select the second mode when the speed ratio is larger than "1", and select the third state when the speed ratio is "1".

In a non-limiting embodiment, the controller may be further configured to: establish the first mode by disengaging the first engagement device while engaging the second engagement device; and establish the second mode by engaging the first engagement device while disengaging the second engagement device.

In a non-limiting embodiment, the controller may be further configured to: establish the first mode by engaging the first engagement device while disengaging the second engagement device; and establish the second mode by disengaging the first engagement device while engaging the second engagement device.

In a non-limiting embodiment, the first engagement device and the second engagement device may include a dog clutch in which a torque is transmitted by engaging first teeth provided on an input-side member with second teeth provided on an output-side member. In addition, the controller may be further configured to engage the dog clutch disengaged before speed change and disengaging the dog clutch engaged before the speed change, if a speed difference between the engine and the output member is not larger than a predetermined value when switching between the first mode and the second mode.

In a non-limiting embodiment, the first engagement device and the second engagement device may include a friction clutch having an input-side rotation member to which a driving torque is applied, and an output-side rotation member for outputting the driving torque. In addition, the controller may be further configured to concurrently execute a first control to reduce a torque transmitting capacity of the friction clutch engaged before speed change, and second control to increase a torque transmitting capacity of the friction clutch disengaged before the speed change, when switching between the first mode and the second mode.

In a non-limiting embodiment, the drive unit may further comprise a brake device selectively connecting the first rotary element and a predetermined fixed member.

In a non-limiting embodiment, the second engagement device may be adapted to selectively connect the first rotary element and the sixth rotary element.

In a non-limiting embodiment, the first engagement device may be adapted to selectively connect the fourth rotary element and the sixth rotary element.

In a non-limiting embodiment, the first differential unit and the second differential unit may include a planetary gear unit having a sun gear, a ring gear and a carrier.

In a non-limiting embodiment, the first differential unit and the second differential unit may be constituted such that, on a nomographic diagram, the second rotary element, the fourth rotary element, the first rotary element, and the third rotary element or the fifth rotary element are aligned in the order of the second rotary element, the fourth rotary element, the first rotary element, and the third rotary element or the fifth rotary element.

Thus, according to the embodiment of the present disclosure, the first mode where the speed ratio between the engine and the output member is the first gear ratio smaller than "1" is established by engaging any one of the first engagement device and the second engagement device while disengaging the other engagement device, and the second mode in which the speed ratio becomes a second ratio larger than "1" is established by engaging said other engagement device while disengaging said one of engagement devices. According to the embodiment, therefore, the first speed ratio and the second speed ratio of the first mode and the second mode are set across the speed ratio "1", respectively, when the first mode and the second mode are switched to each other. For this reason, an operation point is allowed to shift in a theoretically efficient manner thereby improving fuel efficiency and drivability.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIG. 25 is a nomographic diagram showing the operation state in the first mode of the drive unit in a fifth embodiment;

FIG. 26 is an explanatory view showing an example of the operating mode in which the drive unit shown in FIG. 25 is set;

FIG. 27 is a nomographic diagram showing the operation state in a second mode of the drive unit shown in FIG. 25;

DETAILED DESCRIPTION OF THE PREFERRED EMBODIMENT(S)

Figure 1:
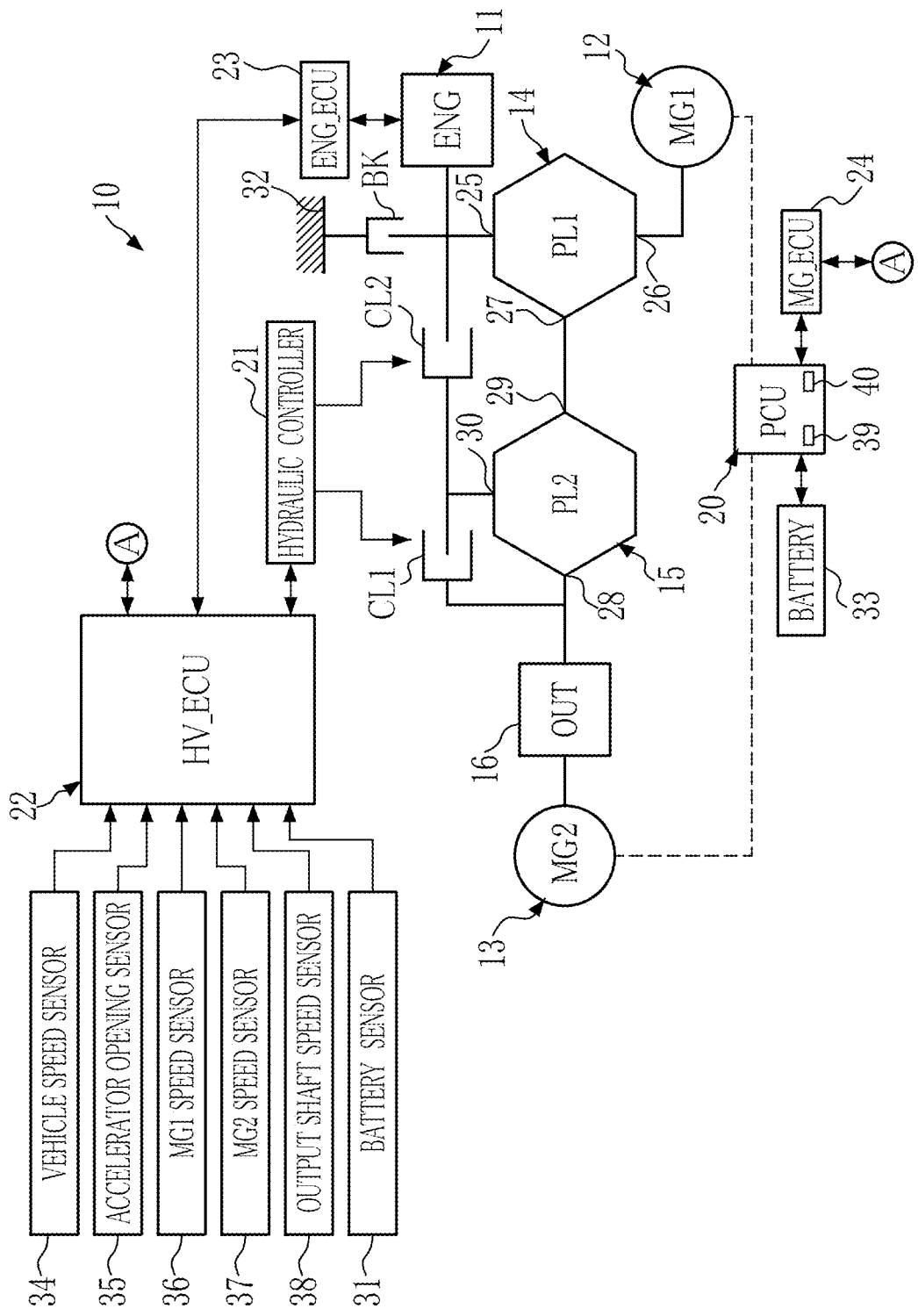
FIG. 1 is a block diagram conceptually showing an example of a drive unit used for a hybrid vehicle targeted by an embodiment of the present disclosure.

FIG. 1 conceptually shows an example of a drive unit 10 used in a hybrid vehicle (hereinafter referred to as a "vehicle") targeted by an embodiment of the present disclosure. As shown in FIG. 1, the drive unit 10 includes an engine (ENG) 11, a first motor (MG1) 12, a second motor (MG2) 13, a first planetary gear unit (PL1) 14 which is an example of a first differential unit, a second planetary gear unit (PL2) 15 which is an example of a second differential unit, an output member (OUT) 16, a first clutch device CL1, a second clutch device CL2, a brake device BK, a PCU (Power Control Unit) 20, a hydraulic controller 21, an HV_ECU (Electronic Control Unit) 22, an ENG_ECU23, an MG_ECU24, and a battery 33. The battery 33 includes an electrical storage device such as a secondary battery and a capacitor. The engine 11 corresponds to an internal combustion engine. The engine 11, the first motor 12, and the second motor 13 are examples of a prime mover. A vehicle including the prime mover may be a plug-in hybrid vehicle capable of being charged by an external power supply.

The first motor 12 is constituted by a motor-generator having a power generation function. The drive unit 10 can constitute an operating mode in which the second motor 13 is driven by using electricity generated by the first motor 12, and the driving force generated by the second motor 13 is used as the driving force for running. The second motor 13 is constituted by a motor-generator having a power generation function.

The first planetary gear unit 14 performs a differential action by a first rotary element 25 to which a torque generated by the engine 11 is input, a second rotary element 26 connected to the output member 16, and a third rotary element 27. The second planetary gear unit 15 performs the differential action by a fourth rotary element 28 connected to the first motor 12, a fifth rotary element 29 connected to the third rotary element 27, and a sixth rotary element 30.

The first clutch device CL1 integrates the entire second planetary gear unit 15 and may be constituted to connect at least any two of the rotary elements such as the fourth rotary element 28 and the sixth rotary element 30 or the fifth rotary element 29 or the sixth rotary element 30 and the fifth rotary element 29 to each other. In the embodiment shown in FIG. 1, the first clutch device CL1 selectively connects the fourth rotary element 28 and the sixth rotary element 30.

The second clutch device CL2 is provided so that, by selectively connecting the rotary elements of the first planetary gear unit 14 and the second planetary gear unit 15, these two planetary gear units 14, 15 constitute a so-called complex planetary gear unit 17 of the four elements and may be such constitution that the sixth rotary element 30 is selectively connected to the first rotary element 25 or the second rotary element 26. In the embodiment shown in FIG. 1, the second clutch device CL2 selectively connects the sixth rotary element 30 and the first rotary element 25. The complex planetary gear unit 17 is an example of a complex differential unit in the embodiment of the present disclosure.

The brake device BK is provided between the first rotary element 25 and a fixed member 32 and selectively connects the first rotary element 25 and the fixed member 32. In the embodiment of the present disclosure, the brake device BK may be omitted.

The first clutch device CL1 may be a friction clutch device having an input side friction plate to which a driving torque is input and an output side friction plate for outputting the driving torque so that the input side friction plate and the output side friction plate are brought into contact by a hydraulic pressure, for example. The second clutch device CL2 may be a unit which is the same as or similar to the first clutch device CL1. The brake device BK may be a friction brake device in which a friction plate to which the driving torque is transmitted by the hydraulic pressure and rotated and a predetermined fixed plate are brought into contact. The hydraulic controller 21 individually controls a hydraulic pressure to be supplied to the first clutch device CL1, the second clutch device CL2, and the brake device BK in accordance with an instruction value output from the HV_ECU22 so as to continuously change the respective torque transmitting capacity.

An engagement device including the first clutch device CL1, the second clutch device CL2, and the brake device BK may be a gearing type clutch device such as a dog clutch.

To the HV_ECU22, a vehicle speed sensor 34, an accelerator opening sensor 35, an MG1 speed sensor 36, an MG2 speed sensor 37, an output shaft speed sensor 38, and a battery sensor 31 are connected, respectively. That is, to the HV_ECU22, information such as an accelerator opening corresponding to the depression of the accelerator pedal, a speed of the vehicle, an output speed of the first motor 12, an output speed of the second motor 13, a speed of the output member 16, a state of charge (SOC) level of the battery 33 and the like are input. The HV_ECU22 outputs control signals to the hydraulic controller 21, the ENG_ECU23, and the MG_ECU24 in order to control the engine 11, the first motor 12, and the second motor 13 or the like on the basis of the information. The ENG_ECU23 controls the engine 11 and the like on the basis of the control signal sent out by the HV_ECU22. The MG_ECU24 controls the PCU20 on the basis of the control signal sent out by the HV_ECU22.

The PCU20 includes a converter 39 and an inverter 40 for performing power exchange between the battery 33 and the first motor 12 as well as the second motor 13. That is, the PCU20 executes control for supplying power for driving to the first motor 12 and the second motor 13 and for storing the power generated by the first motor 12 and the second motor 13 in the battery 33. The ENG_ECU23 controls an operation of the engine 11.

First Embodiment

Figures 2, 3:
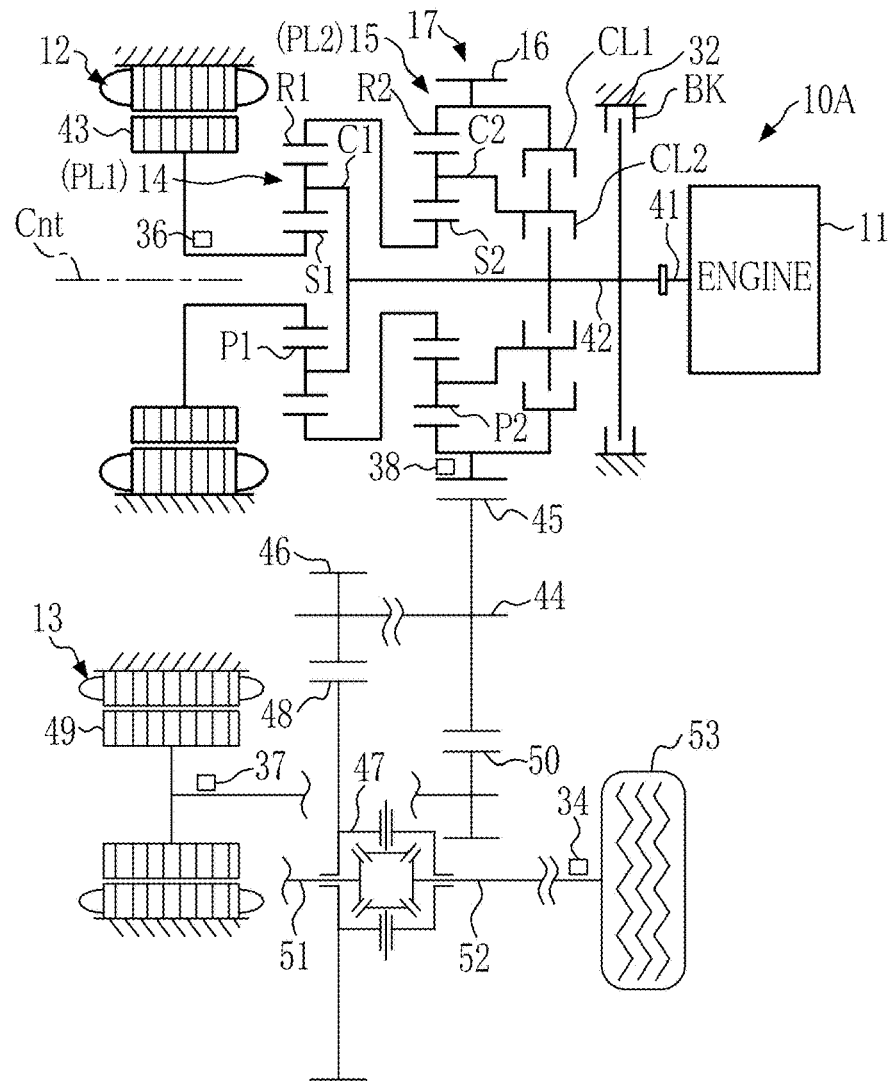
FIG. 2 is a schematic view showing the drive unit of first embodiment.
FIG. 3 is an explanatory view showing an example of an operating mode to which the drive unit shown in FIG. 2 is set.

FIG. 2 shows a drive unit 10A as an example which further embodies the drive unit 10 shown in FIG. 1. As shown in FIG. 2, the drive unit 10A is of a multiple shaft type including the engine 11, the first motor 12, the second motor 13, the first planetary gear unit (PL1) 14, the second planetary gear unit (PL2) 15, the first clutch device CL1, the second clutch device CL2, the brake device BK, a differential gear 47, a driving wheel 53 and the like and having an input shaft 42 of the first planetary gear unit 14 and the second planetary gear unit 15 and a rotor 49 of the second motor 13 arranged on different shafts. The drive unit 10A shown in FIG. 2 is an example constituted so as to be suitable for a so-called transverse engine type vehicle in which the engine 11 is arranged toward a vehicle width direction such as a front engine/front drive vehicle (FF vehicle) or a rear engine/rear drive vehicle (RR vehicle). Specifically, the first motor 12 is arranged on one side in the vehicle width direction with respect to the engine 11, and the first clutch device CL1 and the second clutch device CL2 are arranged between the first motor 12 and the engine 11.

As shown in FIG. 2, the first planetary gear unit 14 is a single-pinion type planetary gear unit and performs a differential action by three rotary elements, that is, a first sun gear S1, a first carrier C1, and a first ring gear R1. The first sun gear S1 is an external gear. The first ring gear R1 is an internal gear arranged on the concentric circle with respect to the first sun gear S1. The first carrier C1 supports first pinion gears P1 geared with the first sun gear S1 and the first ring gear R1.

The driving force generated by the engine 11 is delivered to the first carrier C1. Specifically, the input shaft 42 connected to an output shaft 41 of the engine 11 is connected to the first carrier C1. Instead of the constitution in which the first carrier C1 and the input shaft 42 are directly connected, the first carrier C1 and the input shaft 42 may be connected through a transmission unit such as a gear unit. Moreover, a damper unit or a torque converter or the like may be arranged between the output shaft 41 and the input shaft 42. The first sun gear S1 is connected to a rotor 43 of the first motor 12. The first planetary gear unit 14 is arranged on the same axis Cnt as the output shaft 41 of the engine 11. The first carrier C1 is an example of the first rotary element 25 and the first sun gear S1 is an example of the second rotary element 26, and moreover, the first ring gear R1 is an example of the third rotary element 27.

The second planetary gear unit 15 is constituted by a single-pinion type planetary gear unit and performs a differential action by three rotary elements, that is, a second sun gear S2, a second carrier C2, and a second ring gear R2. The second ring gear R2 is an internal gear arranged concentrically with respect to the second sun gear S2 and is connected to the output member 16. The second sun gear S2 is an external gear and is connected to the first ring gear R1. The second carrier C2 supports second pinion gears P2 geared with the second sun gear S2 and the second ring gear R2. The second ring gear R2 is an example of the fourth rotary element 28, and the second sun gear S2 is an example of the fifth rotary element 29, and moreover, the second carrier C2 is an example of the sixth rotary element 30.

The first clutch device CL1 switches between an engaged state in which the second carrier C2 and the second ring gear R2 are connected and a disengaged state in which the engaged state is disengaged. The first clutch device CL1 in this embodiment is an example of the first engagement device selectively connecting the fourth rotary element 28 and the sixth rotary element 30. The second planetary gear unit 15 has its differential motion regulated by engaging the first clutch device CL1. The first clutch device CL1 is an example of the first engagement device in the embodiment of the present disclosure. The second clutch device CL2 can switch between the engaged state in which the second carrier C2 and the first carrier C1 are connected and the disengaged state in which the engaged state is disengaged. The first planetary gear unit 14 and the second planetary gear unit 15 function as a switching unit for making a power split ratio variable by engaging the second clutch device CL2. The second clutch device CL2 is an example of the second engagement device in the embodiment of the present disclosure. The brake device BK can switch between the engaged state in which the input shaft 42 (or the first carrier C1) and the predetermined fixed member 32 are connected and the disengaged state in which the engagement is disengaged. The brake device BK includes a one-way clutch (OWC) for preventing backward rotation of the output shaft 41 of the engine 11. The brake device BK is an example of the third engagement device in the embodiment of the present disclosure.

In the drive unit 10A, a counter shaft 44 is arranged in parallel with the axis Cnt. The counter shaft 44 is mounted on a driven gear 45 geared with the output member 16. On the counter shaft 44, a drive gear 46 is mounted, and this drive gear 46 is geared with the ring gear 48 in the differential gear 47 which is a final drive gear. Moreover, the driven gear 45 is geared with the drive gear 50 mounted on the rotor 49 in the second motor 13. Therefore, the driving torque generated by the second motor 13 is added to the driving torque outputted from the output member 16 at the driven gear 45. The driving torque synthesized as above is transmitted to the driving wheel 53 through left and right drive shafts 51 and 52 from the differential gear 47.

FIG. 3 shows an example of an operating mode of the drive unit 10A shown in FIG. 2. As shown in FIG. 3, the drive unit 10A can set any one of modes No. 1 (first mode) to No. 5 (fifth mode) by manipulating the first clutch device CL1, the second clutch device CL2, and the brake device BK. Specifically, each of the first mode to the fifth mode is set by manipulating the first clutch device CL1, the second clutch device CL2, the brake device BK, the engine 11, the first motor 12, and the second motor 13 by the HV_ECU22. In the columns of the first clutch device CL1, the second clutch device CL2, and the brake device BK shown in the figure, "X" indicates disengagement and "O" indicates engagement or fixation.

In the first mode (HV Lo), a low mode is set with the gear ratio larger than the gear ratio "1" in which a speed ratio (a ratio of the speed of the engine to a speed of the output member) between the input shaft 42 (input element) and the output member 16 (output element) in the complex planetary gear unit 17. The first mode is set by engaging the second clutch device CL2 and by disengaging the first clutch device CL1 and the brake device BK. In an HV mode, the vehicle is propelled by the driving force generated by the engine 11 and the driving force generated by the second motor 13. The first mode (low mode) is an example of the second mode in the embodiment of the present disclosure. The gear ratio when the first mode is set is an example of the second gear ratio in the embodiment of the present disclosure.

The second mode (HV fixed stage) is a mode in which a fixed stage in the HV operating mode or a gear stage fixed to the gear ratio "1", for example, and is set by engaging the first clutch device CL1 and the second clutch device CL2, respectively, and also by disengaging the brake device BK. The second mode (direct connection mode) in which the fixed stage is set is an example of the third state in the embodiment of the present disclosure, and its gear ratio is "1".

In the third mode (HV Hi), a high mode with a gear ratio smaller than the gear ratio "1" in the HV running mode is set by engaging only the first clutch device CL1. In the third mode, the first motor 12 is driven as a generator by the driving force generated by the engine 11 to generate electric power, and the second motor 13 is rotated forward (in a direction to propel the vehicle forward) by the generated electric power to serve as a motor to generate a forward torque. The vehicle is propelled by a driving force in which the driving force generated by the engine 11 and the driving force generated by the second motor 13 are added together. The third mode (high mode) is an example of the first mode in the embodiment of the present disclosure. The gear ratio when the third mode is set is an example of the first gear ratio in the embodiment of the present disclosure.

The fourth mode (EV Lo) is a dual-motor mode set when the operation state of the vehicle is in a motor running region with a high load when the vehicle operation state is a low vehicle speed and a large required driving force, for example, and is set by engaging the second clutch device CL2 and the brake device BK and by disengaging the first clutch device CL1. The EV running mode is a mode of running as a so-called electric vehicle, and in the dual-motor mode, a vehicle is propelled by using the driving forces generated by both the first motor 12 and the second motor 13.

The fifth mode (EV Hi) is also the dual-motor mode in the EV running mode and is set by engaging the first clutch device CL1 and the brake device BK and by disengaging the second clutch device CL2. The fifth mode is set for the motor running region with a low load when the operation state of the vehicle is a high vehicle speed and a low required driving force, for example.

Figure 4:
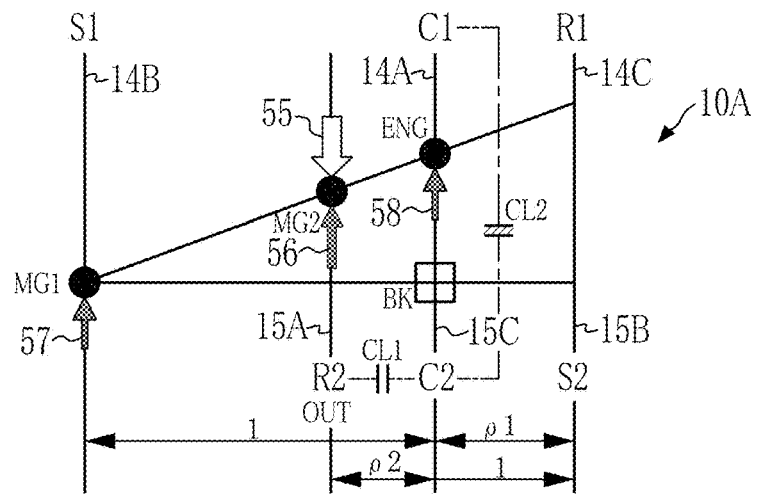
FIG. 4 is a nomographic diagram showing an operation state of a first mode shown in FIG. 3.

FIG. 4 shows the operation state of the first mode shown in FIG. 3. Nomographic diagrams including FIG. 4 described below are diagrams in each of which vertical axes indicating rotary elements in the complex planetary gear unit 17 are drawn in parallel with each other at an interval corresponding to a gear ratio and showing a speed of each of the rotary elements indicated by a distance from a base line orthogonal to these vertical axes. In the nomographic diagram, reference characters S1, C1, and R1 denote a first sun gear S1, a first carrier C1, and a firs ring gear R1, and reference characters S2, C2, and R2 denote a second sun gear S2, a second carrier C2, and a second ring gear R2, respectively.

The nomographic diagram shown in FIG. 4 has a first axis 14A, a second axis 14B, and a third axis 14C constituting the first planetary gear unit 14, and a fourth axis 15A, a fifth axis 15B, and a sixth axis 15C constituting the second planetary gear unit 15, in which the first axis 14A and the sixth axis 15C overlap each other, and the third axis 14C and the fifth axis 15B overlap each other. The vertical axes of the nomographic diagram are arranged in the order from the left side in the figure of the second axis 14B, the fourth axis 15A, the first axis 14A, and the third axis 14C or the fifth axis 15B. That is, this is the nomographic diagram in which the sixth axis 15C is arranged between the first axis 14A and the second axis 14B. The arrangement of the sixth axis 15C between the first axis 14A and the second axis 14B includes arrangement of the sixth axis 15C at a position overlapping the first axis 14A or the second axis 14B including the embodiment described below.

In the embodiment shown in FIG. 4, the first axis 14A indicates the first carrier C1 to which the output shaft 41 of the engine 11 is connected. The second axis 14B indicates the first sun gear S1 to which the rotor 43 of the first motor 12 is connected. The third axis 14C indicates the first ring gear R1. The fourth axis 15A indicates the second ring gear R2 to which the output member 16 is connected. The fifth axis 15B indicates the second sun gear S2 to which the first ring gear R1 is connected. The sixth axis 15C indicates the second carrier C2.

In the first mode in which the drive unit 10A shown in FIG. 4 is set is the HV mode of running by using the driving force in which at least the driving force generated by the engine (ENG) 11 and the driving force generated by the second motor (MG2) 13 are added together and it is set when the operation state of the vehicle is a high load state in which a vehicle speed is low and a required driving force is large. Between the first planetary gear unit 14 and the second planetary gear unit 15, in addition to the connection between the first ring gear R1 and the second sun gear S2, engagement of the second clutch device CL2 allows the first carrier C1 and the second carrier C2 to be connected. As a result, in the first mode, lines representing speeds of the three rotary elements constituting the first planetary gear unit 14 is overlapped with lines representing the speeds of the three rotary elements constituting the second planetary gear unit 15 in the nomographic diagram.

The driving force generated by the engine 11 is divided by the first planetary gear unit 14 into the first motor (MG1) 12 side and the output member (OUT) 16 side of the second planetary gear unit 15. The first sun gear S1 of the first planetary gear unit 14 is allowed to serve as a reaction element by controlling the first motor 12. Running resistance against the vehicle acts as shown by a downward force (framed arrow) 55 in the figure. The driving torque against this becomes a torque in which a forward torque (halftone arrow) 56 generated by the second motor (MG2) 13 and a forward torque (halftone arrow) 58 generated by the engine 11 are added together. A forward torque (halftone arrow) 57 applied to the first motor 12 indicates that a reaction torque is generated. That is, the first motor 12 generates the reaction torque against the driving torque generated by the engine 11, whereby the drive unit 10A transmits the driving torque generated by the engine 11 to the output member 16.

In the first mode shown in FIG. 4, a speed of the second ring gear R2 as an output element is lower than a speed of the first carrier C1 (or the speed of the engine 11). Therefore, in the first mode, a gear ratio as a ratio between an input speed and an output speed is larger than "1". That is, a so-called underdrive (U/D) state is established.

That is, the complex planetary gear unit 17 serves as a power split mechanism for distributing the driving torque of the engine 11 into the first motor 12 side and the output member 16 side and thus, the gear ratio when the speed of the first motor 12 is zero in the first mode is "$1/(1-\gamma1\times\gamma2)$". Here, "$\gamma1$" is a gear ratio in the first planetary gear unit 14 (a ratio between a teeth number of the first sun gear S1 and the teeth number of the first ring gear R1), and "$\gamma2$" is a gear ratio in the second planetary gear unit 15 (a ratio between a teeth number of the second sun gear S2 and the teeth number of the second ring gear R2).

Figure 5:
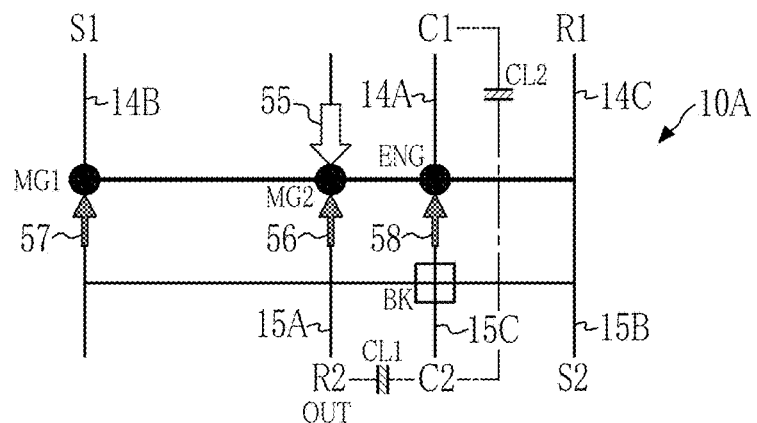
FIG. 5 is a nomographic diagram showing an operation state of a second mode shown in FIG. 3.

FIG. 5 shows the operation state of the second mode shown in FIG. 3. As shown in FIG. 5, engagement of the first clutch device CL1 allows each of the rotary elements 28 to 30 constituting the second planetary gear unit 15 in general to rotate integrally. Moreover, engagement of the second clutch device CL2 allows the first carrier C1 to be connected to the second carrier C2. The first motor 12, for example, can be operated as a generator by the driving force generated by the engine 11. By using the electricity generated by the first motor 12, the second motor 13 is allowed to output the driving force for propelling the vehicle. Therefore, in the fifth mode, the driving torque generated by the second motor 13 is added to the driving torque generated by the engine 11 in the portion of the driven gear 45 so as to become capable of running. In this second mode, the complex planetary gear unit 17 serves as a transmission in which the gear ratio is fixed to "1", for example. Thus, the speed of the engine 11 becomes equal to the speed of the output member 16 at all times.

Figure 6:
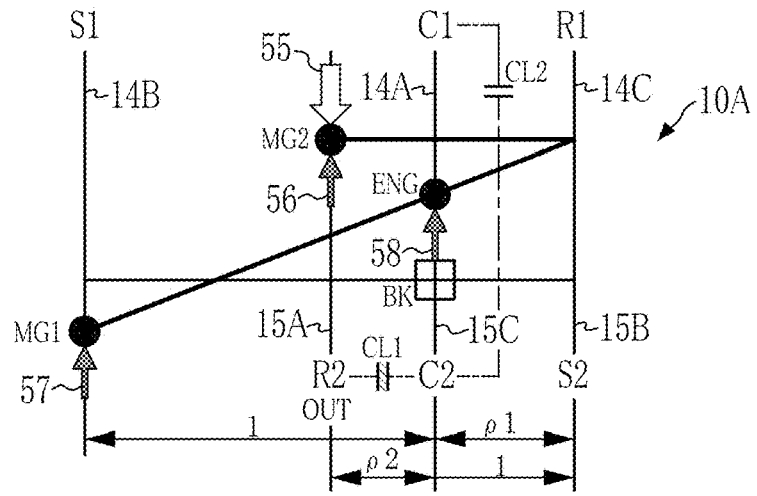
FIG. 6 is a nomographic diagram showing an operation state of a third mode shown in FIG. 3.

FIG. 6 shows the operation state of the third mode shown in FIG. 3. As shown in FIG. 6, the third mode is a mode set in a state with a low load when the operation state of the vehicle is a high vehicle speed and a small required driving force, for example, and is set by disengaging the second clutch device CL2 and the brake device BK and by engaging the first clutch device CL1. Regarding the second planetary gear unit 15, by means of engagement of the first clutch device CL1, the two rotary elements, that is, the second ring gear R2 and the second carrier C2 are connected, and the entirety is rotated integrally. Reference numeral 55 shown in FIG. 6 denotes a downward force representing a running load which is the same as or similar to the reference numeral shown in FIG. 4, reference numeral 56 denotes a forward torque generated by the second motor 13, reference numeral 58 denotes a forward torque generated by the engine 11. The first motor 12 outputs the reaction torque against the driving torque generated by the engine 11, whereby the drive unit 10A transmits the driving torque generated by the engine 11 to the output member 16.

In the state shown in FIG. 6, the speed of the second ring gear R2 (or the output member 16) becomes higher than the speed of the first carrier C1 (or the engine speed). Therefore, the third mode has a gear ratio smaller than "1", which is a so-called overdrive (O/D) state in terms of a gear ratio which is a ratio between an input speed and an output speed. That is, since the second planetary gear unit 15 enters the direct connection state, the gear ratio in the third mode when the speed of the first motor 12 is zero becomes "$1/(1+\gamma1)$".

Figure 7:
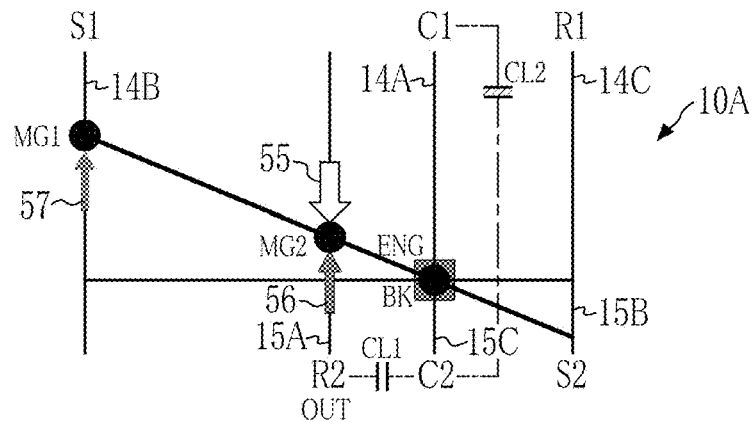
FIG. 7 is a nomographic diagram showing an operation state of a fourth mode shown in FIG. 3.

FIG. 7 shows the operation state of the fourth mode shown in FIG. 3. In the fourth mode shown in FIG. 7, the rotation of the output shaft 41 of the engine 11 is stopped, and the first motor 12 and the second motor 13 output the driving force for running by operating as motors by electricity accumulated in the battery 33. That is, in the operation state shown in FIG. 7, by means of engagement of the second clutch device CL2 and the brake device BK, the rotations of the first carrier C1 and the second carrier C2 are prevented. The first carrier C1 and the second carrier C2 serve as a reaction element. The running resistance against the vehicle acts as shown by the downward force 55. The driving torque against this is a torque in which the forward torque 56 generated by the second motor 13 and the forward torque 57 generated by the first motor 12 are added together. In the operation state shown in FIG. 7, the first motor 12 is controlled so as to rotate in the same forward direction as the second ring gear R2 and the rotor 49 of the second motor 13. The fourth mode is set to a state of the low mode in which the speed of the output member 16 becomes lower than the speed of the first motor 12. In this fourth mode, the driving force in a low vehicle speed region is improved as compared with the fifth mode. That is, the fourth mode is set in the state with a high load in which the operation state of the vehicle is a low vehicle speed and a large required driving force, for example.

Figure 8:
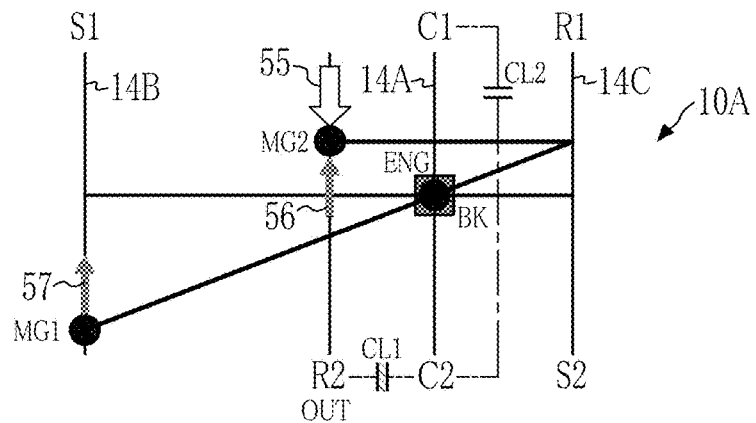
FIG. 8 is a nomographic diagram showing an operation state of a fifth mode shown in FIG. 3.

FIG. 8 shows the operation state of the fifth mode shown in FIG. 3. As shown in FIG. 8, the fifth mode is set by disengaging the second clutch device CL2 and by engaging the first clutch device CL1 and the brake device BK. The second planetary gear unit 15 is rotated integrally by the engagement of the first clutch device CL1. The running resistance against the vehicle acts as shown by the downward force 55. The driving torque against this is a torque in which the torque generated by the second motor 13 and the torque generated by the first motor 12 are added together. In the operation state shown in FIG. 8, the first motor 12 is rotated in a direction opposite to the second ring gear R2 and the rotor 49 of the second motor 13. The fifth mode is set to a state of a high mode in which the speed of the output member 16 is higher than the speed of the first motor 12. That is, the fifth mode is set in the state with a low load when the operation state of the vehicle is a high vehicle speed and a small required driving force, for example.

Figure 9:
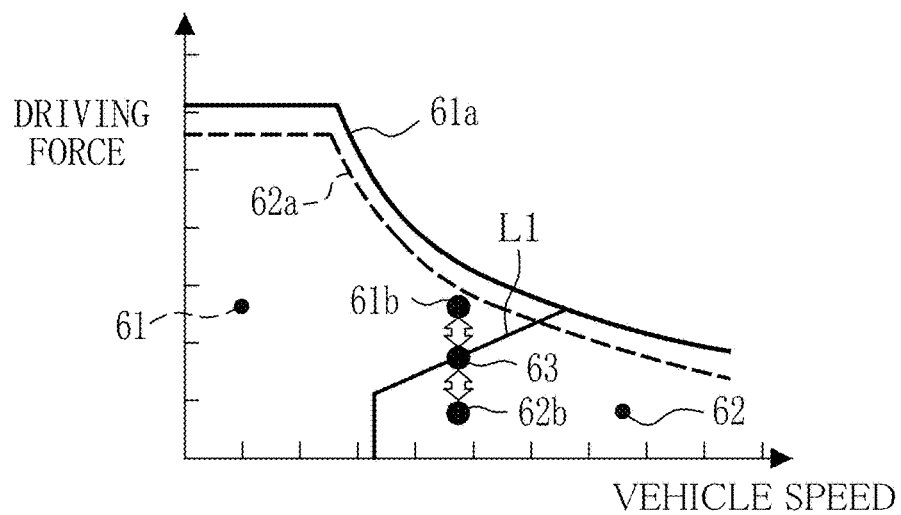
FIG. 9 is an explanatory view showing an example of a running region for which an HV running mode shown in FIG. 3 is set.

FIG. 9 shows an example of a running region in which the HV operating mode shown in FIG. 3 is set. The lateral axis shown in FIG. 9 indicates a vehicle speed and the vertical axis indicates the driving force (output torque) of the vehicle. The driving force corresponds to a required torque (required driving force) based on the accelerator opening, the running state, a running environment and the like and a target torque (target driving force), for example. As shown in FIG. 9, the running region is divided into a low-mode running region (region indicated by a solid line) 61 for running in the first mode and a high mode running region (region indicated by a dotted line) 62 for running in the third mode. The low mode running region 61 and the high mode running region 62 are separated by a boundary line L1. The low mode running region 61 is a region on an origin side from the boundary line L1, while the high mode running region 62 is a region on a side opposite to the origin side from the boundary line L1. The HV_ECU22 detects a vehicle speed on the basis of information obtained from the vehicle speed sensor 34 and detects the required driving force on the basis of information obtained from the accelerator opening sensor 35. The vehicle speed sensor 34 and the accelerator opening sensor 35 are examples of the detector in the embodiment of the present disclosure.

In this embodiment, the HV_ECU22 switches the HV running mode on the basis of the vehicle speed and the required driving force, but this is not limiting, and may switch the HV running mode on the basis of at least either one of the vehicle speed and the required driving force, for example. That is, in the case of at least either one of the running states where the vehicle speed is a low vehicle speed at a predetermined vehicle speed or less and where the required driving force which is a high driving force exceeding a predetermined driving force, the first mode may be selected, and in the case of at least either one of the running states where the vehicle speed which is a high vehicle speed exceeding the predetermined vehicle speed and where the required driving force which is a low driving force not higher than the predetermined driving force, the third mode may be selected.

In this embodiment, the first mode set when the running state is in the low mode running region 61 has a gear ratio which is a ratio between the input speed and the output speed is larger than "1" and thus, in the low mode running region 61, a maximum driving force becomes larger than that in the high mode running region 62 (reference character 61a indicated in the figure). That is, the third mode set when the running state of the vehicle is in the high mode running region 62 has a gear ratio which is a ratio between the input speed and the output speed smaller than "1" and thus, in the high mode running region 62, the maximum driving force becomes smaller than that in the low mode running region 61 (reference character 62a). The boundary line L1 indicates a running region switched to the second mode (gear ratio "1"). That is, it indicates that, when the running mode is to be switched between the first mode 61b and the third mode 62b, switching is made across the second mode 63.

Figure 10:
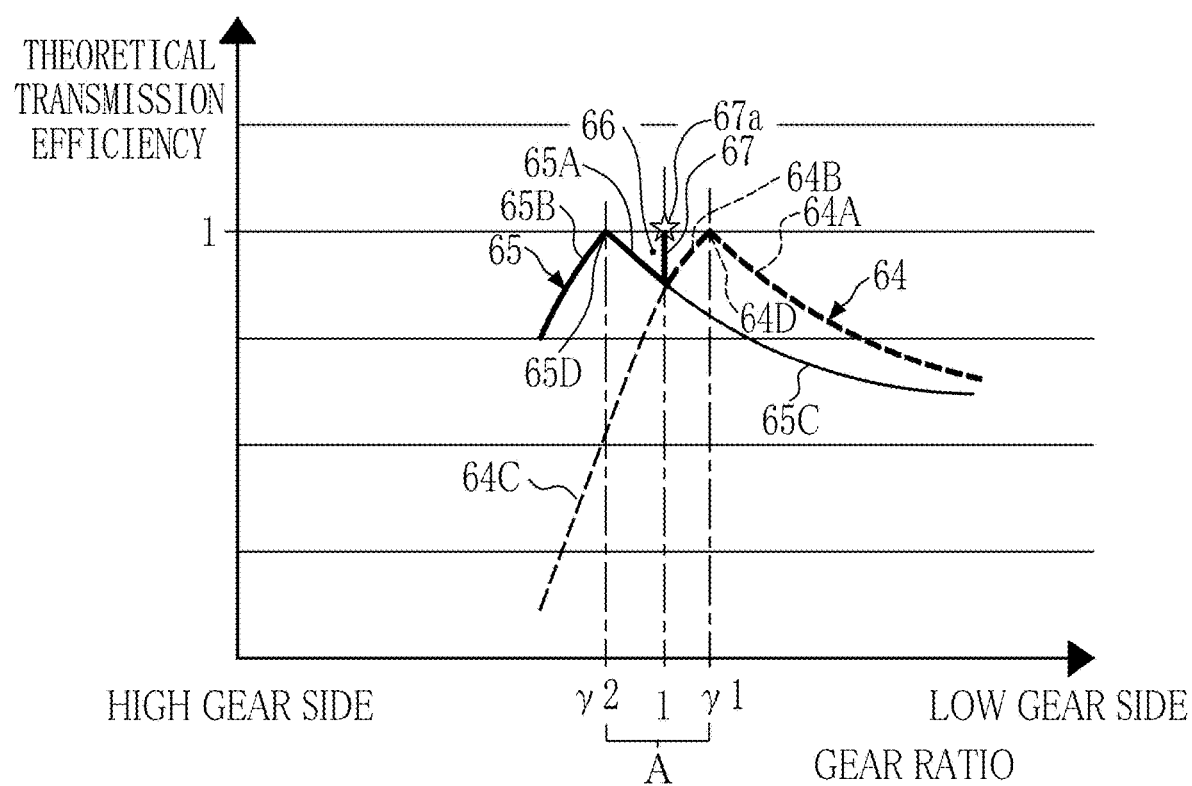
FIG. 10 is an explanatory view showing an example of theoretical transmission efficiency for which a first mode and a third mode are set.

FIG. 10 shows an example of theoretical transmission efficiency for which the first mode and the third mode are set. In FIG. 10, the lateral axis indicates a gear ratio, while the vertical axis indicates theoretical transmission efficiency. On the lateral axis, the left side is a high gear side with a smaller gear ratio, while the right side is a low gear side with a larger gear ratio.

A dotted curve 64 (64A, 64B) and a solid curve 65 (65A, 65B) shown in FIG. 10 are lines showing theoretical transmission efficiency in the HV running mode when the first mode and the third mode are switched as appropriate. The dotted lines 64A to 64C shown in the figure is a theoretical transmission efficiency line 64 in the first mode and the solid lines 65A to 65C shown in the figure is a theoretical transmission efficiency line 65 in the third mode. The relatively right side is the theoretical transmission efficiency line 64 in the first mode, and the left side is the theoretical transmission efficiency line 65 in the third mode. A first mechanical point 64D which becomes the maximum efficiency point in the theoretical transmission efficiency line 64 is at the gear ratio γ1. At the gear ratio γ1, when the speed of the first motor 12 (the first sun gear S1) is zero, the power can be transmitted from the engine 11 to the output member 16 with the maximum efficiency. This gear ratio γ1 is a gear ratio on the low gear side larger than the gear ratio "1" in the second mode.

A third mechanical point 65D which is the maximum efficiency point in the theoretical transmission efficiency line 65 is at a gear ratio γ2. At the gear ratio γ2, when the speed of the first motor 12 is zero, the power can be transmitted from the engine 11 to the output member 16 with the maximum efficiency. This gear ratio γ2 is a gear ratio on the high gear side smaller than the gear ratio "1" in the second mode.

In the theoretical transmission efficiency line 64 in the first mode and the theoretical transmission efficiency line 65 in the third mode, a region 66 which is a range A between the gear ratio γ1 and the gear ratio γ2 is curved to a low efficiency side. In this region 66, a theoretical transmission efficiency line 67 in the second mode is set. A second mechanical point 67a in the theoretical transmission efficiency line 67 in the second mode is the gear ratio "1". That is, when the speed of the output shaft 41 of the engine 11 (speed of the first carrier C1) is synchronized with the speed of the output member 16 (second ring gear R2), the maximum efficiency is obtained. The HV_ECU22 selects a mode with good theoretical transmission efficiency in the gear ratio from the first mode, the second mode, and the third mode, for example.

As described above, the drive unit 10 according to this embodiment has the first mechanical point 64D and the third mechanical point 65D on both sides sandwiching the second mechanical point 67a. That is, since the drive unit 10 has the speed change portion including the first planetary gear unit 14, the second planetary gear unit 15, the first clutch device CL1, and the second clutch device CL2, the second mechanical point 67a can be generated between the first mechanical point 64D and the third mechanical point 65D.

As described above, the gear ratio γ1 of the first mechanical point 64D is "1/(1−γ1×γ2)". The gear ratio γ2 of the third mechanical point 65D is "1/(1+ρ1)". That is, in switching between the first mode and the third mode, since the gear ratio γ1 and the gear ratio γ2 are gear ratios closer to the gear ratio "1", synchronous rotation control is executed once, and an operation point with good theoretical transmission efficiency is passed even through the second mode with the gear ratio "1". That is, the operation state of the drive unit 10 is changed so as to pass the operation point with good theoretical transmission efficiency. Thus, lowering of fuel efficiency can be suppressed. Moreover, in the drive unit 10, the second mechanical point 67a is set between the first mechanical point 64D and the third mechanical point 65D. Thus, in switching between the low mode and the high mode, even if the synchronous rotation control is executed, and the mode is switched to the second mode temporarily, the gear ratio is only changed toward the changing direction of the gear ratio so far and thus, a phenomenon that the rotation of the engine blows up or drops down can be suppressed, for example.

The HV_ECU22 controls the first motor 12, the second motor 13, the first clutch device CL1, and the second clutch device CL2 in collaboration in switching between the first mode and the third mode. As a result, a discontinuous change of the gear ratio from the engine 11 to the driving wheel 53 of the vehicle in entirety can be suppressed or reduced, and a degree of a change in the gear ratio can be reduced. By suppressing the change in the gear ratio from the engine 11 to the driving wheel 53, an adjustment amount of the engine speed with the speed change can be reduced or adjustment of the engine speed can be made unnecessary.

The adjustment of the gear ratio of the complex planetary gear unit 17 is made by control of the speed of the first motor 12, for example. The HV_ECU22 controls the first motor 12 so as to continuously change the gear ratio between the input shaft 42 and the output member 16, for example. As a result, the entirety including the first planetary gear unit 14, the second planetary gear unit 15, the first motor 12, the first clutch device CL1, and the second clutch device CL2, that is, the complex planetary gear unit 17 including the differential portion and the speed change portion operates as an electric continuously variable transmission.

Figure 11:
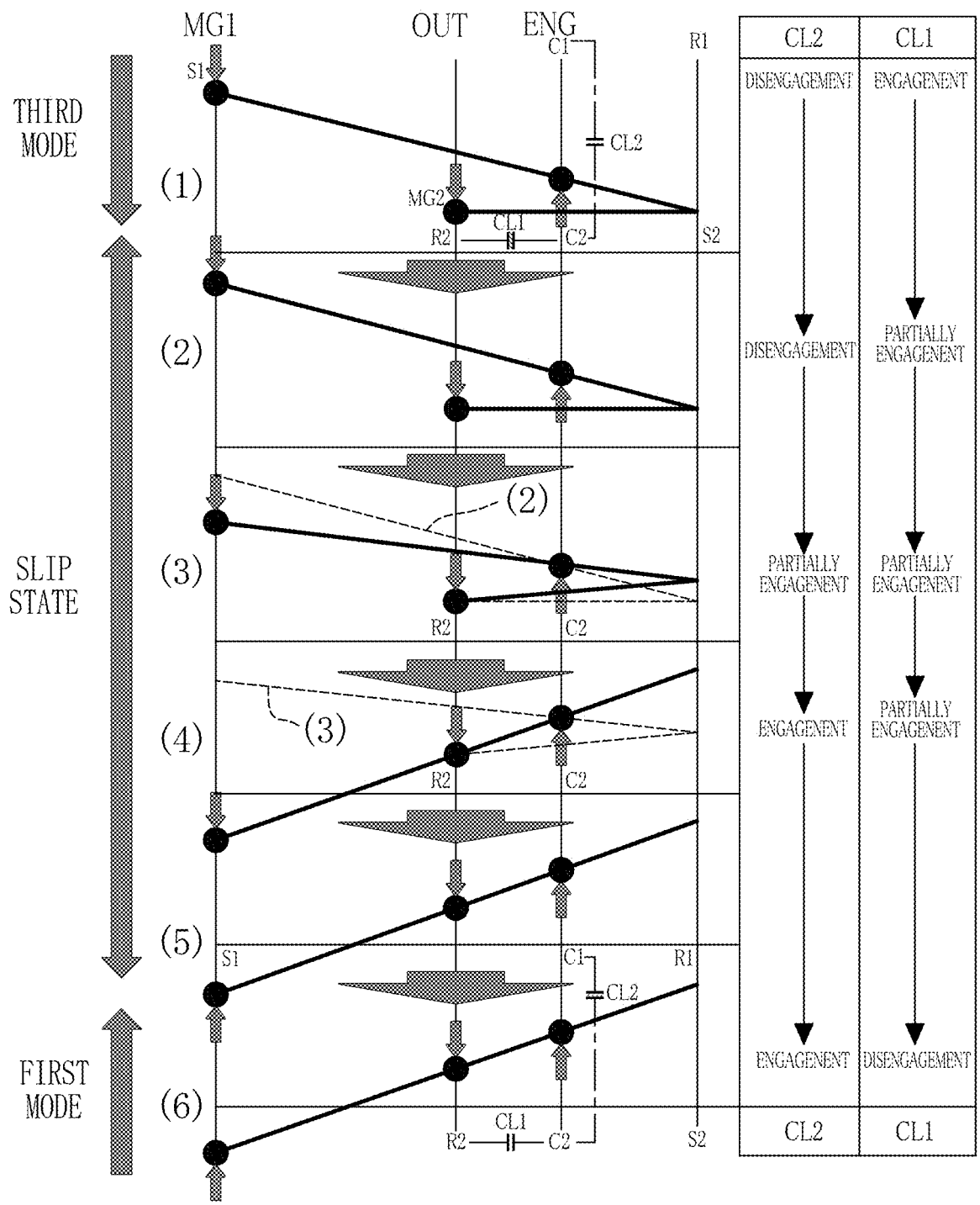
FIG. 11 is an explanatory view showing transition of the nomographic diagram showing an operation state when the third mode is switched to the first mode when a first clutch device and a second clutch device are friction clutch devices.

FIG. 11 shows transition of the nomographic diagram showing the operation state when the third mode is switched to the first mode in the case where the first clutch device CL1 and the second clutch device CL2 are a friction clutch device. When the third mode is switched to the first mode, the operation state changes in nomographic diagrams shown in FIG. 11 in the order from a nomographic diagram (1), a nomographic diagram (2), a nomographic diagram (3), a nomographic diagram (4), a nomographic diagram (5), and a nomographic diagram (6). The nomographic diagram (1) is a nomographic diagram showing the operation state in the third mode, the nomographic diagram (6) is a nomographic diagram showing the operation state in the first mode, and the nomographic diagrams (2) to (5) show the state of switching transition from the third mode to the first mode. The friction clutch device may be a multi-plate wet clutch device capable of continuous change of the torque transmitting capacity by continuously controlling supplies of a clutch operating oil flowrate and a clutch operating oil pressure by a proportional solenoid, for example.

The friction clutch device engages the input side rotation member to which the driving torque is applied with an output side rotation member for outputting the driving torque by a friction force. A torque transmitting capacity of the hydraulic clutch device is determined by a frictional coefficient of a friction material provided on each of the input side rotation member and the output side rotation member and an engagement hydraulic pressure pressing the friction plate, for example.

As shown in FIG. 11, the nomographic diagram (1) is a state in which the first clutch device CL1 is engaged, and the second clutch device CL2 is disengaged. In this state, the speed of the first motor 12 is higher than the speed of the output member 16 and the speed of the output shaft 41 of the engine 11. The first motor 12 functions as a power generator by outputting a negative torque in forward rotation. The speed of the output member 16 is lower than the speed of the output shaft 41 of the engine 11. That is, the running state in the nomographic diagram (1) is a state where the accelerator pedal is not depressed (power-off) and a descending slope or a state of inertia running on a flat road at a high vehicle speed exceeding the predetermined vehicle speed, for example. When the accelerator pedal is stepped on by a predetermined amount or more so as to enter a power-on state from this state, downshift is required.

In the nomographic diagram (2), in response to the downshift request, the first clutch device CL1 is changed to a partial-engagement state. That is, the HV_ECU22 transmits a hydraulic command for setting a hydraulic pressure setting the torque transmitting capacity of the first clutch device CL1 to a hydraulic pressure (slip hydraulic pressure) corresponding to the partial-engagement state to the hydraulic controller 21. After that, the hydraulic command of the first clutch device CL1 is made substantially in parallel with the hydraulic command for setting the slip hydraulic pressure. The control for lowering the torque transmitting capacity set for the first clutch device CL1 engaged before the speed change is an example of the first control in the embodiment of the present disclosure.

When the first clutch device CL1 is brought into the partial-engagement state, the second ring gear R2 and the second carrier C2 enter a slip state. As a result, the second planetary gear unit 15 starts to function as a differential unit. In this situation, the speed of the engine 11 has risen by depressing the accelerator pedal, and a target speed of the engine 11 and a target speed of the first motor 12 are set. That is, the first motor 12 has rotation of the rotor 43 reduced on the basis of the speed of the output shaft 41 of the engine 11. The first motor 12 is made to function as a power generator in the rotation reducing operation, that is, when a negative torque is output in forward rotation.

In the nomographic diagram (3), first fill control is applied to the second clutch device CL2, and supply of the hydraulic pressure to the second clutch device CL2 is started and after that, a hydraulic command for setting the torque transmitting capacity of the second clutch device CL2 to a slip hydraulic pressure is transmitted. After that, a hydraulic command of the second clutch device CL2 is made substantially in parallel with the instruction value instructing a slip hydraulic pressure. That is, both the first clutch device CL1 and the second clutch device CL2 are brought into the slip state. The control for increasing the torque transmitting capacity set for the second clutch device CL2 disengaged before speed change is an example of the second control in the embodiment of the present disclosure.

When the output shaft 41 (or the first carrier C1) of the engine 11 and the second carrier C2 are brought into the slip state, the speeds of the second carrier C2 and the second sun gear S2 increase, and the line indicating the speed of each rotary element of the second planetary gear unit 15 changes from a horizontal state to a state ascending to the right side.

On the other hand, when the output shaft 41 of the engine 11 and the second carrier C2 are brought into the slip state, the speed of the output shaft 41 changes so as to blow up, for example. That is, to the rotor 43 of the first motor 12, an inertia torque on the engine 11 side acts with the change in the speed of the output shaft 41. Driving of the first motor 12 and the second motor 13 is controlled so that the inertia torque generated in the first motor 12 does not act to torque fluctuation of the drive shafts 51 and 52. Then, the speed of the first motor 12 begins to decrease, and the second clutch device CL2 is brought into the partial-engagement state, whereby the speed of the output shaft 41 (or the first carrier C1) gets closer to the speed of the second carrier C2, and synchronization (end of an inertia phase) is determined by whether or not the speed difference of them falls to a predetermined speed difference set in advance or less.

In the nomographic diagram (4), the HV_ECU22 transmits the hydraulic command for increasing the hydraulic pressure of the second clutch device CL2 toward the engagement hydraulic pressure in response to the determination of synchronization with hydraulic controller 21. As a result, the torque transmission is increased between the first carrier C1 and the second carrier C2, and the state changes to the operation state of the nomographic diagram in which the line indicating a speed of each rotary element of the first planetary gear unit 14 overlaps the line indicating each rotary element of the second planetary gear unit 15.

When the hydraulic pressure of the second clutch device CL2 is gradually increased toward the engagement hydraulic pressure, the speed of the output shaft 41 of the engine 11 is decreased. Thus, in order to compensate for the driving torque transmitted to the drive shafts 51 and 52 by compensating for that amount, the first motor 12 is switched from forward rotation to negative rotation and the driving torque generated by the second motor 13 is increased. At this point of time, the first motor 12 outputs a negative torque in the negative rotation and is made to function as a power generator. Then, by detecting end of the inertia phase or a rotation synchronous phase in which the speed of the output shaft 41 of the engine 11 changes toward the speed of the output member 16, the hydraulic pressure of the second clutch device CL2 is boosted to the engagement hydraulic pressure. As a result, the hydraulic pressure of the torque transmitting capacity of the second clutch device CL2 has reached the engagement hydraulic pressure and is brought into a completely engaged state. Before the inertia phase ends, torque-down control of the engine 11 may be executed in collaboration so as to absorb the inertia torque generated with the change in the speed of the engine 11.

In the operation state in the nomographic diagram (5), in response to the determination of the completely engaged state of the second clutch device CL2, the load torque of the first motor 12 is reversed from the forward torque to the negative torque.

In the nomographic diagram (6), in response to the functioning of the first motor 12 as the motor, the hydraulic pressure of the torque transmitting capacity of the first clutch device CL1 is lowered toward the disengaged hydraulic pressure. As a result, the second ring gear R2 and the second carrier C2 are brought into the completely disengaged state, and the operating mode in which the drive unit 10 is set is set to the first mode. In the first mode, a total torque of the forward torque (upward torque) generated by the second motor 13, and the driving torque (upward torque) generated by the engine 11 counteracts the running resistance (downward torque).

Figure 12:
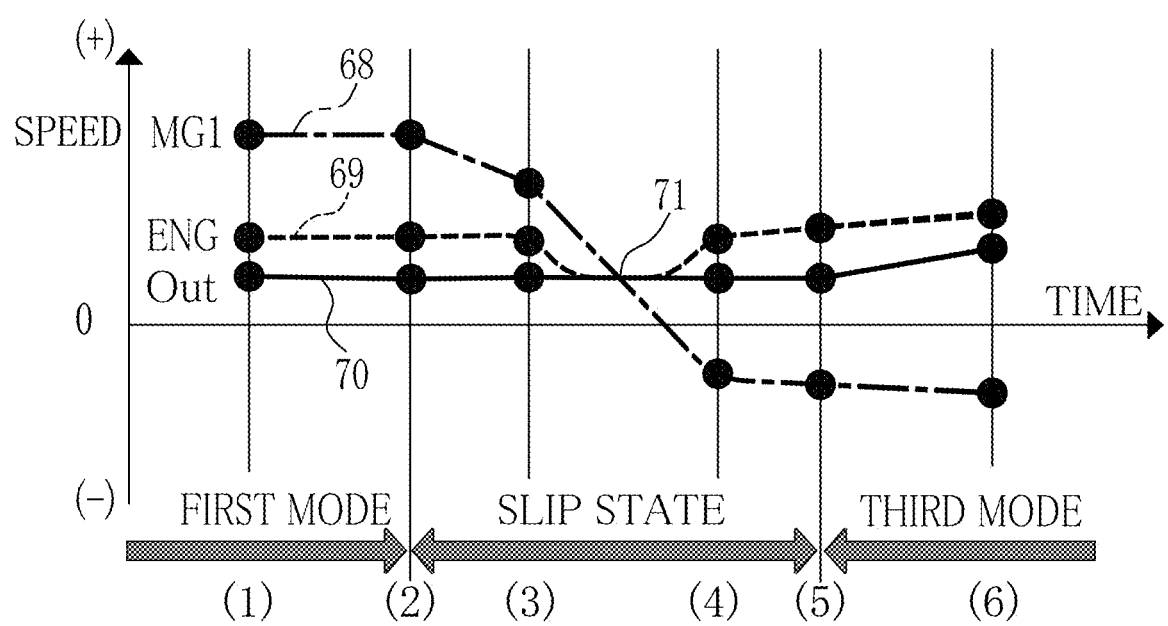
FIG. 12 is an explanatory view showing a change in speeds of a first motor, an engine, and an output member corresponding to transition of the operating mode shown in FIG. 11.

FIG. 12 is an explanatory view showing a change in the speeds of the first motor 12, the engine 11, and the output member 16 corresponding to the transition of the operating mode shown in FIG. 11. The numbers (1) to (6) shown in FIG. 12 correspond to the numbers in the nomographic diagram shown in FIG. 11. Reference numeral 68 denotes the speed of the first motor 12, reference numeral 69 denotes the speed of the output shaft 41 of the engine 11, and reference numeral 70 denotes the speed of the output member 16, respectively.

As shown in FIG. 12, the first motor 12 has the speed lowered when the operating mode is changed from the first mode to the third mode via the slip state. In the transition to the slip state, the speed of the output shaft 41 of the engine 11 is lowered on the basis of the change in the speed of the first motor 12, and the speed of the output shaft 41 is synchronized with the speed of the output member 16 (reference numeral 71 shown in the figure). At this time or before/after that, the second clutch device CL2 is switched to the engaged state. As a result, the inertia torque generated with the change in the speed of the engine 11 can be suppressed.

Figure 13:
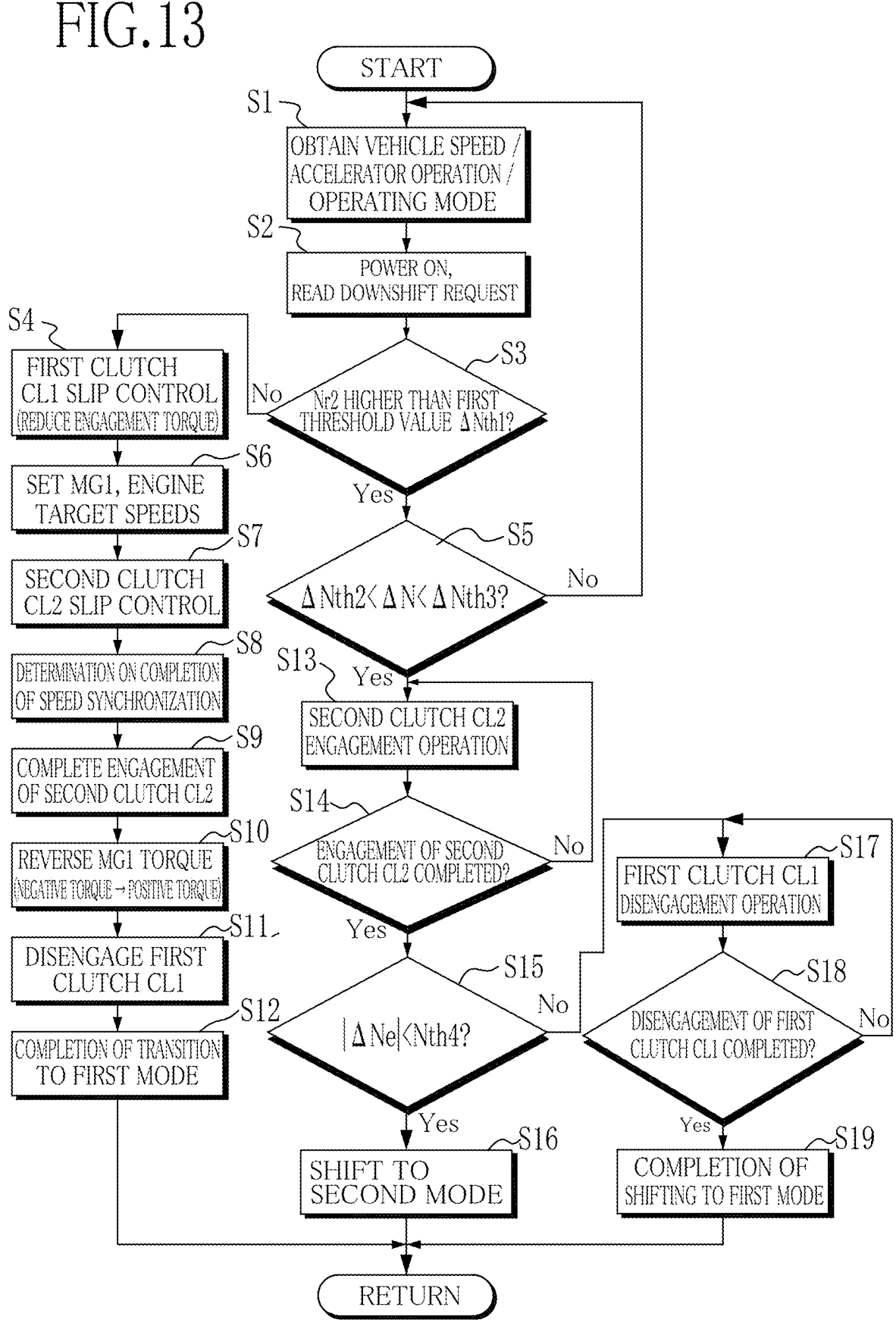
FIG. 13 is a flowchart showing a control procedure of HV_ECU when the third mode is switched to the first mode shown in FIG. 11.

FIG. 13 shows a control procedure of the HV_ECU22 when the third mode is switched to the first mode shown in FIG. 11. The operation procedure shown in FIG. 13 is, as described above, an operation procedure when the first clutch device CL1 and the second clutch device CL2 are hydraulic multi-plate wet clutch devices. A flowchart shown in FIG. 13 is repeatedly executed every predetermined time.

As shown in FIG. 13, at Step S1, information such as the vehicle speed, the accelerator opening, the current operating mode and the like is collected.

At Step S2, power-on and a downshift request are read during running in the third mode. After that, the routine proceeds to Step S3.

At Step S3, in order to lower the load applied to the first clutch device CL1 and the second clutch device CL2 at a high vehicle speed, it is determined whether the speed Nr2 of the output member 16 is higher than or equal a first threshold value $\Delta$Nth1 or not. If the speed Nr2 of the output member 16 is less than the first threshold value $\Delta$Nth1 (in the case of No side), the routine proceeds to Step S4, otherwise (in the case of Yes side), the routine proceeds to Step S5. That is, in the case of a low vehicle speed where the speed Nr2 of the output member 16 is less than the first threshold value ΔNth1, the routine proceeds to the procedure of switching to the first mode so that the transition in the nomographic diagram shown in FIG. 11 is obtained. The operation state in which the speed Nr2 of the output member 16 is less than the first threshold value ΔNth1 corresponds to the operation state of the nomographic diagram (1) shown in FIG. 11.

At Step S4, control of changing the state of the first clutch device CL1 from the engaged state to a partial-engagement state (slip state) is executed. This state corresponds to the operation state of the nomographic diagram (2) shown in FIG. 11.

At Step S6, a target speed of the first motor 12 and a target speed (target engine speed) Ne_trg of the engine 11 are set.

At Step S7, the second clutch device CL2 is changed from the disengaged state to the partial-engagement state (slip state). This state corresponds to the operation state of the nomographic diagram (3) shown in FIG. 11.

At Step S8, completion of speed synchronization is determined by the fact that a speed difference between the speed of the output shaft 41 (or the first carrier C1) and the speed of the second carrier C2 falls to a predetermined speed difference or less set in advance.

At Step S9, the second clutch device CL2 is changed from the slip state to the engaged state. This state corresponds to the operation state of the nomographic diagram (4) shown in FIG. 11.

At Step S10, the driving torque generated by the first motor 12 is reversed from the negative torque to the forward torque. This state corresponds to the operation state of the nomographic diagram (5) shown in FIG. 11.

At Step S11, the first clutch device CL1 is disengaged. After that, the routine proceeds to Step S12 and outputs a signal indicating that the transition to the first mode has been completed. This state corresponds to the operation state of the nomographic diagram (6) shown in FIG. 11.

On the other hand, if the speed Nr2 of the output member 16 is higher than the first threshold value ΔNth1 at Step S3, the routine proceeds to Step S5. At Step S5, it is determined whether or not a speed difference ΔN between the engine speed Ne and the speed Nr2 of the output member 16 is greater than a second threshold value ΔNth2 but not less than a third threshold value ΔNth3. That is, if the speed of the output member 16 is high, control in which the second clutch device CL2 is switched to the engaged state is executed on the condition that the speed difference ΔN between the engine speed and the speed Nr2 of the output member 16 falls within a predetermined range. If the speed difference ΔN is greater than the second threshold value ΔNth2 and less than the third threshold value ΔNth3 (in the case of Yes side), the routine proceeds to Step S13, otherwise (in the case of No side), the routine returns to Step S1.

At Step S13, the second clutch device CL2 is switched from the disengaged state to the engaged state. As a result, the drive unit 10A is changed to the second mode in the case of a high vehicle speed at the downshift request. At Step S14, it is determined whether the second clutch device CL2 has been switched to the engaged state. This determination is made by whether the speed difference between the speed of the input-side rotation member and the speed of the output side rotation member constituting the second clutch device CL2 is contained within the predetermined range or not, for example.

At Step S15, it is determined whether or not an absolute value of a speed difference ΔNe between an engine target speed Ne_trg and an engine speed Ne is less than a fourth threshold value ΔNth4. If the absolute value of the speed difference ΔNe is less than the fourth threshold value ΔNth4 (in the case of Yes), that is, if the driving force of the engine 11 has reached the driving force request, the routine proceeds to Step S16 and proceeds to a state where the first clutch device CL1 and the second clutch device CL2 are engaged, that is, to the second mode. If not (in the case of No), that is, if the driving force of the engine 11 has not reached the driving force request, the routine proceeds to Step S17. At Step S17, the first clutch device CL1 is switched from the engaged state to the disengaged state and the routine proceeds to Step S18.

At Step S18, it is determined whether the first clutch device CL1 has been switched to the disengaged state or not. This determination is made by whether the speed difference between the speed of the input side rotation member and the speed of the output side rotation member constituting the first clutch device CL1 is contained within a predetermined range or not, for example. If it is determined that switching of the first clutch device CL1 to the disengaged state has been completed (in the case of Yes), the routine proceeds to Step S19 and outputs a signal indicating that the transition to the first mode has been completed. If it is determined that the switching of the first clutch device CL1 to the disengaged state has not been completed (in the case of No), the routine returns to Step S17, and the switching control of the first clutch device CL1 to the disengaged state is continued.

In the flowchart shown in FIG. 13, after the first clutch device CL1 is switched at Step S4 from the engaged state to the slip state, the second clutch device CL2 is switched at Step S7 from the disengaged state to the slip state, but the present disclosure is not limited to that, and they may be executed at the same time. In this case, after the target speed of the first motor 12 and the engine target speed Ne_trg are set at Step S6, the first clutch device CL1 and the second clutch device CL2 are switched to the slip state at the same time. Similarly, after the second clutch device CL2 is switched from the slip state to the engaged state at Step S9, the first clutch device CL1 is switched from the slip state to the disengaged state at Step S11, but they may be executed at the same time.

FIG. 13 shows an operation procedure when the drive unit 10 is switched from the third mode to the first mode when the first clutch device CL1 and the second clutch device CL2 are hydraulic multi-plate wet clutch devices. On the other hand, the operation procedure of switching the drive unit 10 from the first mode to the third mode (in the case of upshift), the transition in the nomographic diagram becomes opposite to the transition in the nomographic diagram shown in FIG. 11, and the flowchart showing the operation procedure becomes a procedure in which the first clutch device CL1 and the second clutch device CL2 are switched to each other in the operation procedure shown in FIG. 13. Thus, detailed description here is omitted.

Figure 14:
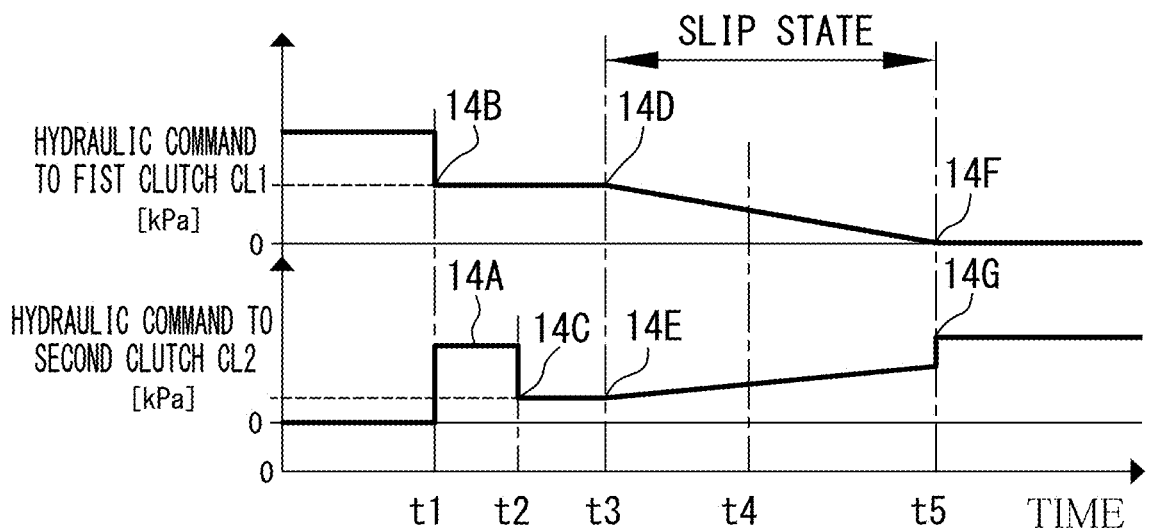
FIG. 14 is a time chart showing an example of a clutch hydraulic pressure when the third mode is switched to the first mode shown in FIG. 11.

FIG. 14 is a time chart showing an example of a hydraulic command when the first clutch device CL1 and the second clutch device CL2 are switched at the same time. The vertical axis shown in FIG. 14 indicates the hydraulic commands of the first clutch device CL1 and the second clutch device CL2, respectively, while the lateral axis indicates time.

At time t1, in response to an output of a request for downshift from the third mode to the first mode, for example, speed change control is started. The downshift from the third mode to the first mode is, as explained in FIG. 13, the first clutch device CL1 is disengaged, and the second clutch device CL2 is engaged.

When the speed change control is started, in order to rapidly raise the hydraulic pressure of the second clutch device CL2, the fast fill control in which the hydraulic command to the second clutch device CL2 is temporarily set to a high value is executed (reference numeral 14A). At the same time, the hydraulic pressure of the first clutch device CL1 is lowered to a slip hydraulic pressure (reference numeral 14B) corresponding to the slip state from an engagement hydraulic pressure.

At time t2, the hydraulic pressure of the second clutch device CL2 after the fast fill control is finished is lowered to the hydraulic pressure immediately before transmission of the torque (low-pressure standby) (reference numeral 14C). As a result, the first clutch device CL1 enters the slip state, and the second clutch device CL2 is held in the vicinity of a stroke end pressure of the piston. The stroke end pressure is a hydraulic pressure when two plates are just brought into contact with each other when the piston is moved by the hydraulic pressure from the disengaged state in which a drive plate and a driven plate are separated from each other in the friction engagement device, that is, such a degree that the torque is not transmitted.

At time t3, sweep-down processing of setting a hydraulic command so that the hydraulic pressure of the first clutch device CL1 is gradually lowered by a predetermined gradient determined in advance, for example, is executed (reference numeral 14D). In parallel with the sweep-down processing, sweep-up processing of setting the hydraulic command so that the hydraulic pressure to the second clutch device CL2 gradually rises by the predetermined gradient determined in advance, for example, is executed (reference numeral 14E). As a result, such a torque phase is realized that a part of the torque borne by the first clutch device CL1 on an engaged side is borne by the second clutch device CL2 on a disengaged side. The torque phase is a torque transfer period for lowering the speed of the output shaft 41 of the engine 11 to the speed synchronized with a speed of the output member 16.

At time t4, a relation between the torques to be borne is gradually reversed, and an inertia phase is realized that the speed of the output shaft 41 of the engine 11 is changed. At this point of time, the HV_ECU22 monitors the speed difference between the speed of the output shaft 41 and the speed of the output member 16.

At time t5, completion of speed synchronization is determined. At this time, the hydraulic command of the first clutch device CL1 is set so that the hydraulic pressure of the first clutch device CL1 is completely disengaged (reference numeral 14F), and the hydraulic command of the second clutch device CL2 is set so that the hydraulic pressure of the second clutch device CL2 rises to the engagement hydraulic pressure (reference numeral 14G). As a result, the downshift control is finished. When the friction clutch device is used for the first clutch device CL1 and the second clutch device CL2 as described above, when the first mode and the second mode are switched to each other, control of switching the engaged state of the first clutch device CL1 and the second clutch device CL2 can be executed in parallel. Thus, when the friction clutch device is used, time for switching between the first mode and the third mode can be shortened as compared with the case of using a gearing type clutch which will be described in detail later.

Figure 15:
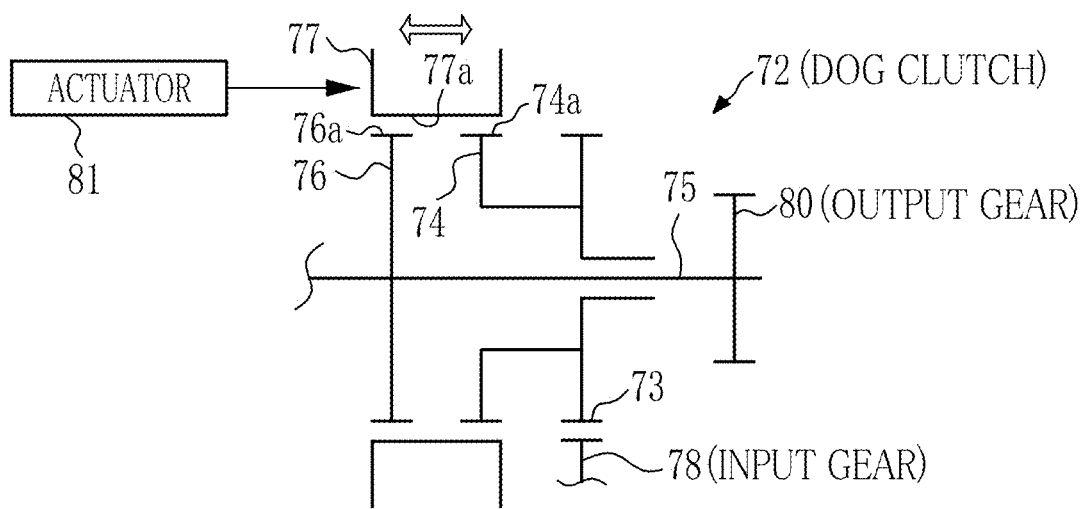
FIG. 15 is a schematic view showing a dog clutch which is an example of a gearing type clutch device.

FIG. 15 shows a dog clutch 72 which is an example of a gearing type clutch device used instead of the friction clutch device. As shown in FIG. 15, the dog clutch 72 includes a clutch gear 74 provided on a gear 73, a clutch hub 76 connected to an output shaft 75, and a coupling sleeve 77. On an outer periphery of the clutch gear 74, first clutch teeth 74a are formed. On an outer periphery of the clutch hub 76, second clutch teeth 76a are formed. On an inner periphery of the coupling sleeve 77, third clutch teeth 77a are engaged. The coupling sleeve 77 is movable in a direction in parallel with the output shaft 75 between a geared position where the third clutch teeth 77a are geared with both the first clutch teeth 74a and the second clutch teeth 76a and a non-geared position where the third clutch teeth 77a is disengaged from either one of the first clutch teeth 74a and the second clutch teeth 76a.

FIG. 15 shows a state where the coupling sleeve 77 is at an engagement position. In this state, the dog clutch 72 is in an engaged state for transmitting the driving torque transmitted from the clutch gear 74 to the output shaft 75. That is, the driving torque transmitted from an input side by an input gear (input side rotation member) 78 and the gear 73 geared with this is output to an output gear (output side rotation member) 80 fixed to the output shaft 75. When the coupling sleeve 77 is at the ungeared position, the dog clutch 72 is in a disengaged state where the driving torque transmitted from the input gear 78 is not transmitted to the output shaft 75. Movement of the coupling sleeve 77 is performed by an operation of an actuator 81. The actuator 81 includes the hydraulic controller 21 and an electromagnetic circuit, for example.

The first clutch teeth 74a and the third clutch teeth 77a and the like are examples of first teeth in the embodiment of the present disclosure, and the second clutch teeth 76a and the third clutch teeth 77a and the like are examples of second teeth in the embodiment of the present disclosure. As the gearing type clutch device, those with a structure in which the coupling sleeve 77 shown in FIG. 15 is omitted, the first teeth provided on the input side member and the second teeth provided on the output side member are arranged opposite to each other, and either one of the first teeth and the second teeth is moved to the other by the operation of the actuator so that the first teeth and the second teeth are geared with each other may be used.

Figure 16:
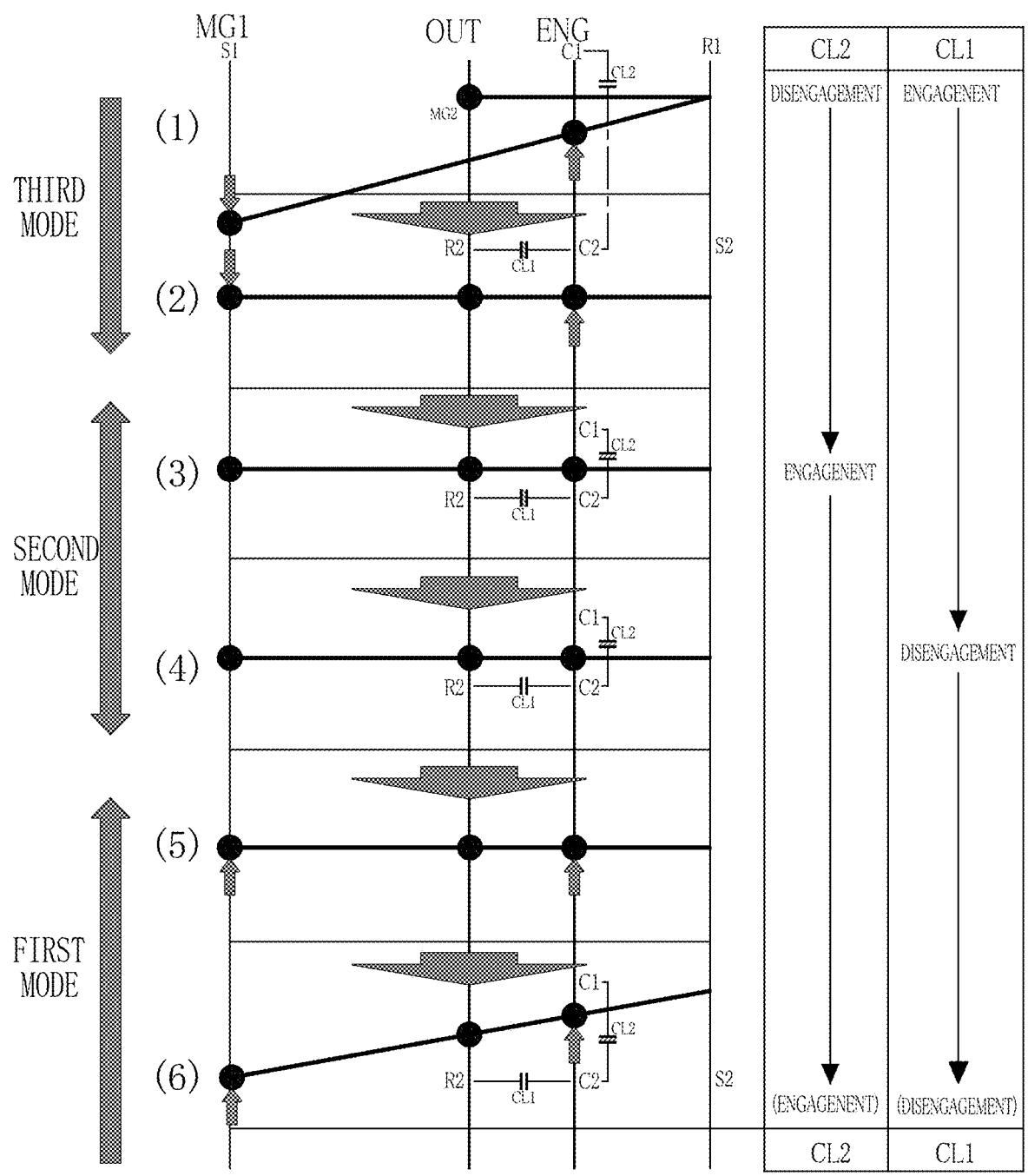
FIG. 16 is an explanatory view showing transition of the nomographic diagram showing the operation state when the third mode is switched to the first mode when the gearing type clutch device is used for a first clutch device CL1 and a second clutch device CL2.

FIG. 16 is an explanatory diagram indicating transition of the nomographic diagram showing the operation state in which the third mode is switched to the first mode when the gearing clutch device is used for the first clutch device CL1 and the second clutch device CL2. The gearing clutch device is a dog clutch shown in FIG. 15, for example. When the third mode is switched to the first mode, the operation state changes in nomographic diagrams shown in FIG. 16 in the order from a nomographic diagram (1), a nomographic diagram (2), a nomographic diagram (3), a nomographic diagram (4), a nomographic diagram (5), and a nomographic diagram (6). The nomographic diagram (1) is a nomographic diagram showing the operation state in the third mode, the nomographic diagram (6) is a nomographic diagram showing the operation state in the first mode, and the nomographic diagrams (2) to (5) show the state of switching transition from the third mode to the first mode. When the dog clutch device is used, for the first clutch device CL1 and the second clutch device CL2, the state changes to the second mode, not to the slip state, in the switching transition state as compared with the case where the friction clutch device is used, which is a difference.

As shown in FIG. 16, the nomographic diagram (1) is a state in the third mode, that is, a state where the first clutch device CL1 is engaged, and the second clutch device CL2 is disengaged. In this state, the speed of the output member 16 is higher than the speed of the output shaft 41 of the engine 11. The first motor 12 outputs a negative torque in a negative rotation. That is, the running state of the vehicle in the nomographic diagram (1) is a state where the accelerator pedal is depressed (power-on) and accelerating running is being performed on an ascending slope or a flat road (a high load state with a large required driving force), for example. When the accelerator pedal is further depressed by a predetermined amount or more in this state, and the operation point (a point determined by a vehicle speed and accelerator opening) of the vehicle crosses the downshift line by using a speed change map using the vehicle speed and the accelerator opening according to the stepped-on amount on the accelerator pedal as parameters, for example, the downshift is required.

In the nomographic diagram (2), in response to the downshift request, the speed of the first motor 12 is controlled until the speed difference between the output shaft 41 of the engine 11 and the output member 16 falls within a predetermined range. That is, control in which the first motor 12 is switched from the negative rotation to the forward rotation, and the speed of the first motor 12 is raised is executed.

In the nomographic diagram (3), at a point of time when the speed difference between the output shaft 41 of the engine 11 and the output member 16 falls within a predetermined range, the second clutch device CL2 on the disengaged side is switched to the engaged state. At this time, the first clutch device CL1 and the second clutch device CL2 are both changed to the engaged state, that is, to the second mode.

In the nomographic diagram (4), at a point of time when an absolute value of the speed difference between the engine target speed and an actual engine speed falls within the predetermined range, the first clutch device CL1 on the engaged side is switched to the disengaged side.

In the operation state of the nomographic diagram (5), since the first clutch device CL1 on the engaged side is disengaged, the operating mode in which the drive unit 10 is set is set to the first mode. As a result, the output torque of the first motor 12 is reversed from the negative torque to the forward torque, and the first motor 12 is made to function as a motor.

In the nomographic diagram (6), control in which the speed of the first motor 12 is lowered, and the speed of the output shaft 41 of the engine 11 is increased is executed. In this state, a total torque of a forward driving torque (upward torque) generated by the second motor 13 and the driving torque (upward torque) generated by the engine 11 counteracts the running resistance (downward torque). By means of the control of increasing the speed of the output shaft 41 of the engine 11 and the speed of the rotor 49 of the second motor 13, the speed of the output member 16 is raised.

Figure 17:
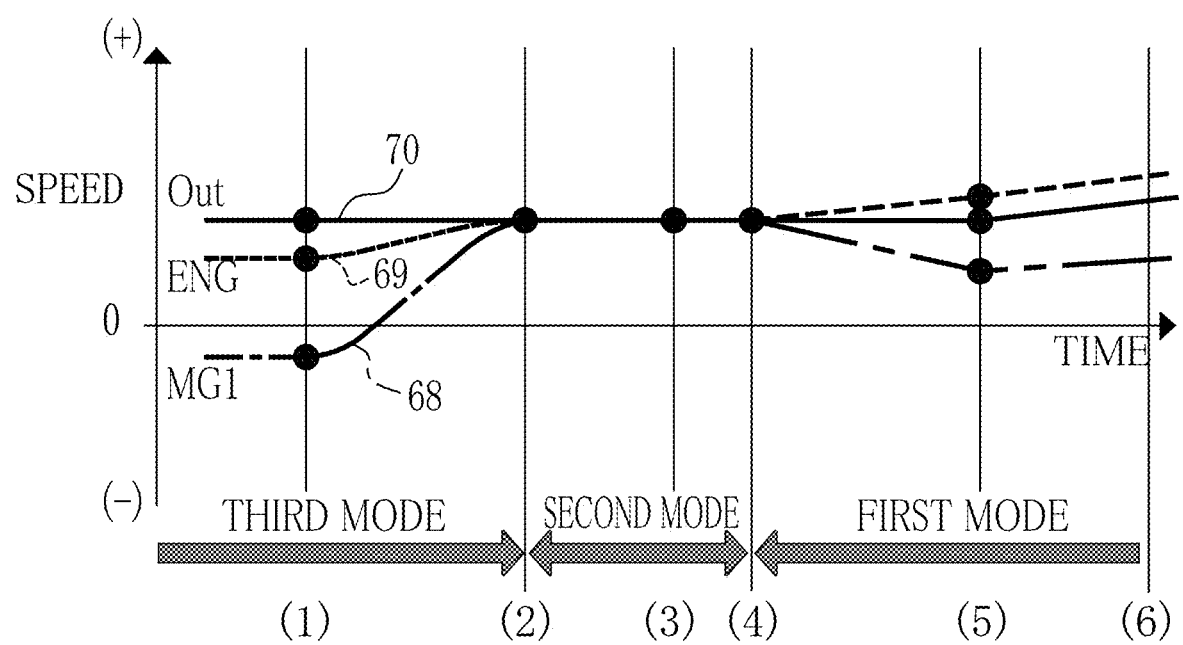
FIG. 17 is an explanatory view showing an example of a change in the speed of the first motor, the engine, and the output member corresponding to transition of the operating mode shown in FIG. 16.

FIG. 17 is an explanatory view showing an example of a change in the speeds of the first motor 12, the engine 11, and the output member 16 corresponding to the transition of the operating mode shown in FIG. 16. Numbers (1) to (6) shown in FIG. 17 correspond to the numbers of the nomographic diagrams shown in FIG. 16. Reference numeral 68 denotes the speed of the first motor 12, reference numeral 69 to the speed of the output shaft 41 of the engine 11, and reference numeral 70 to the speed of the output member 16, respectively.

As shown in FIG. 17, the speeds 68 and 69 of the rotor 43 of the first motor 12 and the output shaft 41 of the engine 11 are controlled so as to get closer to the speed of the output member 16 before the operating mode changes from the third mode to the second mode. Then, when the speed difference between the output member 16 and the output shaft 41 of the engine 11 falls within the predetermined range, the second clutch device CL2 is engaged and then, the first clutch device CL1 is disengaged. As described above, in the case of the dog clutch, if the speed difference between the input-side rotation member and the output-side rotation member is contained within the predetermined range, clutch teeth might be deformed or a fluctuation shock might occur in the driving torque at engagement or disengagement. That is, when the gearing type clutch device is used, since the slip control cannot be executed as compared with the use of the friction clutch device shown in FIGS. 11 and 12, switching of the clutch device on the engaged side and the clutch device on the disengaged side cannot be performed in parallel. Thus, the engagement state is switched in the order of the clutch device on the disengaged side and the clutch device on the engaged side and thus, mode switching control takes time. However, when the gearing type clutch device is used, constitution of the clutch device can be more simplified than the case of using the friction clutch device.

Figure 18:
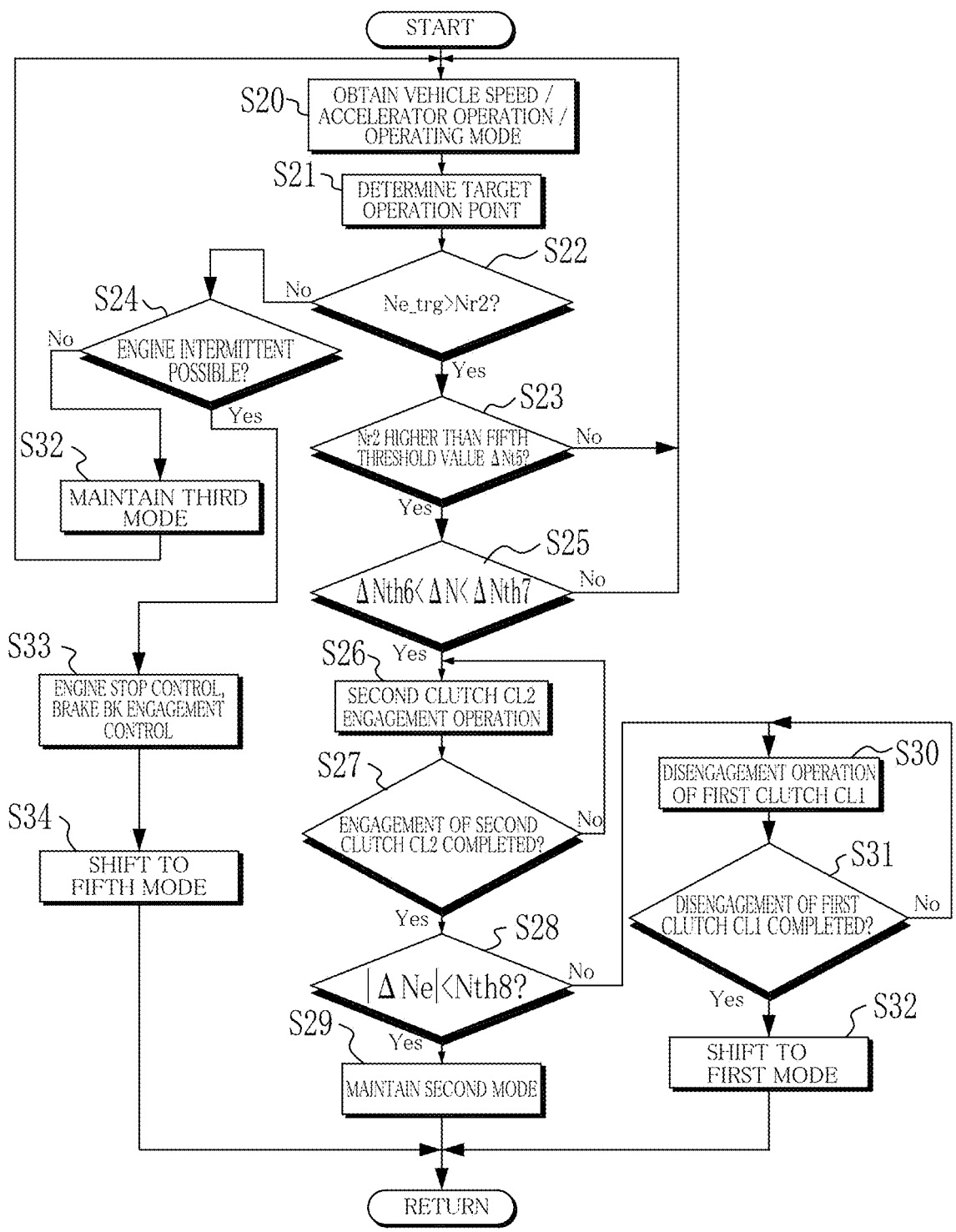
FIG. 18 is a flowchart showing an example of the control procedure of the HV_ECU when the third mode is switched to the first mode shown in FIG. 16.

FIG. 18 shows an example of a control procedure of the HV_ECU22 when the third mode is switched to the first mode shown in FIG. 16. The operation procedure shown in FIG. 18 is an operation procedure when the first clutch device CL1 and the second clutch device CL2 are gearing type clutch devices or a dog clutch, for example. A flowchart shown in FIG. 18 is repeatedly executed every predetermined time.

As shown in FIG. 18, at Step S20, information such as a vehicle speed, accelerator opening, and the current operating mode is collected, and the routine proceeds to Step S21.

At Step S21, a target engine operation point (engine target speed Ne_trg and a target engine torque) is determined on the basis of the accelerator opening and the vehicle speed. After that, the routine proceeds to Step S22.

At Step S22, it is determined whether the engine target speed Ne_trg exceeds the speed Nr2 of the output member 16 or not. If the engine target speed Ne_trg exceeds the speed Nr2 of the output member 16 (in the case of Yes side), the routine proceeds to Step S23 in order to execute the downshift control, while not (in the case of No side), the routine proceeds to Step S24.

At Step S23, it is determined whether the speed Nr2 of the output member 16 is higher than a fifth threshold value $\Delta Nth5$ or not. The fifth threshold value $\Delta Nth5$ is a threshold value for determining whether the speed Nr2 of the output member 16 is higher than an idling speed of the engine 11 or not, for example, and a value according to a vehicle model or the like is determined in advance. If the speed Nr2 is higher than the fifth threshold value $\Delta Nth5$ (in the case of Yes side), the routine proceeds to Step S25, otherwise (in the case of No side), the routine returns to Step S20.

At Step S25, in order to engage the second clutch device CL2 which is a dog clutch, it is determined whether the speed difference $\Delta N$ between the engine speed Ne and the speed Nr2 of the output member 16 exceeds a sixth threshold value $\Delta Nth6$ and less than a seventh threshold value $\Delta Nth7$, that is, whether the speed difference $\Delta N$ is not larger than a predetermined speed or not. If the speed difference $\Delta N$ exceeds the sixth threshold value $\Delta Nth6$ and less than the seventh threshold value $\Delta Nth7$ (in the case of Yes side), the routine proceeds to Step S26, otherwise (in the case of No), the routine returns to Step S20. That is, the case where the speed difference $\Delta N$ exceeds the sixth threshold value $\Delta Nth6$ and less than the seventh threshold value $\Delta Nth7$ corresponds to the operation state of the nomographic diagram (2) shown in FIG. 16.

At Step S26, control of switching the second clutch device CL2 disengaged before the speed change to the engaged state is executed and then, the routine proceeds to Step S27. The operation state at Step S26 corresponds to the operation state in the nomographic diagram (3) shown in FIG. 16.

At Step S27, it is determined whether the engagement of the second clutch device CL2 has been completed or not. This determination is made by whether the speed difference between the speed of the input-side rotation member and the speed of the output-side rotation member constituting the second clutch device CL2 is not larger than the predetermined speed or not, for example. If it is determined that the engagement of the second clutch device CL2 has been completed (in the case of Yes side), the routine proceeds to Step S28, while if not (in the case of No side), the routine returns to Step S26, and the engagement control is continued.

At Step S28, it is determined whether an absolute value of the speed difference $\Delta Ne$ between the engine target speed Ne_trg and the engine speed Ne is not larger than an eighth threshold value $\Delta Nth8$ or not. If the absolute value of the speed difference $\Delta Ne$ is not larger than the eighth threshold value $\Delta Nth8$ (in the case of Yes side), the routine proceeds to Step S29, otherwise (in the case of No side), the routine proceeds to Step S30.

At Step S29, the second mode is maintained. That is, the fact that the routine proceeds to Step S29 means that the speed difference between the engine target speed Ne_trg and the engine speed Ne is small and thus, it is a state where the engine speed Ne does not have to be increased/decreased. Thus, in this state, the state where the first clutch device CL1 and the second clutch device CL2 are kept engaged, that is, the second mode state is maintained.

On the other hand, at Step S30, the control of switching the first clutch device CL1 engaged before speed change to the disengaged state is executed. That is, the fact that the routine proceeds to Step S30 means that the speed difference between the engine target speed Ne_trg and the engine speed Ne is large and thus, the engine speed Ne has to be increased/decreased. Thus, the first clutch device CL1 is switched to the disengaged state, whereby the mode changes to the first mode.

At Step S31, it is determined whether the disengagement of the first clutch device CL1 has been completed or not. This determination is made by whether the speed difference between the speed of the input-side rotation member and the speed of the output-side rotation member constituting the first clutch device CL1 is not larger than the predetermined speed or not, for example. If the disengagement of the first clutch device CL1 has been completed (in the case of Yes side), the routine proceeds to Step S32, otherwise (in the case of No side), the routine returns to Step S30, and the disengagement control is continued.

At step S32, in response to completion of the switching of the first clutch device CL1 to the disengaged state, it is determined that the mode has been changed to the first mode.

On the other hand, if it is determined at Step S22 that the engine target speed Ne_trg is less than the speed Nr2 of the output member 16, the routine proceeds to Step S24.

At Step S24, it is determined whether an engine intermittent operation in which operation stop and restart of the engine 11 is repeated can be carried out or not. This determination is made on the basis of the running state of the vehicle and a state of the battery 33, for example. The running state of the vehicle includes a state of deterioration of an exhaust purification catalyst, for example. If it is determined that the engine intermittent operation can be carried out (in the case of Yes side), the routine proceeds to Step S33 which is a procedure of the EV running of carrying out the fifth mode, for example. If not (in the case of No side), the routine proceeds to Step S32, and the third mode is maintained.

At Step S33, control of stopping the operation of the engine 11 is executed in order to proceed to the EV running and after that, control of engaging the brake device BK is executed. After that, the routine proceeds to Step S34. At Step S34, a signal indicating that the transition to the fifth mode shown in FIG. 3 has been completed is output.

In the flowchart shown in FIG. 18, when the speed difference between the engine speed Ne and the speed Nr2 of the output member 16 is the predetermined speed or less (synchronous speed), the first clutch device CL1 disengaged before the speed change is engaged and then, the second clutch device CL2 engaged before the speed change is disengaged, but the present disclosure is not limited to that, but the first clutch device CL1 may be engaged and the second clutch device CL2 may be disengaged in parallel with that at the synchronous speed, for example.

Moreover, when a gearing type clutch device of an automatic engagement or disengagement type by including au urging member for urging toward engagement or disengagement when the speed difference between the engine speed Ne and the speed Nr2 of the output member 16 is the predetermined speed or less is used, the determination processing of determining whether the speed difference $\Delta N$ between the engine speed Ne and the speed Nr2 of the output member 16 is not larger than the predetermined speed or not at Step S25 may be omitted.

Figure 19:
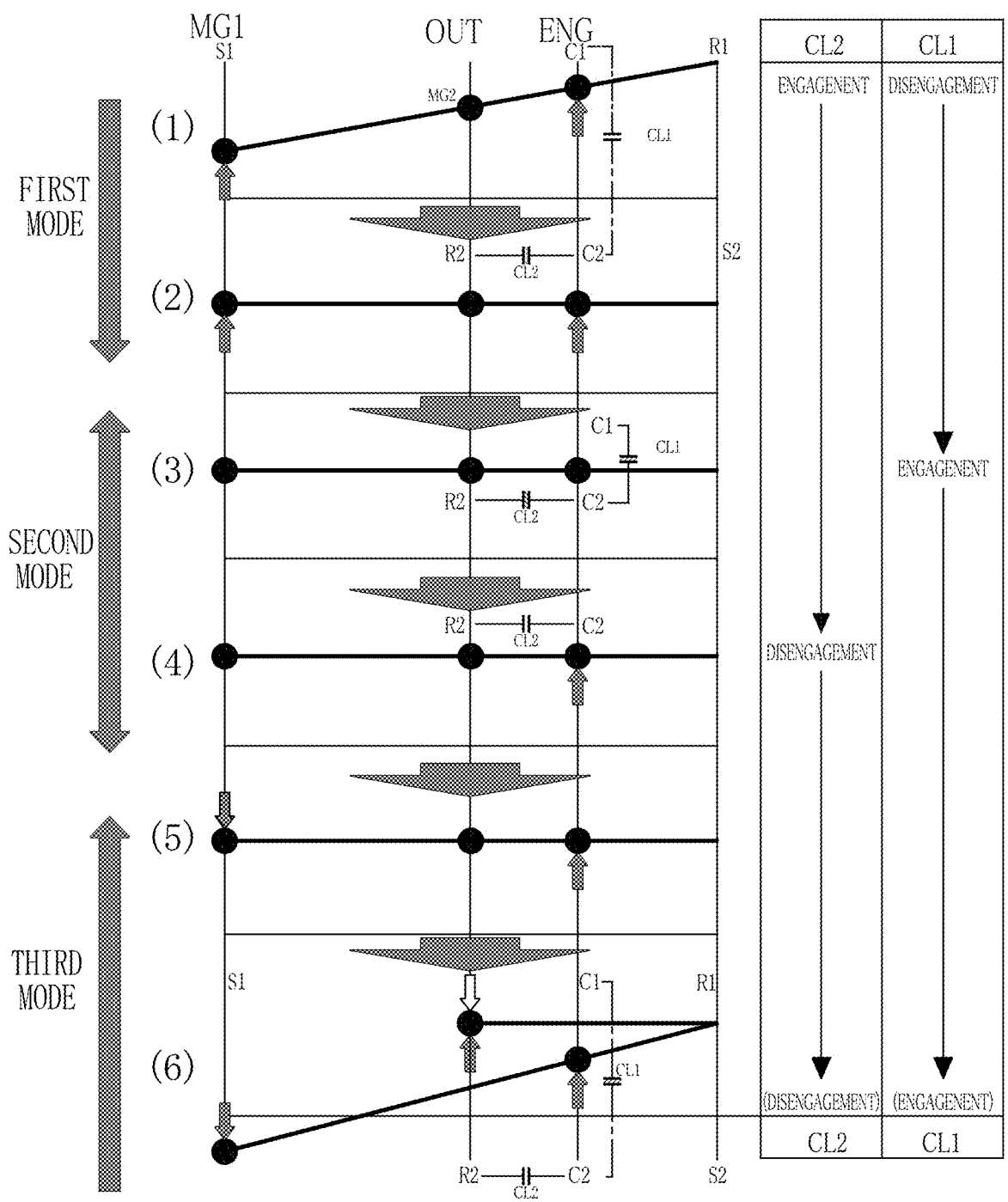
FIG. 19 is an explanatory view showing transition of the nomographic diagram showing the operation state when the first mode is switched to the third mode when the gearing type clutch device is used for the first clutch device CL1 and the second clutch device CL2.

FIG. 19 shows transition of the nomographic diagram representing the operation state when the first mode is switched to the third mode when the gearing type clutch device is used for the first clutch device CL1 and the second clutch device CL2. When the first mode is switched to the third mode, the operation state changes in nomographic diagrams shown in FIG. 19 in the order from a nomographic diagram (1), a nomographic diagram (2), a nomographic diagram (3), a nomographic diagram (4), a nomographic diagram (5), and a nomographic diagram (6) from the upper side. The transition of the operation state shown in FIG. 19 is opposite to the transition of the operation state when the third mode is switched to the first mode shown in FIG. 16 in terms of the order of the nomographic diagrams.

That is, as shown in FIG. 19, the nomographic diagram (1) is a state in the first mode, that is, a state where the first clutch device CL1 is disengaged, and the second clutch device CL2 is engaged. In this state, the speed of the output member 16 is higher than the speed of the output shaft 41 of the engine 11. The first motor 12 outputs the forward torque in the forward rotation and functions as a motor. That is, the running state in the nomographic diagram (1) is a state where the vehicle starts advance running from the stop state, that is, a state where the accelerator pedal is depressed (power-on). In this state, when the operation point of the vehicle crosses the upshift line by using a speed change map with the vehicle speed and the accelerator opening as parameters, upshift is required.

In the nomographic diagram (2), in response to the upshift request, control of increasing the speed of the first motor 12 until the speed difference between the output shaft 41 of the engine 11 and the output member 16 is contained within a predetermined range is executed.

In the nomographic diagram (3), the speed difference between the speed of the output shaft 41 of the engine 11 and the speed of the output member 16 becomes a predetermined rotation umber or less. At this point of time, the first clutch device CL1 on the disengaged side is switched to the engaged state.

In the nomographic diagram (4), by detecting that an absolute value of the speed difference between the engine target speed and the actual engine speed is contained within the predetermined range, the second clutch device CL2 on the engaged side is switched to the disengaged state.

In the operation state in the nomographic diagram (5), when the second clutch device CL2 on the engaged side is disengaged, the operating mode in which the drive unit 10 is set is set to the third mode. As a result, the first motor 12 is reversed from the forward torque to the negative torque, and the first motor 12 is made to function as regeneration.

In the nomographic diagram (6), control in which the speed of the first motor 12 is lowered and the speed of the output shaft 41 of the engine 11 is lowered is executed. In this state, against the running resistance (downward torque), a driving torque in which the forward torque (upward torque) generated by the second motor 13 and the driving torque (upward torque) generated by the engine 11 are added together opposes.

Figure 20:
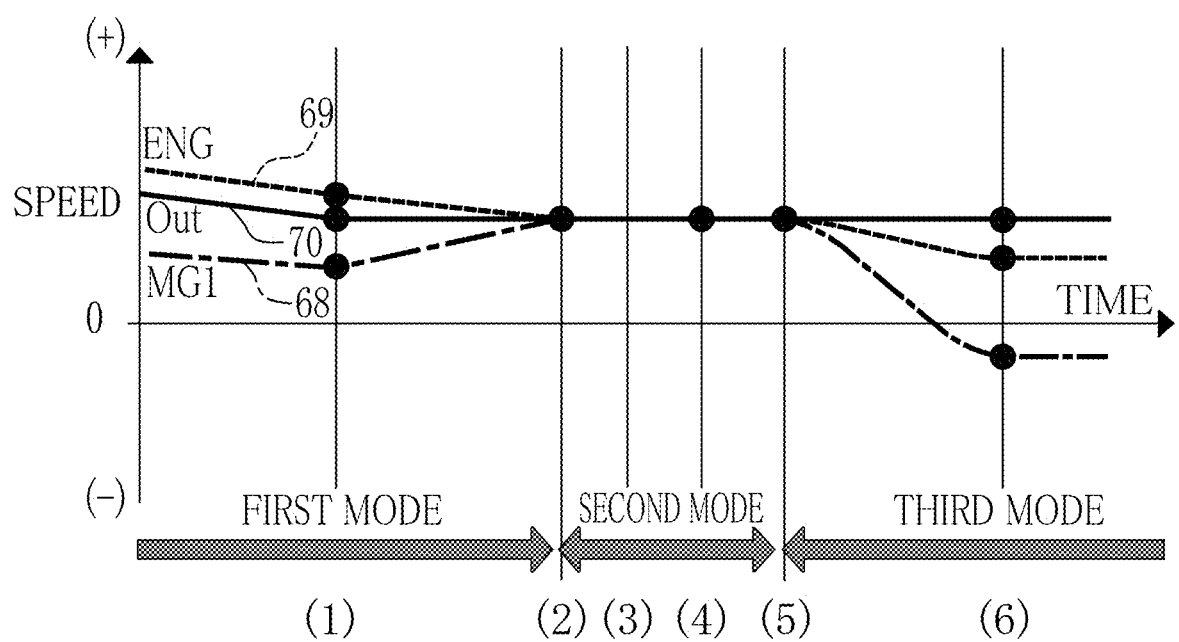
FIG. 20 is an explanatory view showing a change in speeds of the first motor, the engine, and the output member corresponding to transition of the operating mode shown in FIG. 19.

FIG. 20 is an explanatory view showing a change in the speeds of the first motor 12, the engine 11, and the output member 16 corresponding to the transition of the operating mode shown in FIG. 19. The numbers (1) to (6) shown in FIG. 20 correspond to the numbers in the nomographic diagram shown in FIG. 19. Reference numeral 68 denotes the speed of the first motor 12, reference numeral 69 denotes the speed of the output shaft 41 of the engine 11, and reference numeral 70 denotes the speed of the output member 16, respectively.

As shown in FIG. 20, the speeds 68 and 69 of the rotor 43 of the first motor 12 and the output shaft 41 of the engine 11 are controlled so as to get closer to the speed of the output member 16 before the operating mode changes from the first mode to the second mode. Then, when the speed difference between the speed of output member 16 and the speed of the output shaft 41 of the engine 11 becomes a speed not larger than the predetermined speed, that is, when the gear ratio of the complex planetary gear unit 17 gets closer to "1", the first clutch device CL1 is switched to the engaged state and then, the second clutch device CL2 on the engaged side is switched to the disengaged state.

Figure 21:
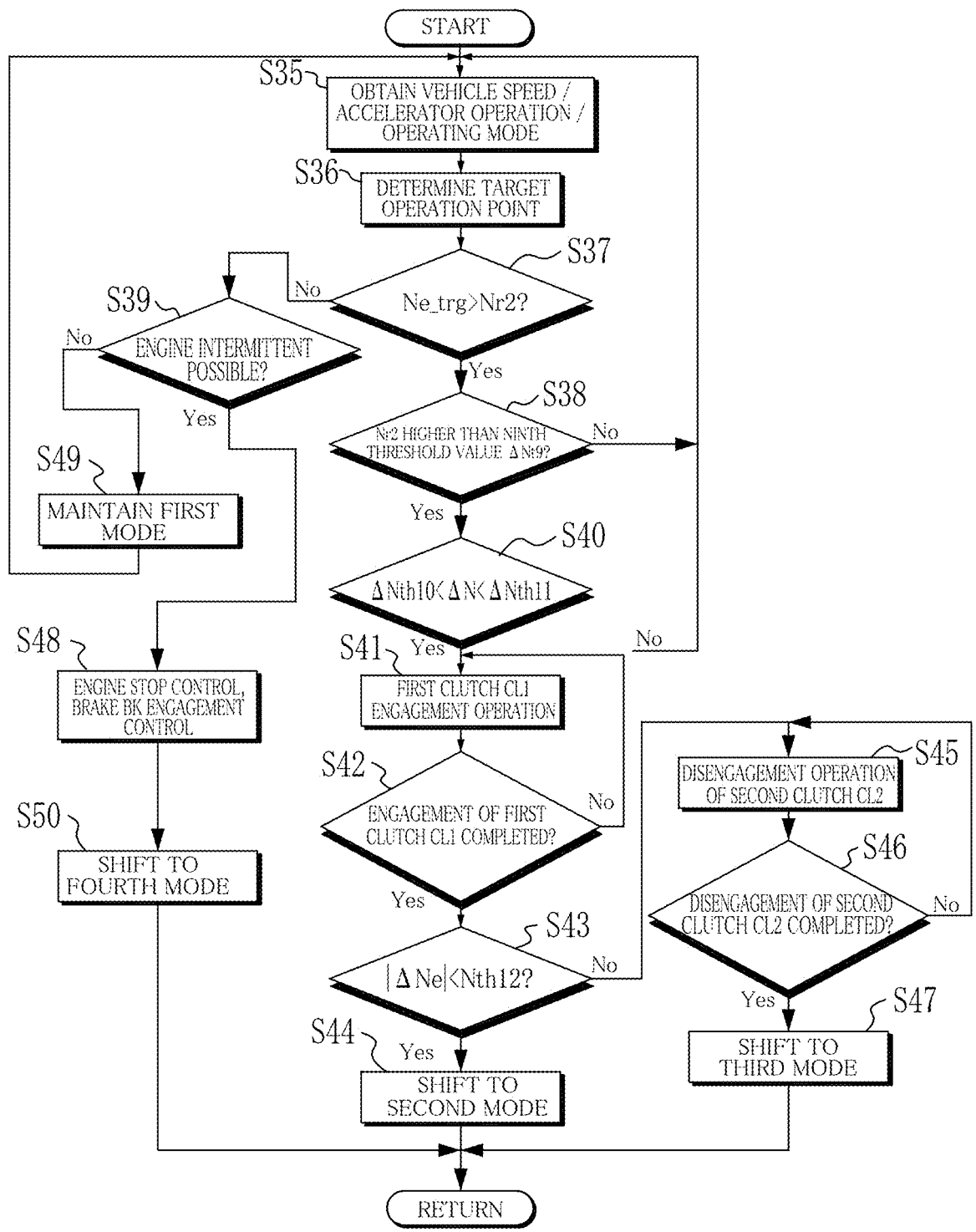
FIG. 21 is a flowchart showing an example of the control procedure of the HV_ECU when the first mode is switched to the third mode shown in FIG. 19.

FIG. 21 shows an example of a control procedure of the HV_ECU22 when the first mode is switched to the third mode shown in FIG. 19. The operation procedure shown in FIG. 21 is an operation procedure when the first clutch device CL1 and the second clutch device CL2 are gearing type clutch devices such as a dog clutch, for example. A flowchart shown in FIG. 18 is repeatedly executed every predetermined time. The operation procedure shown in FIG. 21 has only the engagement operation and the disengagement operation of the first clutch device CL1 and the second clutch device CL2 opposite to the operation procedure shown in FIG. 18, and explanation will be simplified, here.

As shown in FIG. 21, at Step S35, information such as the vehicle speed, the accelerator opening, the current operating mode and the like is collected, and the routine proceeds to Step S36. At Step S36, the target engine operation point is determined on the basis of the accelerator opening and the vehicle speed and then, the routine proceeds to Step S37.

At Step S37, it is determined whether the engine target speed Ne_trg is less than the speed Nr2 of the output member 16 or not. If the engine target speed Ne_trg is less than the speed Nr2 of the output member 16 (in the case of Yes side), the routine proceeds to Step S38, otherwise (in the case of No side), the routine proceeds to Step S39.

At Step S38, it is determined whether the speed Nr2 of the output member 16 is higher than a ninth threshold value ΔNth9 or not. The ninth threshold value ΔNth9 is a threshold value for determining whether the speed Nr2 is higher than the idling speed of the engine 11 or not, for example, and a value according to a vehicle model or the like is determined in advance. If the speed Nr2 of the output member 16 is higher than the ninth threshold value ΔNth9 (in the case of Yes side), the routine proceeds to Step S40, while if not (in the case of No side), the routine returns to Step S35. The ninth threshold value ΔNth9 may be the same value as the fifth threshold value ΔNth5 shown in FIG. 18.

At Step S40, in order to engage the first clutch device CL1 which is a dog clutch, it is determined whether the speed difference ΔN between the engine speed Ne and the speed Nr2 of the output member 16 exceeds a tenth threshold value ΔNth10 and less than an eleventh threshold value ΔNth11, that is, whether the speed difference ΔN is a speed not larger than the predetermined speed or not. If the speed difference ΔN exceeds the tenth threshold value ΔNth10 and less than the eleventh threshold value ΔNth11 (in the case of Yes side), the routine proceeds to Step S41, otherwise (in the case of No side), the routine returns to Step S35. That is, the case where the speed difference ΔN exceeds the tenth threshold value ΔNth10 and less than the eleventh threshold value ΔNth11 corresponds to the operation state in the nomographic diagram (2) shown in FIG. 19. The tenth threshold value ΔNth 10 and the eleventh threshold value ΔNth11 may have the same values as those of the sixth threshold value ΔNth6 and the seventh threshold value ΔNth 7 shown in FIG. 18.

At Step S41, control of switching the first clutch device CL1 to the engaged state is executed, and the routine proceeds to Step S42. The operation state at Step S41 corresponds to the operation state in the nomographic diagram (3) shown in FIG. 19. At Step S42, it is determined whether the switching of the first clutch device CL1 to the engaged state has been completed or not. If it is determined that the switching of the first clutch device CL1 to the engaged state has been completed (in the case of Yes side), the routine proceeds to Step S43, otherwise (in the case of No side), the routine returns to Step S41, and the switching control to the engaged state is continued.

At Step S43, it is determined whether the absolute value of the speed difference ΔNe between the engine target speed Ne_trg and the engine speed Ne is not larger than a twelfth threshold value Nth12 or not. If the absolute value of the differential number ΔNe is not larger than the twelfth threshold value Nth12 (in the case of Yes side), the routine proceeds to Step S44, while if not (in the case of No side), the routine proceeds to Step S45. The eleventh threshold value ΔNth 11 may have the same value as that of the eighth threshold value Nth8 shown in FIG. 18. At Step S44, the second mode is maintained. On the other hand, if the routine proceeds to Step S45, the control of switching the second clutch device CL2 to the disengaged state is executed and then, the routine proceeds to Step S46.

At Step S46, it is determined whether the switching of the second clutch device CL2 to the disengaged state has been completed or not. If it is determined that the switching of the second clutch device CL2 to the disengaged state has been completed (in the case of Yes side), the routine proceeds to Step S47, otherwise (in the case of No side), the routine returns to Step S45, and the switching control to the disengaged state is continued. At Step S47, in response to the completion of the switching of the second clutch device CL2 to the disengaged state, a signal indicating that the transition to the third mode has been completed is transmitted.

On the other hand, if it is determined at Step S37 that the engine target speed Ne_trg is larger than the speed Nr2 of the output member 16, the routine proceeds to Step S39. At Step S39, it is determined whether the engine intermittent operation can be carried out or not. If it is determined that the engine intermittent operation can be carried out (in the case of Yes side), the routine proceeds to Step S48. Otherwise (in the case of No side), the routine proceeds to Step S49, and the first mode is maintained.

At Step S48, in order to proceed to the EV running, control of stopping the operation of the engine 11 is executed and then, control of engaging the brake device BK is executed. After that, the routine proceeds to Step S50. At Step S50, a signal indicating that the transition to the fourth mode shown in FIG. 3 has been completed is transmitted.

Second Embodiment

Figure 22:
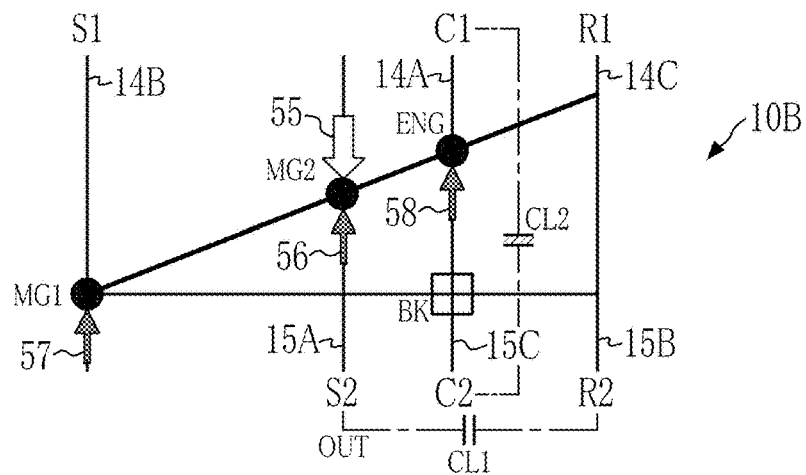
FIG. 22 is a nomographic diagram showing the operation state in a first mode of the drive unit in a second embodiment.

FIG. 22 shows an operation state of the first mode for which a drive unit 10B which is another embodiment of the drive unit 10 shown FIG. 1 is set. The first axis 14A in a nomographic diagram shown in FIG. 22 shows the first carrier C1 to which the output shaft 41 of the engine 11 is connected. The second axis 14B shows the first sun gear S1 to which the rotor 43 of the first motor 12 is connected. The third axis 14C shows the first ring gear R1. The fourth axis 15A shows the second sun gear S2 connected to the output member (OUT) 16. The fifth axis 15B shows the second ring gear R2 to which the first ring gear R1 is connected. The sixth axis 15C shows the second carrier C2.

The drive unit 10B shown in FIG. 22 is different from the drive unit 10A shown in FIG. 2 in a point that the second sun gear S2 of the second planetary gear unit 15 corresponds to the fourth rotary element 28 and the second ring gear R2 corresponds to the fifth rotary element 29, respectively. The remaining second carrier C2 corresponds to the sixth rotary element 30. In the first planetary gear unit 14, the first carrier C1 corresponds to the first rotary element 25, the first sun gear S1 corresponds to the second rotary element 26, and the first ring gear R1 corresponds to the third rotary element 27. Since the nomographic diagram of the drive unit 10B shown in FIG. 22 has arrangement of a vertical axis which is the same as or similar to the nomographic diagram of the drive unit 10A shown in FIG. 2 and detailed description here will be omitted.

The first clutch device CL1 selectively connects the second sun gear S2 and the second ring gear R2. The first clutch device CL1 in this embodiment is an example of the first engagement device selectively connecting the fourth rotary element 28 and the fifth rotary element 29. The second clutch device CL2 selectively connects the first carrier C1 and the second carrier C2. The brake device BK selectively connects the first carrier C1 (or the input shaft 42) and the fixed member 32.

The first mode in which the drive unit 10B shown in FIG. 22 is set is set by disengaging the first clutch device CL1 and the brake device BK and by engaging the second clutch device CL2. Since the operation state of the first mode is the same as or similar to the action of the operation state of the first mode shown in FIG. 4, detailed description here will be omitted. Moreover, for the drive unit 10B shown in FIG. 22, a mode which is the same as or similar to each of the second mode to the fifth mode shown in FIGS. 5 to 8 can be set other than the first mode.

Third Embodiment

Figure 23:
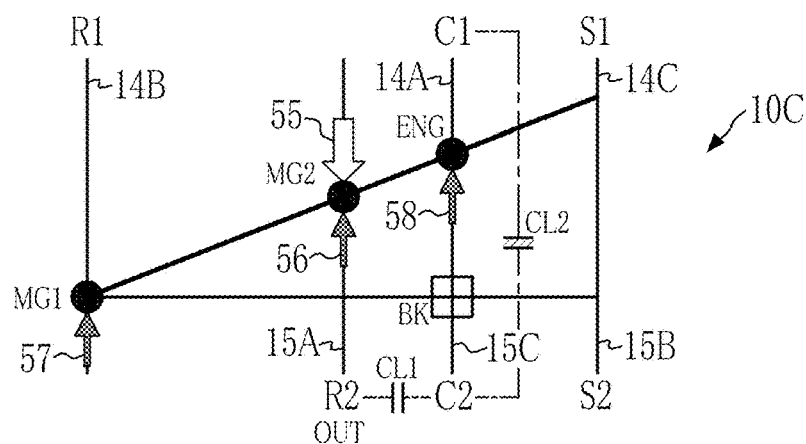
FIG. 23 is a nomographic diagram showing the operation state in the first mode of the drive unit in a third embodiment.

FIG. 23 shows an operation state of the first mode for which a drive unit 10C which is another embodiment of the drive unit 10 shown in FIG. 1 is set. A nomographic diagram of the drive unit 10C shown in FIG. 23 has arrangement of vertical axes 14A to 14C and 15A to 15C which is the same as or similar to that in the nomographic diagram of the drive unit 10A shown in FIG. 2. The drive unit 10C is different from the nomographic diagram of the drive unit 10A shown in FIG. 2 in a point that the second axis 14B represents the first ring gear R1 and the third axis 14C for the first sun gear S1. The remaining fourth axis 15A represents the second ring gear R2, the fifth axis 15B for the second sun gear S2, the first axis 14A for the first carrier C1, and the sixth axis 15C for the second carrier C2.

That is, the drive unit 10C shown in FIG. 23 is different from the drive unit 10A shown in FIG. 2 in a point that the first ring gear R1 corresponds to the second rotary element 26, and the first sun gear S1 to the third rotary element 27. The remaining first carrier C1 corresponds to the first rotary element 25, the second ring gear R2 to the fourth rotary element 28, the second sun gear S2 to the fifth rotary element 29, and the second carrier C2 to the sixth rotary element 30.

The first clutch device CL1 selectively connects the second ring gear R2 and the second carrier C2. The second clutch device CL2 selectively connects the first carrier C1 and the second carrier C2. The brake device BK selectively connects the first carrier C1 (or the input shaft 42) and the fixed member 32.

As shown in FIG. 23, the first mode in which the drive unit 10C is set is set by disengaging the first clutch device CL1 and the brake device BK and by engaging the second clutch device CL2. Since the operation state of the first mode is the same as or similar to the operation state of the first mode shown in FIG. 4, detailed description here will be omitted. Moreover, for the drive unit 10C shown in FIG. 23, a mode which is the same as or similar to each of the second mode to the fifth mode shown in FIGS. 5 to 8 can be set other than the first mode.

Fourth Embodiment

Figure 24:
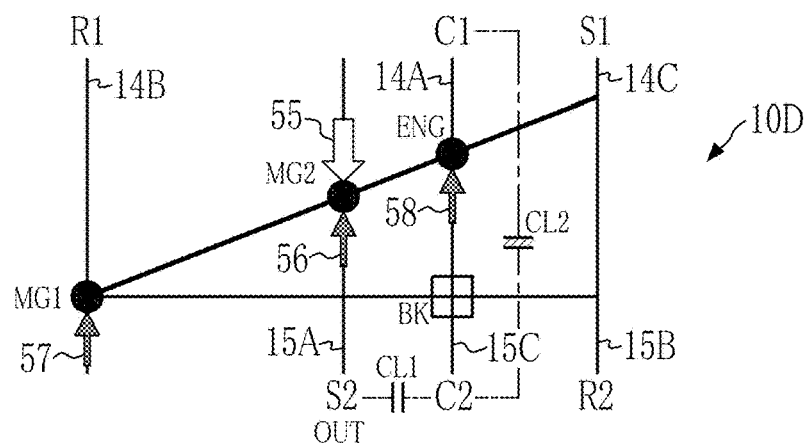
FIG. 24 is a nomographic diagram showing the operation state in the first mode of the drive unit in a fourth embodiment.

FIG. 24 shows an operation state of the first mode for which a drive unit 10D which is another embodiment of the drive unit 10 shown in FIG. 1 is set. A nomographic diagram of the drive unit 10D shown in FIG. 24 has arrangement of vertical axes 14A to 14C and 15A to 15C which is the same as or similar to that in the nomographic diagram of the drive unit 10A shown in FIG. 2. The drive unit 10D is different from the nomographic diagram of the drive unit 10A shown in FIG. 2 in a point that the second axis 14B represents the first ring gear R1, the third axis 14C for the first sun gear S1, the fourth axis 15A for the second sun gear S2, and the fifth axis 15B for the second ring gear R2. The remaining first axis 14A represents the first carrier C1 and the sixth axis 15C for the second carrier C2.

That is, the drive unit 10D shown in FIG. 24 is different from the drive unit 10A shown in FIG. 2 in a point that the first ring gear R1 corresponds to the second rotary element 26, the first sun gear S1 to the third rotary element 27, the second ring gear R2 to the fourth rotary element 28, and the second sun gear S2 to the fifth rotary element 29. The remaining first carrier C1 corresponds to the first rotary element 25, and the second carrier C2 to the sixth rotary element 30.

The first clutch device CL1 selectively connects the second sun gear S2 and the second carrier C2. The second clutch device CL2 selectively connects the first carrier C1 and the second carrier C2. The brake device BK selectively connects the first carrier C1 (or the input shaft 42) and the fixed member 32.

As shown in FIG. 24, the first mode in which the drive unit 10D is set is set by disengaging the first clutch device CL1 and the brake device BK and by engaging the second clutch device CL2. Since the operation state of the first mode is the same as or similar to the action of the operation state of the first mode shown in FIG. 4, detailed description where will be omitted. Moreover, for the drive unit 10D shown in FIG. 24, a mode which is the same as or similar to each of the second mode to the fifth mode shown in FIGS. 5 to 8 can be set other than the first mode.

Fifth Embodiment

FIG. 25 shows an operation state of the first mode for which a drive unit 10E which is another embodiment of the drive unit 10 shown in FIG. 1 is set. A nomographic diagram of the drive unit 10E shown in FIG. 25 has constitution in which the third axis 14C is arranged between the second axis 14B located on the leftmost side in the figure and the first axis 14A on the right side, and the fifth axis 15B is overlapped with the third axis 14C, the sixth axis 15C with the first axis 14A, respectively, and the fourth axis 15A is arranged on the right side of the first axis 14A. In the drive unit 10E, the first axis 14A represents the first ring gear R1, the second axis 14B represents the first sun gear S1, the third axis 14C for the first carrier C1, the fourth axis 15A for the second ring gear R2, the fifth axis 15B for the second sun gear S2, and the sixth axis 15C for the second carrier C2.

That is, in the drive unit 10E shown in FIG. 25, the first ring gear R1 corresponds to the first rotary element 25, the first sun gear S1 to the second rotary element 26, the first carrier C1 to the third rotary element 27, the second ring gear R2 to the fourth rotary element 28, the second sun gear S2 to the fifth rotary element 29, and the second carrier C2 to the sixth rotary element 30.

The first clutch device CL1 selectively connects the second sun gear S2 and the second carrier C2. The first clutch device CL1 in this embodiment is an example of the first engagement device for selectively connecting the fifth rotary element 29 and the sixth rotary element 30. The second clutch device CL2 selectively connects the first ring gear R1 and the second carrier C2. The brake device BK selectively connects the first ring gear R1 (or the input shaft 42) and the fixed member 32.

As shown in FIG. 25, the first mode in which the drive unit 10E is set is set by disengaging the second clutch device CL2 and the brake device BK and by engaging the first clutch device CL1.

FIG. 26 shows an example of an operating mode for which the drive unit 10E shown in FIG. 25 is set. As shown in FIG. 26, the operating mode for which the drive unit 10E is set includes the first mode to the fifth mode the same as or similarly to the description in FIG. 3. The engagement state of each of the clutch devices CL1 and CL2 for setting each mode from the first mode to the fifth mode as shown in FIG. 26 is such that the states shown in FIG. 3 are switched. That is, the engagement state of the operating mode shown in FIG. 26 is such that engagement of the first clutch device CL1 shown in FIG. 3 is switched to disengagement and the disengagement to the engagement, and the engagement of the second clutch device CL2 to the disengagement and the disengagement to the engagement.

An operation state of the first mode is such that the second planetary gear unit 15 is integrally rotated by engagement of the first clutch device CL1. The second sun gear S2 is rotated integrally with the first carrier C1. A line representing the first planetary gear unit 14 has the first carrier C1 as an output element, the first ring gear R1 into which the driving force generated by the engine 11 is input as an input element, and the first sun gear S1 as a reaction element. The first motor 12 is controlled so that the reaction torque is input into the first sun gear S1. In this first mode, since the speed of the output member 16 is lower than the speed of the output shaft 41 of the engine 11, a low (under-drive) mode gear position is set.

FIG. 27 shows an operation state of the second mode for which the drive unit 10E shown in FIG. 25 is set. As shown in FIG. 27, the second mode for which the drive unit 10E is set is set by engaging the first clutch device CL1 and the second clutch device CL2 and by disengaging the brake device BK. Since the operation state of the second mode is substantially the same as or similar to the action of the operation state of the second mode shown in FIG. 5, detailed description here will be omitted.

Figure 28:
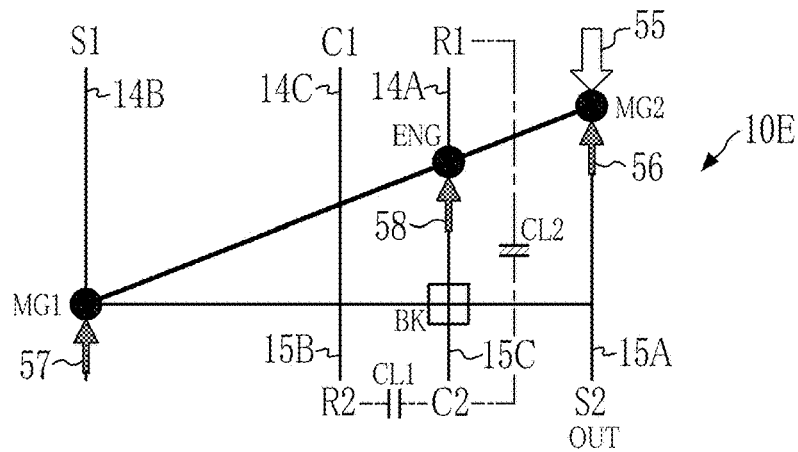
FIG. 28 is a nomographic diagram showing the operation state in a third mode of the drive unit shown in FIG. 25.

FIG. 28 shows an operation state of the third mode for which the drive unit 10E shown in FIG. 25 is set. As shown in FIG. 28, the third mode for which the drive unit 10E is set is set by disengaging the first clutch device CL1 and the brake device BK and by engaging the second clutch device CL2. The third mode shown in FIG. 28 is the HV mode for running by using the driving force obtained by adding the driving force generated by the engine 11 and the driving force generated by the second motor 13 which is the same as or similar to the third mode described in FIG. 6. Between the first planetary gear unit 14 and the second planetary gear unit 15, in addition to the connection between the first ring gear R1 and the second sun gear S2, engagement of the second clutch device CL2 brings the first carrier C1 and the second carrier C2 into a connected state. As a result, FIG. 28 becomes a nomographic diagram in which lines representing the speeds of the three rotary elements constituting the first planetary gear unit 14 and lines representing the speeds of the three rotary elements constituting the second planetary gear unit 15 are overlapped with each other. In this third mode, since the speed of the output member 16 is higher than the speed of the output shaft 41 of the engine 11, a high (over-drive) mode gear position is set. For the drive unit 10E shown in FIG. 28, a mode which is the same as or similar to the fourth mode and the fifth mode shown in FIGS. 7 to 8 can be set other than the first mode to the third mode.

Sixth Embodiment

Figure 29:
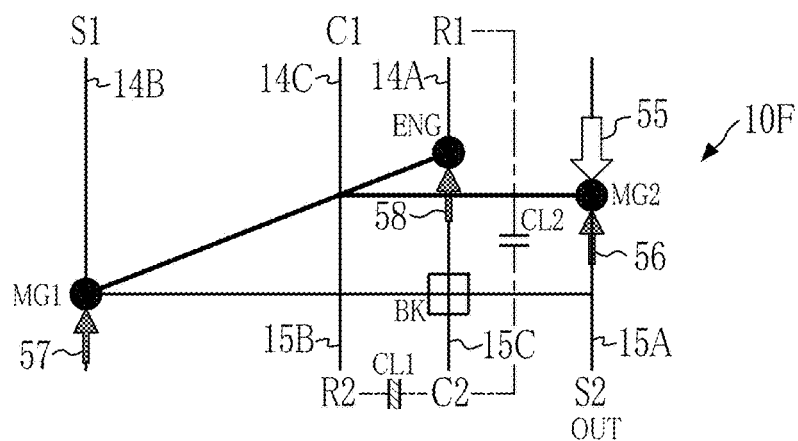
FIG. 29 is a nomographic diagram showing the operation state in the first mode of the drive unit in a sixth embodiment.

FIG. 29 shows an operation state of the first mode for which a drive unit 10F which is another embodiment of the drive unit 10 shown in FIG. 1 is set. A nomographic diagram of the drive unit 10F shown in FIG. 29 has arrangement of vertical axes 14A to 14C and 15A to 15C which is the same as or similar to that in the nomographic diagram of the drive unit 10E shown in FIG. 25. The drive unit 10F is different from the nomographic diagram of the drive unit 10E shown in FIG. 25 in a point that the fourth axis 15A represents the second sun gear S2 and the fifth axis 15B for the second ring gear R2. That is, the drive unit 10F shown in FIG. 29 is different from the drive unit 10E shown in FIG. 25 in a point that the second sun gear S2 corresponds to the fourth rotary element 28 and the second ring gear R2 to the fifth rotary element 29.

Since the engagement operation of the operating mode for which the drive unit 10F is set is similar to or the same as the engagement operation described in FIG. 26, detailed description here will be omitted. The first clutch device CL1 selectively connects the second ring gear R2 and the second carrier C2. The second clutch device CL2 selectively connects the first ring gear R1 and the second carrier C2. The brake device BK selectively connects the first ring gear R1 (or the input shaft 42) and the fixed member 32.

As shown in FIG. 29, the first mode for which the drive unit 10F is set is set by disengaging the second clutch device CL2 and the brake device BK and by engaging the first clutch device CL1. Since the operation state of the first mode is the same as or similar to the action of the operation state of the first mode shown in FIG. 25, detailed description here will be omitted. Moreover, for the drive unit 10F shown in FIG. 29, a mode which is the same as or similar to each of the second mode to the fifth mode shown in FIGS. 5 to 8 can be set other than the first mode.

Seventh Embodiment

Figure 30:
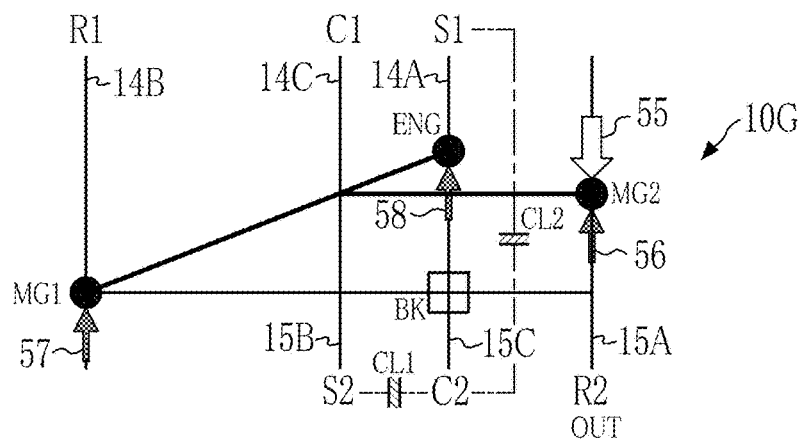
FIG. 30 is a nomographic diagram showing the operation state in the first mode of the drive unit in a seventh embodiment.

FIG. 30 shows an operation state of the first mode for which a drive unit 10G which is another embodiment of the drive unit 10 shown in FIG. 1 is set. A nomographic diagram of the drive unit 10G shown in FIG. 30 has arrangement of vertical axes 14A to 14C and 15A to 15C which is the same as or similar to that in the nomographic diagram of the drive unit 10E shown in FIG. 25. The drive unit 10G is different from the nomographic diagram of the drive unit 10E shown in FIG. 25 in a point that the first axis 14A represents the first sun gear S1 and the second axis 14B for the first ring gear R1. That is, the drive unit 10G shown in FIG. 30 is different from the drive unit 10E shown in FIG. 25 in a point that the first sun gear S1 corresponds to the first rotary element 25 and the first ring gear R1 to the second rotary element 26.

Since the engagement operation of the operating mode for which the drive unit 10G is set is the same as or similar to the engagement operation described in FIG. 26, detailed description here will be omitted. The first clutch device CL1 selectively connects the second sun gear S2 and the second carrier C2. The second clutch device CL2 selectively connects the first sun gear S1 and the second carrier C2. The brake device BK selectively connects the first sun gear S1 (or the input shaft 42) and the fixed member 32.

As shown in FIG. 30, the first mode for which the drive unit 10G is set is set by disengaging the second clutch device CL2 and the brake device BK and by engaging the first clutch device CL1. Since the operation state of the first mode is the same as or similar to the action of the operation state of the first mode shown in FIG. 25, detailed description here will be omitted. Moreover, for the drive unit 10G shown in FIG. 30, a mode which is the same as or similar to each of the second mode to the fifth mode shown in FIGS. 5 to 8 can be set other than the first mode.

Eighth Embodiment

Figure 31:
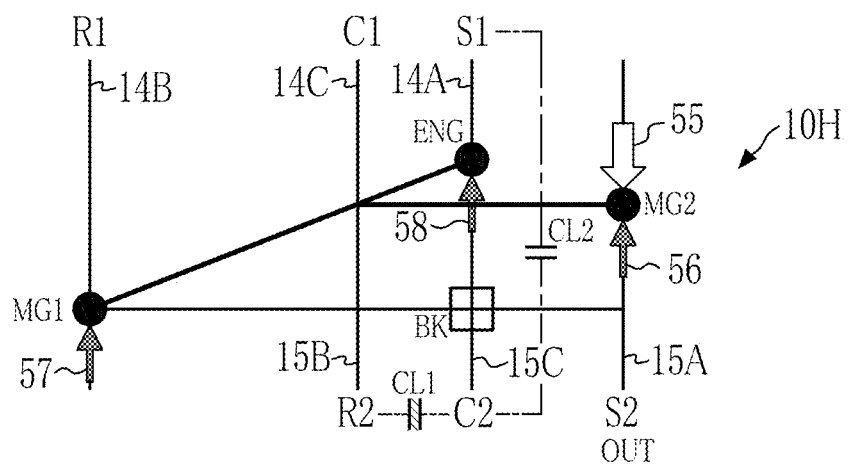
FIG. 31 is a nomographic diagram showing the operation state in the first mode of the drive unit in an eighth embodiment.

FIG. 31 shows an operation state of the first mode for which a drive unit 10H which is another embodiment of the drive unit 10 shown in FIG. 1 is set. A nomographic diagram of the drive unit 10H shown in FIG. 31 has arrangement of vertical axes 14A to 14C and 15A to 15C which is the same as or similar to that in the nomographic diagram of the drive unit 10E shown in FIG. 25. The drive unit 10H is different from the nomographic diagram of the drive unit 10E shown in FIG. 25 in a point that the first axis 14A represents the first sun gear S1, the second axis 14B for the first ring gear R1, the fourth axis 15A for the second sun gear S2, and the fifth axis 15B for the second ring gear R2. That is, the drive unit 10H shown in FIG. 31 is different from the drive unit 10E shown in FIG. 25 in a point that the first sun gear S1 corresponds to the first rotary element 25, the first ring gear R1 to the second rotary element 26, the second sun gear S2 to the fifth rotary element 29, and the second ring gear R2 to the fourth rotary element 28.

Since the engagement operation of the operating mode for which the drive unit 10H is set is the same as or similar to the engagement operation described in FIG. 26, detailed description here will be omitted. The first clutch device CL1 selectively connects the second ring gear R2 and the second carrier C2. The second clutch device CL2 selectively connects the first sun gear S1 and the second carrier C2. The brake device BK selectively connects the first sun gear S1 (or the input shaft 42) and the fixed member 32.

As shown in FIG. 31, the first mode for which the drive unit 10H is set is set by disengaging the second clutch device CL2 and the brake device BK and by engaging the first clutch device CL1. Since the operation state of the first mode is the same as or similar to the action of the operation state of the first mode shown in FIG. 25, detailed description here will be omitted. Moreover, for the drive unit 10H shown in FIG. 31, a mode which is the same as or similar to each of the second mode to the fifth mode shown in FIGS. 5 to 8 can be set other than the first mode.

Figure 32:
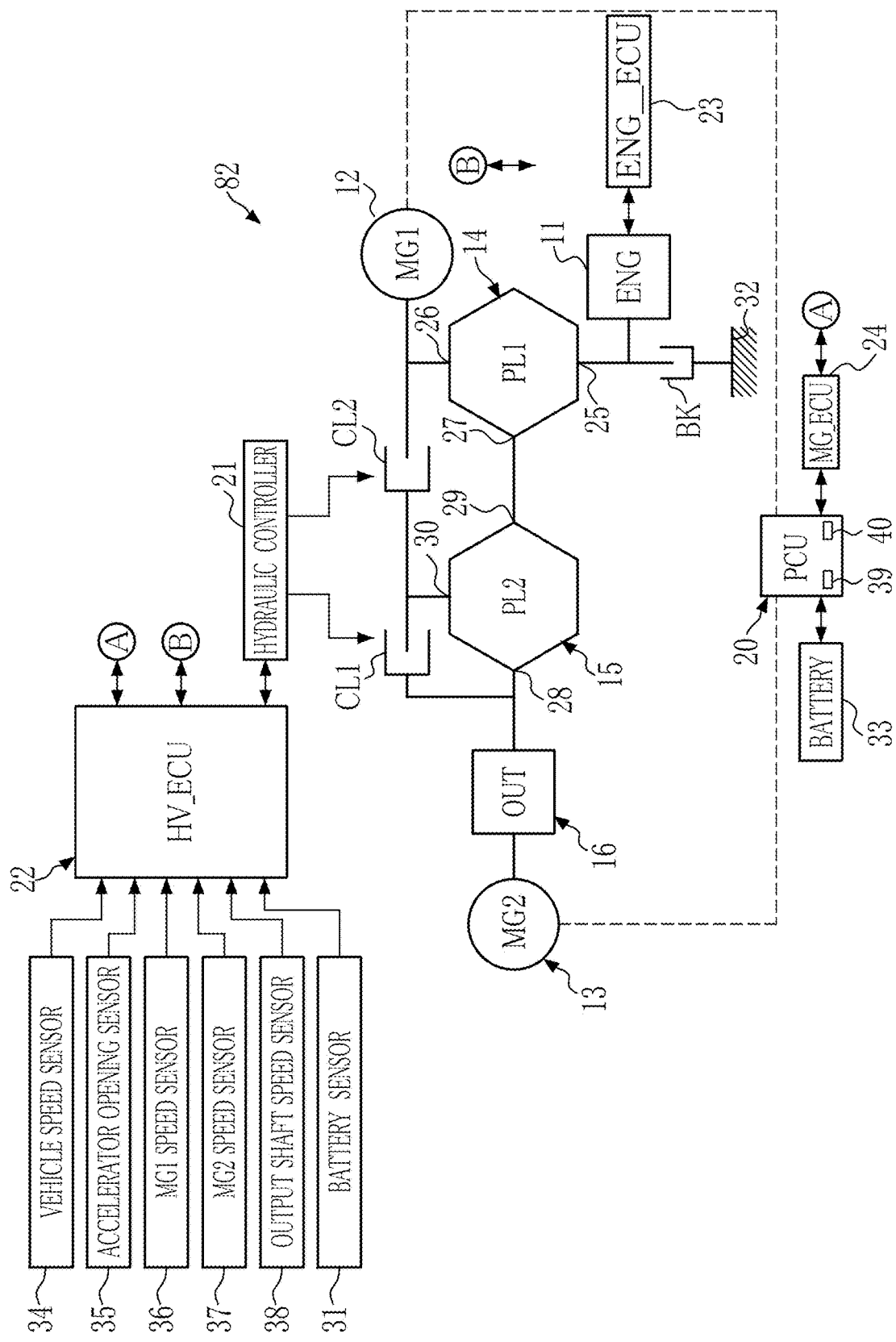
FIG. 32 is an explanatory view conceptually showing the drive unit of another embodiment of the present disclosure.

FIG. 32 conceptually shows a drive unit 82 of another embodiment of the present disclosure. As shown in FIG. 32, the drive unit 82 is different from the drive unit 10 shown in FIG. 1 in a point that the second clutch device CL2 selectively connects the second rotary element 26 and the sixth rotary element 30. In FIG. 32, the same reference numerals are given to members which are the same as or similar to those described in the drive unit 10 shown in FIG. 1, and detailed description here will be omitted.

Ninth Embodiment

Figure 33:
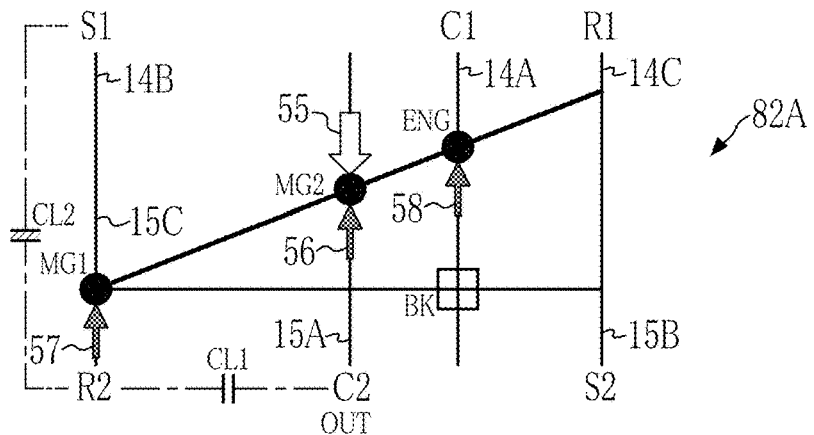
FIG. 33 is a nomographic diagram showing the operation state in the first mode of the drive unit in a ninth embodiment.

FIG. 33 shows the first mode for which a drive unit 82A which is a further embodied example of the drive unit 82 shown in FIG. 32 is set. In the dive unit 82A shown in FIG. 33, the first carrier C1 corresponds to the first rotary element 25, the first sun gear S1 to the second rotary element 26, and the first ring gear R1 to the third rotary element 27. In the second planetary gear unit 15, the second carrier C2 corresponds to the fourth rotary element 28, the second sun gear S2 to the fifth rotary element 29, and the second ring gear R2 to the sixth rotary element 30. The drive unit 82A is constituted on the nomographic diagram such that the second axis 14B indicating the first sun gear S1, the fourth axis 15A indicating the second carrier C2, the first axis 14A indicating the first carrier C1, and the third axis 14C indicating the first ring gear R1 or the fifth axis 15B indicating the second sun gear S2 are aligned in this order.

Since the operating mode for which the drive unit 82A is set is the same as or similar to the first mode to the fifth mode shown in FIG. 3, for example, and the engagement operations of the first clutch device CL1, the second clutch device CL2, and the brake device BK for which the first mode to the fifth mode are set are also the same as or similar to that shown in FIG. 3, detailed description here will be omitted.

The first clutch device CL1 selectively connects the second ring gear R2 and the second carrier C2. The second clutch device CL2 selectively connects the first sun gear S1 and the second ring gear R2. The brake device BK selectively connects the first carrier C1 (or the input shaft 42) and the fixed member 32. The operation state of the first mode shown in FIG. 33 is substantially the same as or similar to the first mode shown in FIG. 4. That is, the first mode for which the drive unit 82A is set is set by disengaging the first clutch device CL1, by engaging the second clutch device CL2, and by disengaging the brake device BK. The first mode has a nomographic diagram in which the sixth axis 15C is overlapped with the second axis 14B by engaging the second clutch device CL2.

Figure 34:
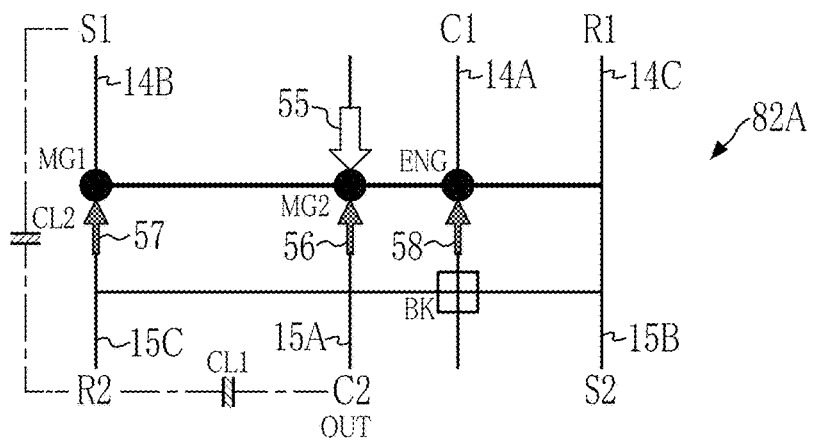
FIG. 34 is a nomographic diagram showing the operation state in a second mode of the drive unit shown in FIG. 33.

FIG. 34 shows an operation state of the second mode for which the drive unit 82A shown in FIG. 33 is set. Since the second mode shown in FIG. 34 is substantially the same as or similar to the second mode shown in FIG. 5, detailed description here will be omitted.

Figure 35:
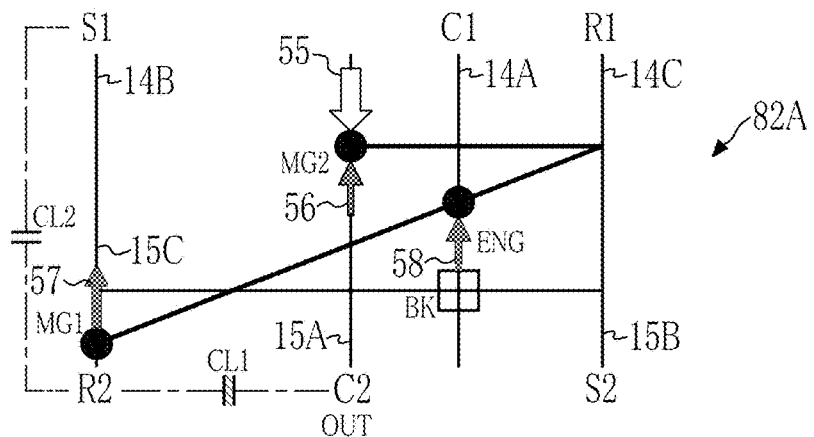
FIG. 35 is a nomographic diagram showing the operation state in a third mode of the drive unit shown in FIG. 33.

FIG. 35 shows an operation state of the third mode for which the drive unit 82A shown in FIG. 33 is set. Since the third mode shown in FIG. 35 is substantially the same as or similar to the third mode shown in FIG. 6, detailed description here will be omitted.

Figure 36:
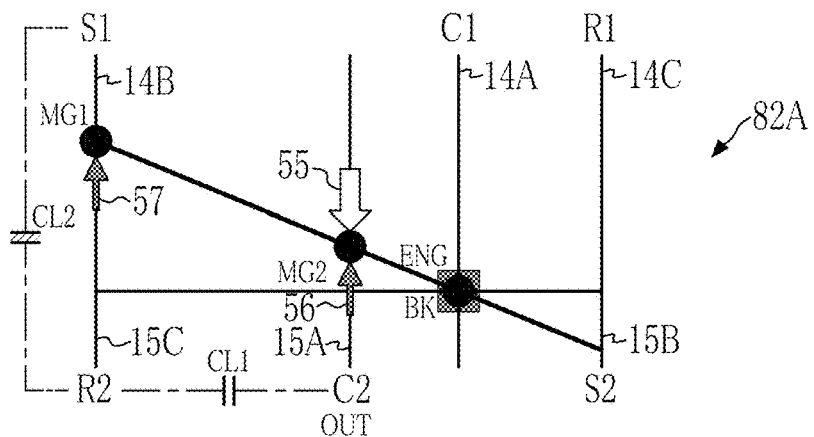
FIG. 36 is a nomographic diagram showing the operation state in a fourth mode of the drive unit shown in FIG. 33.

FIG. 36 shows an operation state of the fourth mode for which the drive unit 82A shown in FIG. 33 is set. Since the fourth mode shown in FIG. 36 is substantially the same as or similar to the fourth mode shown in FIG. 7, detailed description here will be omitted.

Figure 37:
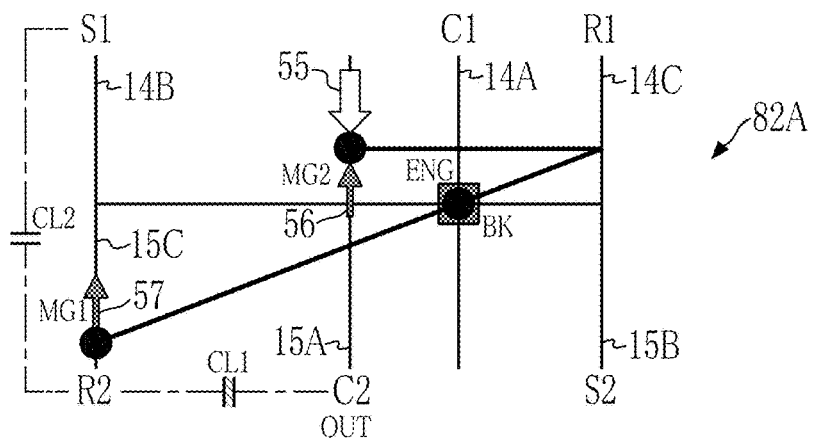
FIG. 37 is a nomographic diagram showing the operation state in a fifth mode of the drive unit shown in FIG. 33.

FIG. 37 shows an operation state of the fifth mode for which the drive unit 82A shown in FIG. 33 is set. Since the fourth mode shown in FIG. 37 is substantially the same as or similar to the fifth mode shown in FIG. 8, detailed description here will be omitted.

Tenth Embodiment

Figure 38:
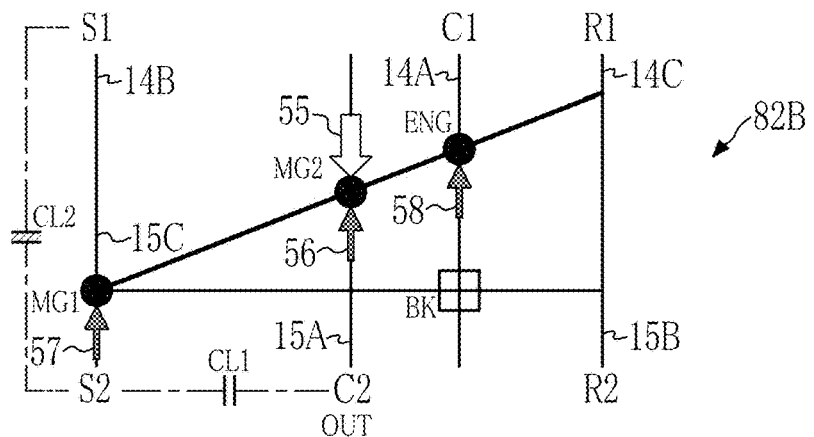
FIG. 38 is a nomographic diagram showing the operation state in the first mode of the drive unit in a tenth embodiment.

FIG. 38 shows an operation state of the first mode for which a drive unit 82B which is another embodiment of the drive unit 82 shown in FIG. 32 is set. A nomographic diagram of the drive unit 82B shown in FIG. 38 has arrangement of vertical axes 14A to 14C and 15A to 15C which is the same as or similar to that in the nomographic diagram of the drive unit 82A shown in FIG. 33. The drive unit 82B is different from the nomographic diagram of the drive unit 82A shown in FIG. 33 in a point that the fifth axis 15B represents the second ring gear R2 and the sixth axis 15C represents the second sun gear S2. That is, the drive unit 82B is different from the drive unit 82A shown in FIG. 33 in a point that the second ring gear R2 corresponds to the fifth rotary element 29 and the second sun gear S2 to the sixth rotary element 30.

The engagement operation of the operating mode for which the drive unit 82B is set is the same as the operation states of the first clutch device CL1 and the second clutch device CL2 shown in FIG. 3. The first clutch device CL1 selectively connects the second sun gear S2 and the second carrier C2. The second clutch device CL2 selectively connects the first sun gear S1 and the second sun gear S2. The brake device BK selectively connects the first carrier C1 (or the input shaft 42) and the fixed member 32.

As shown in FIG. 38, the first mode for which the drive unit 82B is set is set by disengaging the first clutch device CL1 and the brake device BK and by engaging the second clutch device CL2. Since the operation state of the first mode shown in FIG. 38 is the same as or similar to the action of the operation state of the first mode shown in FIG. 33, detailed description here will be omitted. Moreover, for the drive unit 82B shown in FIG. 38, a mode which is the same as or similar to each of the second mode to the fifth mode shown in FIGS. 34 to 37 can be set other than the first mode.

Eleventh Embodiment

Figure 39:
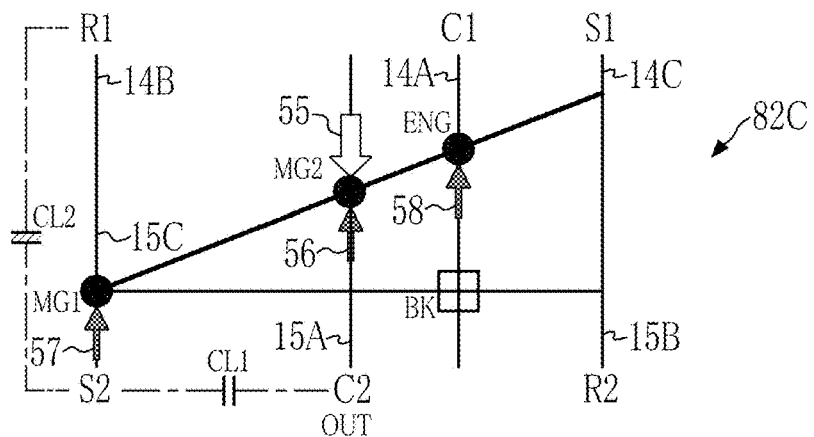
FIG. 39 is a nomographic diagram showing the operation state in the first mode of the drive unit in an eleventh embodiment.

FIG. 39 shows an operation state of the first mode for which a drive unit 82C which is another embodiment of the drive unit 82 shown in FIG. 32 is set. A nomographic diagram of the drive unit 82C shown in FIG. 39 has arrangement of vertical axes 14A to 14C and 15A to 15C which is the same as or similar to that in the nomographic diagram of the drive unit 82A shown in FIG. 33. The drive unit 82C is different from the nomographic diagram of the drive unit 82A shown in FIG. 33 in a point that the second axis 14B represents the first ring gear R1, the third axis 14C represents the first sun gear S1, the fifth axis 15B for the second ring gear R2, and the sixth axis 15C for the second sun gear S2. That is, the drive unit 82C is different from the drive unit 82A shown in FIG. 33 in a point that the first ring gear R1 corresponds to the second rotary element 26, the first sun gear S1 to the third rotary element 27, the second ring gear R2 to the fifth rotary element 29, and the second sun gear S2 to the sixth rotary element 30.

The engagement operation of the operating mode for which the drive unit 82C is set is the same as the operation states of the first clutch device CL1 and the second clutch device CL2 shown in FIG. 3. The first clutch device CL1 selectively connects the second sun gear S2 and the second carrier C2. The second clutch device CL2 selectively connects the first ring gear R1 and the second sun gear S2. The brake device BK selectively connects the first carrier C1 (or the input shaft 42) and the fixed member 32.

As shown in FIG. 39, the first mode for which the drive unit 82C is set is set by disengaging the first clutch device CL1 and the brake device BK and by engaging the second clutch device CL2. Since the operation state of the first mode shown in FIG. 39 is the same as or similar to the action of the operation state of the first mode shown in FIG. 33, detailed description here will be omitted. Moreover, for the drive unit 82C shown in FIG. 39, a mode which is the same as or similar to each of the second mode to the fifth mode shown in FIGS. 34 to 37 can be set other than the first mode.

Twelfth Embodiment

Figure 40:
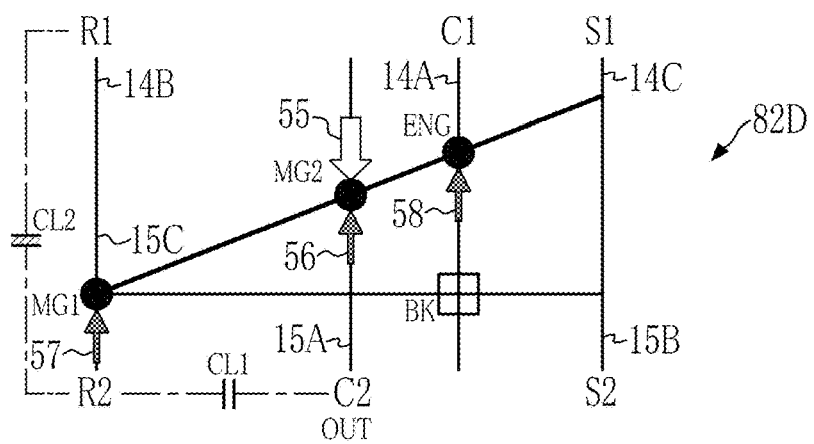
FIG. 40 is a nomographic diagram showing the operation state in the first mode of the drive unit in a twelfth embodiment.

FIG. 40 shows an operation state of the first mode for which a drive unit 82D which is another embodiment of the drive unit 82 shown in FIG. 32 is set. A nomographic diagram of the drive unit 82D shown in FIG. 40 has arrangement of vertical axes 14A to 14C and 15A to 15C which is the same as or similar to that in the nomographic diagram of the drive unit 82A shown in FIG. 33. The drive unit 82D is different from the nomographic diagram of the drive unit 82A shown in FIG. 33 in a point that the second axis 14B represents the first ring gear R1 and the third axis 14C represents the first sun gear S1. That is, the drive unit 82D is different from the drive unit 82A shown in FIG. 33 in a point that the first ring gear R1 corresponds to the second rotary element 26 and the first sun gear S1 to the third rotary element 27.

The engagement operation of the operating mode for which the drive unit 82D is set is the same as the operation states of the first clutch device CL1 and the second clutch device CL2 shown in FIG. 3. The first clutch device CL1 selectively connects the second ring gear R2 and the second carrier C2. The second clutch device CL2 selectively connects the first ring gear R1 and the second ring gear R2. The brake device BK selectively connects the first carrier C1 (or the input shaft 42) and the fixed member 32.

As shown in FIG. 40, the first mode for which the drive unit 82D is set is set by disengaging the first clutch device CL1 and the brake device BK and by engaging the second clutch device CL2. Since the operation state of the first mode shown in FIG. 40 is the same as or similar to the action of the operation state of the first mode shown in FIG. 33, detailed description here will be omitted. Moreover, for the drive unit 82D shown in FIG. 40, a mode which is the same as or similar to each of the second mode to the fifth mode shown in FIGS. 34 to 37 can be set other than the first mode.

Thirteenth Embodiment

Figure 41:
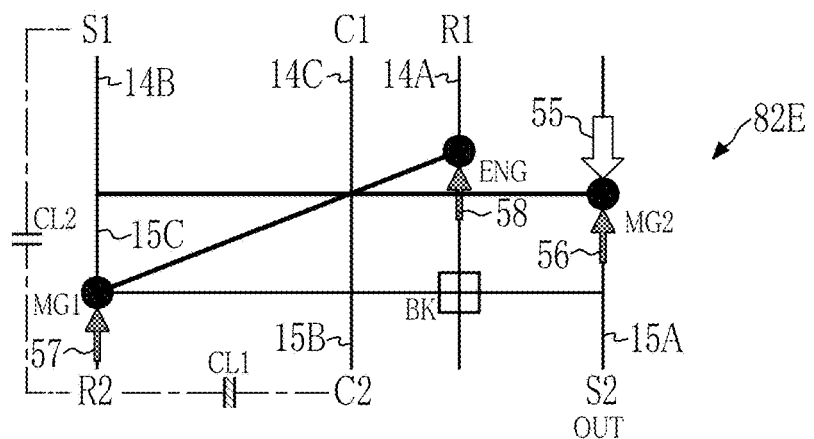
FIG. 41 is a nomographic diagram showing the operation state in the first mode of the drive unit in a thirteenth embodiment.

FIG. 41 shows an operation state of the first mode for which a drive unit 82E which is another embodiment of the drive unit 82 shown in FIG. 32 is set. In a nomographic diagram of the drive unit 82E shown in FIG. 41, the third axis 14C is arranged between the second axis 14B arranged on the left side in the figure and the first axis 14A arranged on its right side, the third axis 14C and the fifth axis 15B as well as the second axis 14B and the sixth axis 15C are overlapped, respectively, and the fourth axis 15A is arranged on the right side of the first axis 14A. In the drive unit 82E, the first axis 14A represents the first ring gear R1, the second axis 14B for the first sun gear S1, the third axis 14C for the first carrier C1, the fourth axis 15A for the second sun gear S2, the fifth axis 15B for the second carrier C2, and the sixth axis 15C for the second ring gear R2.

Since the engagement operation of the operating mode for which the drive unit 82E is set is the same as or similar to the engagement operation described in FIG. 26, detailed description here will be omitted. The first clutch device CL1 selectively connects the second ring gear R2 and the second carrier C2. The second clutch device CL2 selectively connects the first sun gear S1 and the second ring gear R2. The brake device BK selectively connects the first ring gear R1 (or the input shaft 42) and the fixed member 32.

As shown in FIG. 41, the first mode for which the drive unit 82E is set is set by disengaging the second clutch device CL2 and the brake device BK and by engaging the first clutch device CL1. Since the operation state of the first mode shown in FIG. 41 is the same as or similar to the action of the operation state of the first mode shown in FIG. 33, detailed description here will be omitted. Moreover, for the drive unit 82E shown in FIG. 41, a mode which is the same as or similar to each of the second mode to the fifth mode shown in FIGS. 34 to 37 can be set other than the first mode.

Fourteenth Embodiment

Figure 42:
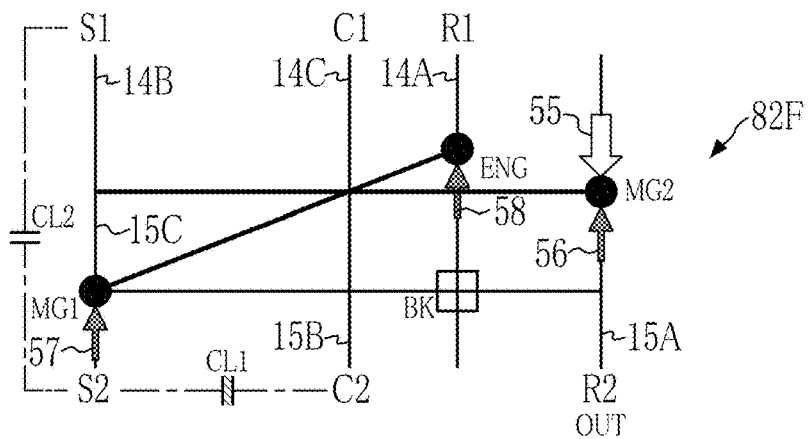
FIG. 42 is a nomographic diagram showing the operation state in the first mode of the drive unit in a fourteenth embodiment.

FIG. 42 shows an operation state of the first mode for which a drive unit 82F which is another embodiment of the drive unit 82 shown in FIG. 32 is set. Since a nomographic diagram of the drive unit 82F shown in FIG. 42 has arrangement of vertical axes 14A to 14C and 15A to 15C which is the same as or similar to that in the nomographic diagram of the drive unit 82E shown in FIG. 40, detailed description here will be omitted. The drive unit 82F is different from the nomographic diagram of the drive unit 82E shown in FIG. 41 in a point that the fourth axis 15A represents the second ring gear R2 and the sixth axis 15C represents the second sun gear S2.

Since the engagement operation of the operating mode for which the drive unit 82F is set is the same as or similar to the engagement operation described in FIG. 26, detailed description here will be omitted. The first clutch device CL1 selectively connects the second sun gear S2 and the second carrier C2. The second clutch device CL2 selectively connects the second sun gear S2 and the first sun gear S1. The brake device BK selectively connects the first ring gear R1 (or the input shaft 42) and the fixed member 32.

As shown in FIG. 42, the first mode for which the drive unit 82F is set is set by disengaging the second clutch device CL2 and the brake device BK and by engaging the first clutch device CL1. Since the operation state of the first mode shown in FIG. 42 is substantially the same as or similar to the operation state of the first mode shown in FIG. 33, detailed description here will be omitted. Moreover, for the drive unit 82F shown in FIG. 42, a mode which is the same as or similar to each of the second mode to the fifth mode shown in FIGS. 34 to 37 can be set other than the first mode.

Fifteenth Embodiment

Figure 43:
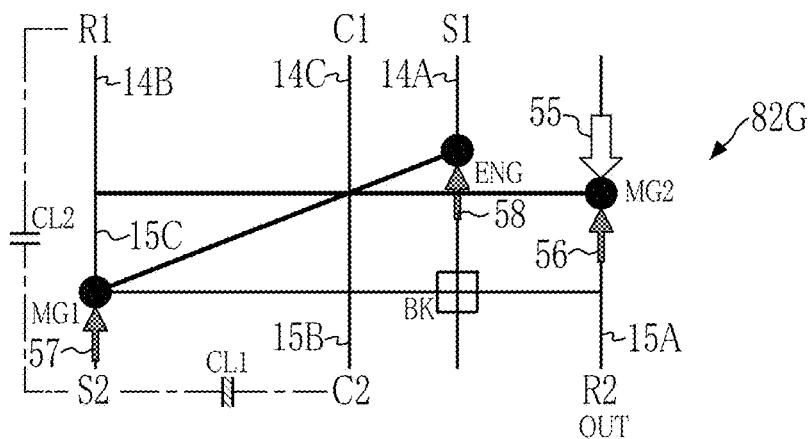
FIG. 43 is a nomographic diagram showing the operation state in the first mode of the drive unit in a fifteenth embodiment.

FIG. 43 shows an operation state of the first mode for which a drive unit 82G which is another embodiment of the drive unit 82 shown in FIG. 32 is set. Since a nomographic diagram of the drive unit 82G shown in FIG. 43 has arrangement of vertical axes 14A to 14C and 15A to 15C which is the same as or similar to that in the nomographic diagram of the drive unit 82E shown in FIG. 41, detailed description here will be omitted. The drive unit 82G is different from the nomographic diagram of the drive unit 82E shown in FIG. 41 in a point that the first axis 14A represents the first sun gear S1, the second axis 14B for the first ring gear R1, the fourth axis 15A for the second ring gear R2, and the sixth axis 15C represents the second sun gear S2.

Since the engagement operation of the operating mode for which the drive unit 82G is set is the same as or similar to the engagement operation described in FIG. 26, detailed description here will be omitted. The first clutch device CL1 selectively connects the second sun gear S2 and the second carrier C2. The second clutch device CL2 selectively connects the second sun gear S2 and the first ring gear R1. The brake device BK selectively connects the first sun gear S1 (or the input shaft 42) and the fixed member 32.

As shown in FIG. 43, the first mode for which the drive unit 82G is set is set by disengaging the second clutch device CL2 and the brake device BK and by engaging the first clutch device CL1. Since the operation state of the first mode shown in FIG. 43 is substantially the same as or similar to the operation state of the first mode shown in FIG. 33, detailed description here will be omitted. Moreover, for the drive unit 82G shown in FIG. 43, a mode which is the same as or similar to each of the second mode to the fifth mode shown in FIGS. 34 to 37 can be set other than the first mode.

Sixteenth Embodiment

Figure 44:
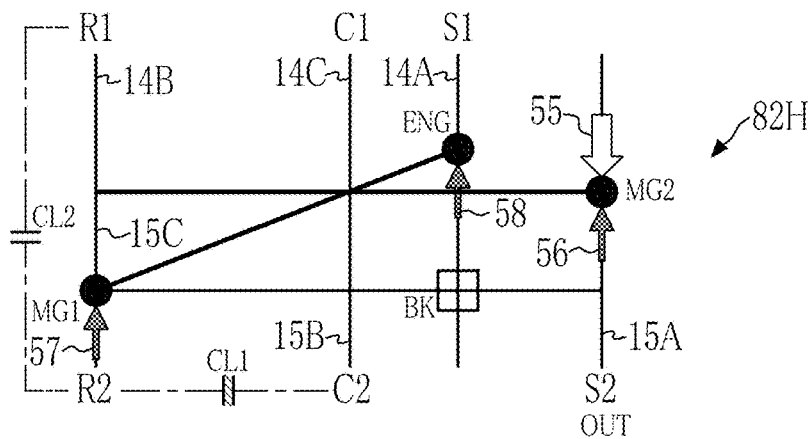
FIG. 44 is a nomographic diagram showing the operation state in the first mode of the drive unit in a sixteenth embodiment.
Figure 45:
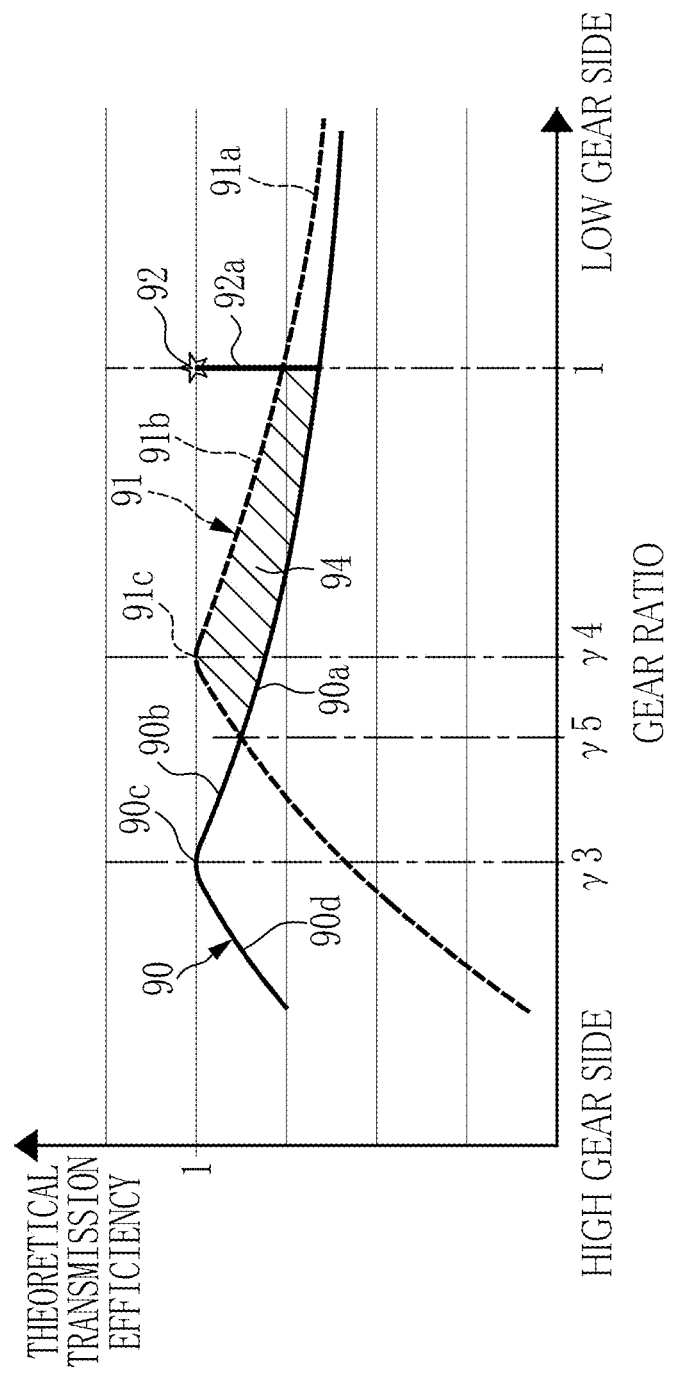
FIG. 45 is an explanatory view showing an example of the theoretical transmission efficiency of the drive unit described in a prior art.

FIG. 44 shows an operation state of the first mode for which a drive unit 82H which is another embodiment of the drive unit 82 shown in FIG. 32 is set. Since a nomographic diagram of the drive unit 82H shown in FIG. 44 has arrangement of vertical axes 14A to 14C and 15A to 15C which is the same as or similar to that in the nomographic diagram of the drive unit 82E shown in FIG. 41, detailed description here will be omitted. The drive unit 82H is different from the nomographic diagram of the drive unit 82E shown in FIG. 41 in a point that the first axis 14A represents the first sun gear S1 and the second axis 14B for the first ring gear R1.

Since the engagement operation of the operating mode for which the drive unit 82H is set is the same as or similar to the engagement operation described in FIG. 26, detailed description here will be omitted. The first clutch device CL1 selectively connects the second ring gear R2 and the second carrier C2. The second clutch device CL2 selectively connects the second ring gear R2 and the first ring gear R1. The brake device BK selectively connects the first sun gear S1 (or the input shaft 42) and the fixed member 32.

As shown in FIG. 44, the first mode for which the drive unit 8211 is set is set by disengaging the second clutch device CL2 and the brake device BK and by engaging the first clutch device CL1. Since the operation state of the first mode shown in FIG. 44 is substantially the same as or similar to the operation state of the first mode shown in FIG. 33, detailed description here will be omitted. Moreover, for the drive unit 8211 shown in FIG. 44, a mode which is the same as or similar to each of the second mode to the fifth mode shown in FIGS. 34 to 37 can be set other than the first mode.

Each of the embodiments described above is exemplification of the present disclosure, and structures and functions specific to any of the embodiments can be applied to another embodiment. Moreover, the present disclosure is not limited to each of the aforementioned embodiments and can be changed as appropriate within a range not departing from the object of the present disclosure.

For example, instead of the single-pinion type planetary gear unit, a double-pinion type planetary gear unit may be used for the first planetary gear unit 14. In this case, a sun gear of the double-pinion type planetary gear unit may be provided instead of the first sun gear S1 of the single-pinion type planetary gear unit, a ring gear of the double-pinion type planetary gear unit instead of the first carrier C1 of the single-pinion type planetary gear unit, and a carrier of the double-pinion type planetary gear unit instead of the first ring gear R1 of the single-pinion type planetary gear unit, respectively. The double-pinion type planetary gear unit may be used also for the second planetary gear unit 15 instead of the single-pinion type planetary gear unit in the same as or similarly to the above. That is, the first planetary gear unit 14 and the second planetary gear unit 15 may be a combination of a single-pinion type planetary gear unit and a double-pinion type planetary gear unit or a combination vice versa or a combination of the double-pinion type planetary gear units.

Moreover, in the embodiments of the present disclosure, the first clutch device CL1 only needs to be a unit for integrating the second planetary gear unit 15 by engagement in summary, and therefore, it may be a clutch device constituted so as to connect any two rotary elements in the second sun gear S2, the second carrier C2, and the second ring gear R2 or those three rotary elements. Furthermore, in the present disclosure, it may be so constituted that the driving force generated by the second motor 13 is transmitted to a wheel different from the wheel to which the driving force of the first motor 12 is transmitted.

What is claimed is:

1. A drive unit for a hybrid vehicle, in which a prime mover includes an engine, a first motor, and a second motor, and in which a driving force generated by the prime mover is transmitted to an output member connected to a driving wheel, comprising:

a first differential unit including a first rotary element to which the engine is connected, a second rotary element to which the first motor is connected, and a third rotary element;

a second differential unit including a fourth rotary element to which the output member is connected, a fifth rotary element connected to the third rotary element, and a sixth rotary element;

a first engagement device that is engaged to connect the fourth rotary element, and the sixth rotary element; and a second engagement device is engaged to connect the first rotary element to the sixth rotary element, wherein a first mode in which a speed ratio between the engine and the output member becomes a first ratio smaller than "1" is established by engaging any one of the first engagement device and the second engagement device while disengaging the other engagement device, wherein the first mode includes a state in which power of the engine is transmitted to the output member by reducing a speed of the first motor to zero, wherein a first mechanical point is at the first ratio, wherein, at the first mechanical point when the speed of the first motor is zero, the power is transmitted from the engine to the output member with maximum efficiency, wherein a second mode in which the speed ratio becomes a second ratio larger than "1" is established by engaging said other engagement device while disengaging said one of engagement devices, wherein the second mode includes a state in which the power of the engine is transmitted to the output member by reducing a speed of the first motor to zero, wherein a second mechanical point is at the second ratio, wherein, at the second mechanical point when the speed of the first motor is zero, the power is transmitted from the engine to the output member with maximum efficiency, and wherein a state in which the speed ratio becomes "1" is established by engaging both of the first engagement device and the second engagement device.

2. The drive unit for a hybrid vehicle as claimed in claim 1, further comprising:

a detector that detects at least one of a vehicle speed and a requested driving force; and a controller that controls the engine, the first motor, the second motor, the first engagement device, and the second engagement device, wherein the controller is configured to establish the first mode in at least one of the cases in which the vehicle speed is higher than a predetermined speed, and in which the requested driving force is not higher than a predetermined force, and establish the second mode in at least one of the cases in which the vehicle speed is lower than the predetermined speed, and in which the requested driving force is greater than the predetermined force.

3. The drive unit for a hybrid vehicle as claimed in claim 1, wherein the drive unit further comprises a controller that controls the engine, the first motor, the second motor, the first engagement device, and the second engagement device, and the controller is configured to select the first mode when the speed ratio is smaller than "1", select the second mode when the speed ratio is larger than "1", and select the state when the speed ratio is "1".

4. The drive unit for a hybrid vehicle as claimed in claim 2, wherein the controller is further configured to
establish the first mode by disengaging the first engagement device while engaging the second engagement device, and
establish the second mode by engaging the first engagement device while disengaging the second engagement device.

5. The drive unit for a hybrid vehicle as claimed in claim 2, wherein the controller is further configured to
establish the first mode by engaging the first engagement device while disengaging the second engagement device, and
establish the second mode by disengaging the first engagement device while engaging the second engagement device.

6. The drive unit for a hybrid vehicle as claimed in claim 1, wherein the first engagement device and the second engagement device include a dog clutch in which a torque is transmitted by engaging first teeth provided on an input-side member with second teeth provided on an output-side member.

7. The drive unit for a hybrid vehicle as claimed in claim 6, wherein the controller is further configured to engage the dog clutch disengaged before speed change and disengaging the dog clutch engaged before the speed change, if a speed difference between the engine and the output member is not larger than a predetermined value when switching between the first mode and the second mode.

8. The drive unit for a hybrid vehicle as claimed in claim 1, wherein the first engagement device and the second engagement device include a friction clutch having an input-side rotation member to which a driving torque is applied, and an output-side rotation member for outputting the driving torque.

9. The drive unit for a hybrid vehicle as claimed in claim 8, wherein the controller is further configured to concurrently execute a first control to reduce a torque transmitting capacity of the friction clutch engaged before speed change, and second control to increase a torque transmitting capacity of the friction clutch disengaged before the speed change, when switching between the first mode and the second mode.

10. The drive unit for a hybrid vehicle as claimed in claim 1, further comprising: a brake device that selectively connects the first rotary element to a predetermined fixed member.

11. The drive unit for a hybrid vehicle as claimed in claim 6, wherein
the first differential unit includes a planetary gear unit, and
the first rotary element includes a first carrier, the second rotary element includes a first sun gear, and the third rotary element includes a first ring gear.

12. The drive unit for a hybrid vehicle as claimed in claim 6, wherein
the first differential unit includes a planetary gear unit; and
the first rotary element includes a first carrier, the second rotary element includes a first ring gear, and the third rotary element includes a first sun gear.

13. The drive unit for a hybrid vehicle as claimed in claim 6, wherein
the first differential unit includes a planetary gear unit; and
the first rotary element includes a first ring gear, the second rotary element includes a first sun gear, and the third rotary element includes a first carrier.

14. The drive unit for a hybrid vehicle as claimed in claim 6, wherein
the first differential unit includes a planetary gear unit; and
the first rotary element includes a first sun gear, the second rotary element includes a first ring gear, and the third rotary element includes a first carrier.

15. The drive unit for a hybrid vehicle as claimed in claim 11, wherein
the second differential unit includes a planetary gear unit; and
the fourth rotary element includes a second ring gear, the fifth rotary element includes a second sun gear, and the sixth rotary element includes a second carrier.

16. The drive unit for a hybrid vehicle as claimed in claim 11, wherein
the second differential unit includes a planetary gear unit; and
the fourth rotary element includes a second sun gear, the fifth rotary element includes a second ring gear, and the sixth rotary element includes a second carrier.

17. The drive unit for a hybrid vehicle as claimed in claim 11, wherein
the second differential unit includes a planetary gear unit; and
the fourth rotary element includes a second carrier, the fifth rotary element includes a second sun gear, and the sixth rotary element includes a second ring gear.

18. The drive unit for a hybrid vehicle as claimed in claim 11, wherein
the second differential unit includes a planetary gear unit; and
the fourth rotary element includes a second carrier, the fifth rotary element includes a second ring gear, and the sixth rotary element includes by a second sun gear.

19. The drive unit for a hybrid vehicle as claimed in claim 13, wherein
the second differential unit includes a planetary gear unit; and
the fourth rotary element includes a second sun gear, the fifth rotary element includes a second carrier, and the sixth rotary element includes a second ring gear.

20. The drive unit for a hybrid vehicle as claimed in claim 13, wherein
the second differential unit includes a planetary gear unit; and
the fourth rotary element includes a second ring gear, the fifth rotary element includes a second carrier, and the sixth rotary element includes a second sun gear.

21. The drive unit for a hybrid vehicle as claimed in claim 1, wherein the first differential unit and the second differential unit are constituted such that the second rotary element, the fourth rotary element, the first rotary element, and the third rotary element or the fifth rotary element are aligned in the order of the second rotary element, the fourth rotary element, the first rotary element, the third rotary element or the fifth rotary element.

* * * * *